(12) United States Patent
Collins et al.

(10) Patent No.: US 11,865,475 B2
(45) Date of Patent: *Jan. 9, 2024

(54) ACOUSTICALLY SETTLED LIQUID-LIQUID SAMPLE PURIFICATION SYSTEM AND METHOD OF USE

(71) Applicant: LIFE TECHNOLOGIES CORPORATION, Carlsbad, CA (US)

(72) Inventors: Scott P. Collins, Ogden, UT (US); Christopher D. Brau, Logan, UT (US); Nephi D. Jones, Newton, UT (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,445

(22) Filed: Nov. 8, 2021

(65) Prior Publication Data

US 2022/0054954 A1 Feb. 24, 2022

Related U.S. Application Data

(60) Continuation of application No. 16/819,951, filed on Mar. 16, 2020, now Pat. No. 11,173,417, which is a
(Continued)

(51) Int. Cl.
*B01D 11/04* (2006.01)
*B01F 31/00* (2022.01)
(Continued)

(52) U.S. Cl.
CPC ........ *B01D 11/0423* (2013.01); *B01D 11/043* (2013.01); *B01D 11/0449* (2013.01);
(Continued)

(58) Field of Classification Search
CPC .............. B01D 11/0423; B01D 11/043; B01D 11/0449; B01D 11/0457; B01F 31/56;
(Continued)

(56) References Cited

U.S. PATENT DOCUMENTS 2,156,178 A 4/1939 Gyure
3,372,370 A 3/1968 Cyr
(Continued)

FOREIGN PATENT DOCUMENTS

CA 2 530 974 C 2/2014
CN 1694751 A 11/2005
(Continued)

OTHER PUBLICATIONS

U.S. Appl. No. 15/521,227, filed Apr. 21, 2017.
(Continued)

*Primary Examiner* — Krishnan S Menon
(74) *Attorney, Agent, or Firm* — Mintz, Levin, Cohn, Ferris, Glovsky and Popeo, P.C.

(57) ABSTRACT

A sample purification system includes a mixing zone; a settling zone in fluid communication with the mixing zone; a mixer element disposed in the mixing zone, the mixer element being configured to mix immiscible liquids to form a mixture; and a first acoustic wave settler configured to emit an acoustic wave into the mixture.

8 Claims, 20 Drawing Sheets

Related U.S. Application Data division of application No. 15/521,227, filed as application No. PCT/US2015/057095 on Oct. 23, 2015, now Pat. No. 10,610,804.

(60) Provisional application No. 62/068,410, filed on Oct. 24, 2014.

(51) Int. Cl.
*B01F 31/60* (2022.01)
*B01F 33/80* (2022.01)
*G01N 1/34* (2006.01)
*G01N 1/40* (2006.01)

(52) U.S. Cl.
CPC .......... *B01D 11/0457* (2013.01); *B01F 31/56* (2022.01); *B01F 31/60* (2022.01); *B01F 33/80* (2022.01); *G01N 1/34* (2013.01); *G01N 2001/4061* (2013.01)

(58) Field of Classification Search
CPC  B01F 31/60; B01F 33/80; G01N 1/34; G01N 2001/4061
See application file for complete search history.

(56) References Cited

U.S. PATENT DOCUMENTS

| | | | |
|---|---|---|---|
| 3,677,477 | A | 7/1972 | Watson et al. |
| 3,882,732 | A | 5/1975 | Fletcher et al. |
| 4,173,725 | A | 11/1979 | Asai et al. |
| 4,204,096 | A | 5/1980 | Barcus et al. |
| 4,666,595 | A | 5/1987 | Graham |
| 4,673,512 | A | 6/1987 | Schram |
| 4,743,361 | A | 5/1988 | Schram |
| 4,759,775 | A | 7/1988 | Peterson et al. |
| 4,821,838 | A | 4/1989 | Chen |
| 4,878,210 | A | 10/1989 | Mitome |
| 4,983,189 | A | 1/1991 | Peterson et al. |
| 5,225,089 | A | 7/1993 | Benes et al. |
| 5,371,429 | A | 12/1994 | Manna |
| 5,395,592 | A | 3/1995 | Bolleman et al. |
| 5,484,537 | A | 1/1996 | Whitworth |
| 5,527,460 | A | 6/1996 | Trampler et al. |
| H1568 | H | 8/1996 | Huang et al. |
| 5,560,362 | A | 10/1996 | Sliwa, Jr. et al. |
| 5,594,165 | A | 1/1997 | Madanshetty |
| 5,604,301 | A | 2/1997 | Mountford et al. |
| 5,626,767 | A | 5/1997 | Trampler et al. |
| 5,711,888 | A | 1/1998 | Trampler et al. |
| 5,831,166 | A | 11/1998 | Kozuka et al. |
| 5,902,489 | A | 5/1999 | Yasuda et al. |
| 5,912,182 | A | 6/1999 | Coakley et al. |
| 6,055,859 | A | 5/2000 | Kozuka et al. |
| 6,083,587 | A | 7/2000 | Smith et al. |
| 6,090,295 | A | 7/2000 | Raghavarao et al. |
| 6,205,848 | B1 | 3/2001 | Faber et al. |
| 6,216,538 | B1 | 4/2001 | Yasuda et al. |
| 6,221,258 | B1 | 4/2001 | Feke et al. |
| 6,332,541 | B1 | 12/2001 | Coakley et al. |
| 6,391,653 | B1 | 5/2002 | Letcher et al. |
| 6,494,069 | B1 | 12/2002 | Ireblad et al. |
| 6,592,821 | B1 | 7/2003 | Wada et al. |
| 6,649,069 | B2 | 11/2003 | Deangelis |
| 6,763,722 | B2 | 7/2004 | Fjield et al. |
| 6,797,158 | B2 | 9/2004 | Feke et al. |
| 6,881,314 | B1 | 4/2005 | Wang et al. |
| 6,929,750 | B2 | 8/2005 | Laurell et al. |
| 6,936,151 | B1 | 8/2005 | Lock et al. |
| 7,010,979 | B2 | 3/2006 | Scott |
| 7,061,163 | B2 | 6/2006 | Nagahara et al. |
| 7,081,192 | B1 | 7/2006 | Wang et al. |
| 7,093,482 | B2 | 8/2006 | Berndt |
| 7,108,137 | B2 | 9/2006 | Lal et al. |
| 7,150,779 | B2 | 12/2006 | Meegan, Jr. |
| 7,186,502 | B2 | 3/2007 | Vesey |
| 7,191,787 | B1 | 3/2007 | Redeker et al. |
| 7,331,233 | B2 | 2/2008 | Scott |
| 7,340,957 | B2 | 3/2008 | Kaduchak et al. |
| 7,373,805 | B2 | 5/2008 | Hawkes et al. |
| 7,384,783 | B2 | 6/2008 | Kunas et al. |
| 7,601,267 | B2 | 10/2009 | Haake et al. |
| 7,673,516 | B2 | 3/2010 | Janssen et al. |
| 7,682,067 | B2 | 3/2010 | West et al. |
| 7,766,121 | B2 | 8/2010 | Hadfield et al. |
| 7,835,000 | B2 | 11/2010 | Graves et al. |
| 7,837,040 | B2 | 11/2010 | Ward et al. |
| 7,846,382 | B2 | 12/2010 | Strand et al. |
| 7,878,079 | B2 | 2/2011 | Goodwin |
| 7,968,049 | B2 | 6/2011 | Takahashi et al. |
| 8,080,202 | B2 | 12/2011 | Takahashi et al. |
| 8,083,068 | B2 | 12/2011 | Kaduchak et al. |
| 8,134,705 | B2 | 3/2012 | Kaduchak et al. |
| 8,227,257 | B2 | 7/2012 | Ward et al. |
| 8,256,076 | B1 | 9/2012 | Feller |
| 8,263,407 | B2 | 9/2012 | Goddard et al. |
| 8,266,950 | B2 | 9/2012 | Kaduchak et al. |
| 8,266,951 | B2 | 9/2012 | Kaduchak et al. |
| 8,273,253 | B2 | 9/2012 | Curran |
| 8,273,302 | B2 | 9/2012 | Takahashi et al. |
| 8,309,408 | B2 | 11/2012 | Ward et al. |
| 8,319,398 | B2 | 11/2012 | Vivek et al. |
| 8,333,896 | B2 | 12/2012 | Nakatani |
| 8,334,133 | B2 | 12/2012 | Fedorov et al. |
| 8,387,803 | B2 | 3/2013 | Thorslund et al. |
| 8,436,993 | B2 | 5/2013 | Kaduchak et al. |
| 8,507,293 | B2 | 8/2013 | Ward et al. |
| 8,564,776 | B2 | 10/2013 | Graves et al. |
| 8,573,060 | B2 | 11/2013 | Huang et al. |
| 8,679,338 | B2 | 3/2014 | Rietman et al. |
| 8,691,145 | B2 | 4/2014 | Dionne et al. |
| 8,889,388 | B2 | 11/2014 | Wang et al. |
| 2002/0131654 | A1 | 9/2002 | Smith et al. |
| 2003/0015035 | A1 | 1/2003 | Kaduchak et al. |
| 2003/0077466 | A1 | 4/2003 | Smith et al. |
| 2006/0049114 | A1 | 3/2006 | Haake et al. |
| 2006/0196501 | A1 | 9/2006 | Bibbo et al. |
| 2006/0240546 | A1 | 10/2006 | Goodwin et al. |
| 2006/0270036 | A1 | 11/2006 | Goodwin et al. |
| 2009/0029870 | A1 | 1/2009 | Ward et al. |
| 2009/0042239 | A1 | 2/2009 | Ward et al. |
| 2009/0045107 | A1 | 2/2009 | Ward et al. |
| 2009/0053686 | A1 | 2/2009 | Ward et al. |
| 2009/0107241 | A1 | 4/2009 | Goddard et al. |
| 2009/0178716 | A1 | 7/2009 | Kaduchak et al. |
| 2009/0194420 | A1 | 8/2009 | Mariella, Jr. et al. |
| 2009/0226994 | A1 | 9/2009 | Lemor et al. |
| 2009/0246104 | A1 | 10/2009 | McCausland et al. |
| 2010/0000325 | A1 | 1/2010 | Kaduchak et al. |
| 2010/0078323 | A1 | 4/2010 | Takahashi et al. |
| 2010/0078384 | A1 | 4/2010 | Yang |
| 2010/0193407 | A1 | 8/2010 | Steinberg et al. |
| 2010/0255573 | A1 | 10/2010 | Bond et al. |
| 2010/0296976 | A1 | 11/2010 | Hakari et al. |
| 2010/0323342 | A1 | 12/2010 | Gomez et al. |
| 2011/0024335 | A1 | 2/2011 | Ward et al. |
| 2011/0123392 | A1 | 5/2011 | Dionne et al. |
| 2011/0134426 | A1 | 6/2011 | Kaduchak et al. |
| 2011/0154890 | A1 | 6/2011 | Holm et al. |
| 2011/0188928 | A1 | 8/2011 | West et al. |
| 2011/0189732 | A1 | 8/2011 | Wienand et al. |
| 2011/0262990 | A1 | 10/2011 | Wang et al. |
| 2011/0281319 | A1 | 11/2011 | Swayze et al. |
| 2012/0055853 | A1 | 3/2012 | Kaduchak et al. |
| 2012/0086938 | A1 | 4/2012 | Folkenberg |
| 2012/0088295 | A1 | 4/2012 | Yasuda et al. |
| 2012/0149126 | A1 | 6/2012 | Wilson et al. |
| 2012/0227471 | A1 | 9/2012 | Smith et al. |
| 2012/0267288 | A1 | 10/2012 | Chen et al. |
| 2012/0304749 | A1 | 12/2012 | Kaduchak et al. |
| 2012/0325727 | A1 | 12/2012 | Dionne et al. |
| 2012/0325747 | A1 | 12/2012 | Rietman et al. |
| 2012/0328477 | A1 | 12/2012 | Dionne et al. |
| 2013/0048565 | A1 | 2/2013 | Fiering et al. |

(56) References Cited

U.S. PATENT DOCUMENTS

| | | |
|---|---|---|
| 2013/0079240 A1 | 3/2013 | Ward et al. |
| 2013/0175226 A1 | 7/2013 | Coussios et al. |
| 2013/0183208 A1 | 7/2013 | Sugahara et al. |
| 2013/0277316 A1 | 10/2013 | Dutra et al. |
| 2013/0277317 A1 | 10/2013 | LoRicco et al. |
| 2013/0284271 A1 | 10/2013 | Lipkens et al. |
| 2013/0292582 A1 | 11/2013 | Kaduchak et al. |
| 2013/0302213 A1 | 11/2013 | Lipkens et al. |
| 2013/0327130 A1 | 12/2013 | Hoyos et al. |
| 2013/0330763 A1 | 12/2013 | Graves et al. |
| 2014/0008307 A1 | 1/2014 | Guldiken et al. |
| 2014/0011240 A1 | 1/2014 | Lipkens et al. |
| 2015/0117142 A1 | 4/2015 | Staheli et al. |
| 2015/0265988 A1 | 9/2015 | Williams |
| 2017/0354901 A1 | 12/2017 | Collins et al. |

FOREIGN PATENT DOCUMENTS

| | | |
|---|---|---|
| CN | 1885027 A | 12/2006 |
| CN | 103203120 | 7/2013 |
| DE | 3027433 A1 | 2/1982 |
| EP | 0 332 372 A2 | 3/1989 |
| EP | 0 583 200 A1 | 2/1994 |
| GB | 2 420 510 A | 5/2006 |
| GR | 1003317 B | 2/2000 |
| SU | 148383 A1 | 11/1961 |
| SU | 384528 A1 | 5/1973 |
| WO | 87/07178 | 12/1987 |
| WO | 2009/144709 A1 | 12/2009 |
| WO | 2010/024753 A1 | 3/2010 |
| WO | 2011/130321 A2 | 10/2011 |
| WO | 2013/048323 A1 | 4/2013 |
| WO | 2013/151733 A1 | 10/2013 |
| WO | 2013/172810 A1 | 11/2013 |
| WO | 2014/014941 A1 | 1/2014 |
| WO | 2014/029505 A1 | 2/2014 |
| WO | 2014/055219 A2 | 4/2014 |
| WO | 2014/124306 A1 | 8/2014 |
| WO | 2015/006730 A1 | 1/2015 |
| WO | 2015/126779 A1 | 8/2015 |

OTHER PUBLICATIONS

U.S. Appl. No. 16/819,951, filed Mar. 16, 2020.

International Search Report and Written Opinion dated Feb. 2, 2016, issued in PCT Application No. PCT/US2015/057095, filed Oct. 23, 2015.

Paula A. J. Rosa et al., *Continuous Purification of Antibodies from Cell culture Supernatant with Aqueous Two-Phase Systems: From Concept to Process*, Biotechnology Journal, 2013, vol. 8, pp. 352-362.

Eggersgluess et al., *Multi-Stage Aqueous Two-Phase Extraction for the Purification of Monoclonal Antibodies*, Chem. Eng. Technol., 2017, vol. 37, No. 4, pp. 675-682.

E. Benes et al., *Ultrasonic Separation of Suspended Particles*, IEEE International Ultrasonic Symposium, 2001, pp. 249-259.

Dwayne A. Johnson et al., *Methodology for Fractionating Suspended Particles Using Ultrasonic Standing Wave and Divided Flow Fields*, Separation Technology, vol. 5, 1995, pp. 251-258.

Tobias Lilliehorn et al., *Trapping of Microparticles in the Near field of an Ultrasonic Transducer*, Science Direct, vol. 43, 2005, pp. 293-303.

R. J. Townsend et al., *Investigation of Two-Dimensional Acoustic Resonant Modes in a Particle Separator*, Science Direct, vol. 44, 2006, pp. 467-471.

Zhaowei Wang et al., *Retention and Viability Characteristics of Mammalian Cells in an Acoustically Driven Polymer Mesh*, Chemical & Biomedical Engineering Faculty Publication, 2004, pp. 284-287.

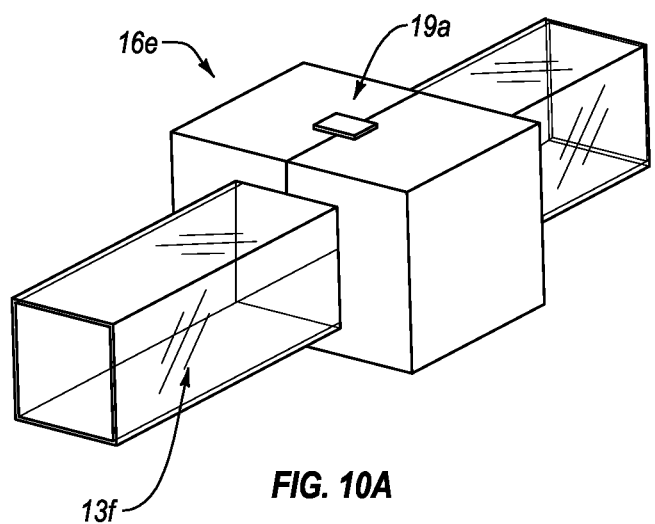
FIG. 10A
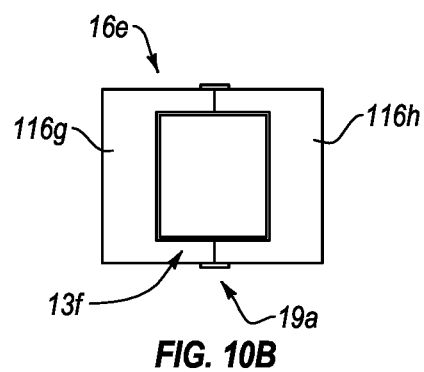
FIG. 10B
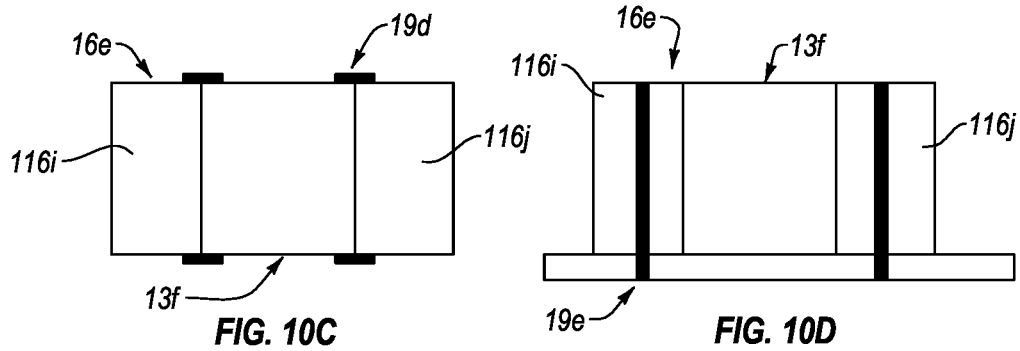
FIG. 10C
FIG. 10D

ACOUSTICALLY SETTLED LIQUID-LIQUID SAMPLE PURIFICATION SYSTEM AND METHOD OF USE

CROSS-REFERENCE TO RELATED APPLICATIONS

This application is a continuation of U.S. application Ser. No. 16/819,951, filed Mar. 16, 2020, which is a divisional of Ser. No. 15/521,227, filed Apr. 21, 2017, now U.S. Pat. No. 10,610,804, which is a nationalization of PCT Application No. PCT/US2015/057095, filed Oct. 23, 2015, which claims the benefit of U.S. Provisional Application No. 62/068,410, filed Oct. 24, 2014, which are incorporated herein by specific reference.

BACKGROUND

Technical Field

The present disclosure relates generally to sample purification and sample purification systems, and more specifically, to liquid-liquid extraction and/or two-phase sample purification and to systems and methods implementing the same. In particular, the present disclosure relates to two-phase, continuous-flow, liquid-liquid feed purification systems and methods implementing the same.

Related Technology

Existing liquid-liquid extraction systems or columns are designed to accomplish the transfer of a molecule of interest from a first liquid phase into a second liquid phase (e.g., in order to purify the molecule of interest away from one or more contaminants). Typically, the immiscible first and second phases are repeatedly mixed together in active mixing zones, and then allowed to coalesce or "settle" in passive settling zones. During mixing, one phase is dispersed (as smaller droplets) in the other phase. The relatively small droplet size increases the speed and efficiency of purification by allowing the molecule of interest to move more easily into the new phase through a larger surface area-to-volume ratio. The mixed sample is then shielded or baffled from the mixing zone in an adjacent settling zone. This baffling allows the dispersed droplets to coalesce together into larger droplets.

Eventually, the buoyancy of the larger dispersed phase droplets or the density difference between the larger dispersed phase droplets and the surrounding, continuous phase may be great enough to overcome the drag force from the surrounding phase on the dispersed droplet phase. Accordingly, the larger dispersed phase droplets may flow counter-currently through the continuous phase, and into an adjacent mixing zone, where the cycle of mixing and settling is repeated. Without being bound to any theory, maintaining this counter-current flow of the two liquid phases is necessary for continuous, multi-stage, purification of two feed stocks. After purification or molecular transfer is complete, the mixture is eventually allowed to passively settle into distinct phases that can be separated one from the other.

Thus, existing systems rely on passive coalescence of the dispersed phase droplets in designated phase settling zones and eventual settling of a mixed two-phase sample into separate phases. Specifically, existing liquid-liquid extractors or columns rely on physical barriers or baffles between alternating (active) sample mixing zones and (passive) sample settling zones to inhibit mixing of the sample in the settling zones and permit coalescence of smaller dispersed phase droplets into larger droplets to maintain counter-current flow of the heavy and light phases necessary for continuous, multi-stage, purification. The shielding or baffling effect of these barriers allows a mixed sample with high interfacial tension between the two phases to naturally and/or spontaneously settle out into a less-dense upper phase and a denser or more-dense lower phase by permitting the small dispersed phase droplets to coalesce into larger droplets until the buoyancy of the larger dispersed phase droplets is sufficient to overcome the drag force of the surrounding, continuous phase and counter-currently flow therethrough.

One disadvantage of existing systems is that it may take several minutes to an hour, or even several hours, if at all, for a mixed sample with low interfacial tension between the two phases to spontaneously settle out into separated phases, or even for the dispersed phase droplets to coalesce. For instance, when a heavier aqueous phase containing a sample of interest is mixed with an organic (e.g., polyethylene glycol (PEG)) phase to accomplish transfer of the molecule into the organic phase, passive settling of the mixed sample into heavy and light phases may be commercially, economically, and practically time- and/or cost-prohibitive. To (efficiently) effectuate the molecular transfer, the two phases may be mixed vigorously, thereby forming very small, micro-droplets of the dispersed phase and/or continuous phase. This vigorously mixed sample may not properly and sufficiently coalesce and/or settle out in a continuous flow, continuous mixing/settling, two phase liquid-liquid extractor system (e.g., where time and space (settling zone size and number) are limited by practical and/or commercial constraints). It would be beneficial to provide a system that may provide for active settling of a mixed sample such that the time required to purify a sample may be reduced.

Similarly, existing systems are limited to continuous sample flow rates slow enough to allow for passive coalescence and settling of the phases. For instance, if the feed flow rate of existing systems is too high, or the fluid agitation is too great, dispersed droplets may not coalesce sufficiently in the settling zones to overcome the drag force of the surrounding, continuous phase. Accordingly, dispersed droplets (especially micro-droplets) can become trapped (i.e., entrained) in the current of the surrounding, continuous phase, leading to axial mixing of the phases and, eventually, failure in the form of system flooding or entrainment. Attempts to increase the flow rate of the system by increasing the diameter of the column may only exasperate the problem of axial mixing and/or require costly, exponential increase in the height of the column to maintain equivalent purification.

Some previous systems also failed to efficiently and sufficiently purify the sample (e.g., to achieve desired levels of purity in a cost-effective manner). For instance, existing systems may require multi-story purification columns and support structures to provide the number of theoretical purification stages necessary to achieve the level of sample purity required by the FDA, EPA, or other regulatory or quality control standards. Smaller tandem or side-by-side systems may fill entire rooms or work spaces, creating an inefficient use of resources. Such dramatic increases in column height and/or system size can be impractical and/or undesirable, and may not even ensure the success of the sample purification (e.g., especially in low interfacial tension systems). Likewise, affinity and other forms of chromatography designed to accomplish purification via binding, washing, and elution of the molecule of interest away from contaminants can be both difficult and expensive to scale-up to commercial levels (e.g., especially in the case of commercial antibody purification).

Accordingly, it would be beneficial to provide a sample purification system that can achieve high levels of sample purity in a small, convenient work space, in a relatively short amount of time, and/or simultaneously reduce the cost of sample purification.

BRIEF DESCRIPTION OF THE DRAWINGS

To further clarify the above and other advantages and features of the present disclosure, a more particular description of the invention will be rendered by reference to specific embodiments thereof which are illustrated in the drawings located in the specification. It is appreciated that these drawings depict only typical embodiments of the present disclosure and are therefore not to be considered limiting of its scope. The present disclosure will be described and explained with additional specificity and detail through the use of the accompanying drawings in which:

FIG. 10A is a perspective view of another acoustics assembly according to an embodiment of the present disclosure;

FIG. 10B is a side cross-sectional view of the acoustics assembly of FIG. 10A;

FIG. 10C is a side cross-sectional view of another acoustics assembly according to an embodiment of the present disclosure;

FIG. 10D is a side cross-sectional view of another acoustics assembly according to an embodiment of the present disclosure;

DETAILED DESCRIPTION

Figure 1:
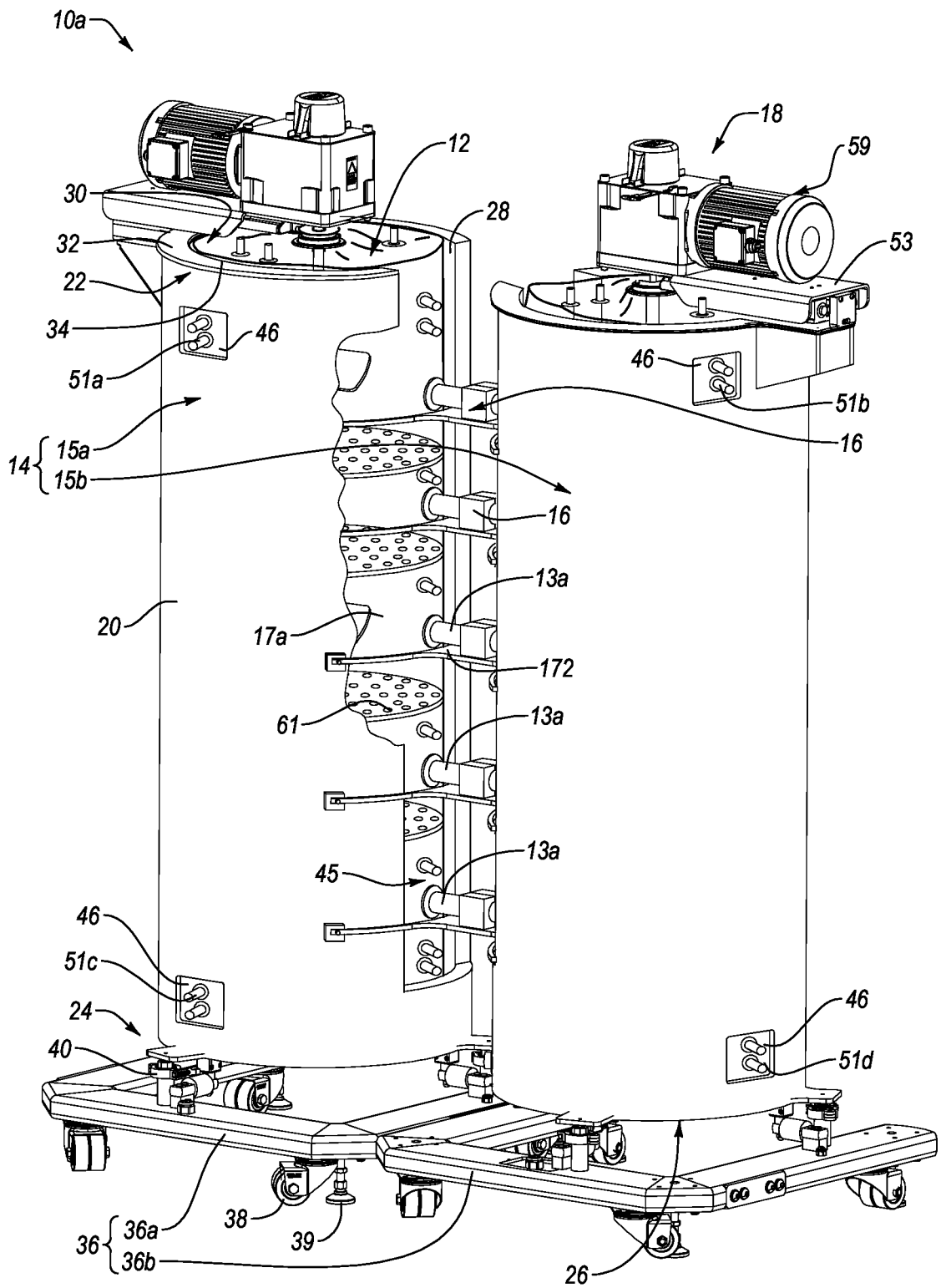
FIG. 1 is a perspective view of a sample purification system according to an embodiment of the present disclosure.

Previous sample purification columns have relied upon passive settling of the sample or mixture to accomplish phase separation. Embodiments of the present sample purification system, however, can employ acoustic waves to actively separate a mixture of two or more liquid phases into separate (heavy and light) phases, which can then be isolated away one from another. Such a process can be especially useful in purifying one or more molecules of interest away from one or more contaminants. For instance, mixing of a first liquid comprising a first phase, an amount of at least one molecule of interest (such as a biological molecule (e.g., antibody), organic molecule, inorganic molecule, or hydrocarbon), and an amount of one or more contaminants, with a second liquid comprising a second phase, can cause or allow for the transfer of at least a portion of the amount of the molecule(s) of interest and/or the contaminant(s) into the second liquid or phase thereof.

As used herein, a "molecule" or "molecule of interest," as well as similar terms, includes other matter of interest, including but not limited to cells, particles, compounds, crystals, aggregates, etc. For instance, in at least one embodiment, a molecule of interest can comprise a commodity chemical or reagent (e.g., acetone, ammonium, acetic acid (vinegar), etc.). In other embodiments, a molecule of interest can comprise a hydrocarbon (e.g., crude or processed oil, branched and/or unbranched hydrocarbon(s), alkane(s), aromatic or fused-ring compound(s), refinery gas(es), petrol, naphtha(s), paraffin(s), diesel oil(s), lubricating oil(s), fuel oil(s), grease, wax, bitumen, etc.). In addition, reference to a (single) molecule of interest includes a specific reference to a population or amount of the single molecule of interest, as well as additional molecule(s) of interest. Thus, reference to a "molecule" or "molecule of interest" should not be construed as being limited to a (single) molecule, per se. Rather, such terms should be construed broadly to include any substance or matter included in a liquid feed or sample.

As used herein, "mixing" and similar terms includes any suitable form of combining and/or co-mingling, including both miscible and immiscible mixing. For instance, mixing two or more components can include or result in the formation of a solution, suspension, colloid, emulsion, or other mixture. In addition, mixing can be accomplished by any suitable means. Such means for mixing can include, for example, one or more mixing elements. Mixing elements can be active or static in nature. Active mixing elements can include, for example, rotating members, oscillating members, vibrating members, stirring members, shaking members, and/or sonicating members. Such elements can include one or more impellers, blades, fins, paddles, ribs, vanes, etc. Active mixing elements can also include one or more (vertically or laterally) agitating, reciprocating, and/or pulsing (porous) plates or other suitable members, one or more (flat) spinning discs, and so forth. Static mixing elements can include (column) packing, obstacles, etc. and/or can create a tortuous path through which two or more components pass and become mixed thereby.

Static mixing can also involve introducing the two components into a space such that the two components mix together. In some embodiments, two liquids can be mixed by passing the liquids into a mixing area (or zone) such that the two liquids co-localize. In at least one embodiment, the liquids can be passed through one or more static mixing elements.

Accordingly, various embodiments of the present disclosure overcome or solve one or more of the foregoing or other problems in the art, by utilizing acoustic wave-assisted, active coalescence, settling and/or separation of the phases that can allow for rapid purification of the molecule(s) of interest away from the contaminant(s) (e.g., in a continuous flow, multi-stage, purification column or system). For instance, the acoustic wave(s) can induce, cause, further, enhance, and/or increase the co-localization and/or coalescence of smaller phase droplets into one or more larger droplets or phase bodies until the buoyancy of the droplets or body and/or the density differences between the phases causes the two phases to counter-currently flow (e.g., eventually causing the heavier, denser phase to settle down and the lighter, less-dense phase to settle up (i.e., rise to the top of the fluid sample)). As used herein, "counter-current" flow, flowing "counter-currently," and similar terms refer to at least a portion of a less-dense phase of a first phase and a second phases moving vertically upward relative to at least a portion of a more-dense phase of the first phase and the second phases, or at least a portion of the more-dense phase of the first phase and the second phases moving vertically down-ward relative to at least a portion of the less-dense phase of the first phase and the second phases. In at least one embodiment, the smaller phase droplets can comprise micro-droplets (e.g., that may not settle under typical flow rates and/or in existing, passive settling systems within an economically-relevant or suitable period of time). Thus, the application of acoustic wave-driven phase settling to two-phase liquid-liquid extraction can decrease the time and/or cost, and/or increase the efficiency and/or level of sample purification.

As used herein, "micro-droplet" and similar terms refers, generally, to phase droplets, whether dispersed or continuous, heavy or light, that (are known to) require an extended period of time to coalesce and/or settle out. For instance, micro-droplets may have a diameter of less than about 30 microns, less than about 25 microns, less than about 20 microns, less than about 15 microns, less than about 10 microns, less than about 5 microns, or less than about 2 microns. The extended period of time may be a time greater than 5 minutes, greater than 10 minutes, greater than 15 minutes, greater than 20 minutes, greater than 25 minutes, greater than 30 minutes, greater than 35 minutes, greater than 40 minutes, greater than 45 minutes, greater than 50 minutes, greater than 55 minutes, greater than 1 hour, greater than 1.5 hours, greater than 2 hours, and so forth. By way of illustration, in certain low interfacial tension systems, a ~10 micron droplet may require >1 hour to settle.

In addition, a micro-droplet can have a diameter so small that the settling velocity of the droplet is so low that it is commercially unreasonable to allow for enough time to settle the droplet by passive means. For instance, a micro droplet may have a settling velocity of less than or equal to about 1 (or 2, 3, 4, 5, 6, 7, 8, or 9)×10-4, 10-5, 10-6, 10-7, or 10-8 m/s. It will also be appreciated that mean droplet size contemplate a population of droplets, some greater than, some less than, and/or some equal to the mean droplet size. Accordingly, a mean droplet size of about 30 microns means there can be some fraction of droplets (e.g., 10%) that are also less than or equal to about 10 microns.

Embodiments of the present disclosure can be advantageous over existing systems and/or methods by (i) increasing the speed and/or efficiency of extraction or purification, (ii) decreasing the size and/or cost of the system, including components thereof and reagents used therein, and/or (iii) providing a system and/or method for extracting a molecule of interest for which extraction was previously unavailable (e.g., because of limitations in chemical engineering). For instance, implementation of some embodiments of the present disclosure can allow a system operator to maintain customary, typical, or existing system and/or column size, settling and/or system (component) residence time, (sample fluid) flow rate, and/or sample mixing speed while increasing the yield, purity, (per stage and/or system) efficiency, and/or other benchmark(s) of sample purification or extraction. Similarly, implementation of certain embodiments of the present disclosure can allow a system operator to decrease the system and/or column size (e.g., height, width, area, volume, etc.), decrease the settling and/or system (component) residence time, increase the (sample fluid) flow rate, and/or increase the sample mixing speed, while maintaining (or even increasing) the yield, purity, (per stage and/or system) efficiency, and/or other benchmark(s) of sample purification or extraction. The provision and/or achievement of such efficiency-enhancing, time-, space-, money-, and/or resource-saving results, outcomes, and/or parameters, etc., without the corresponding drawback(s) or limitations has previously been unobtainable.

Before describing embodiments of the present disclosure in detail, it is to be understood that this disclosure is not limited to the particularly exemplified apparatus, systems, methods, or process parameters that may, of course, vary. It is also to be understood that the terminology used herein is only for the purpose of describing particular embodiments of the present disclosure, and is not necessarily intended to limit the scope of the disclosure or claimed invention. Thus, while the invention will be described in detail with reference to specific configurations, embodiments, and/or implementations thereof, the descriptions are illustrative only and are not to be construed as limiting the scope of the invention as claimed in the appended claims.

All publications, patents, and patent applications cited herein, whether supra or infra, are hereby incorporated by reference in their entirety to the same extent as if each individual publication, patent, or patent application was specifically and individually indicated to be incorporated by reference.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

It will be noted that, as used in this specification and the appended claims, the singular forms "a," "an" and "the" include plural referents unless the content clearly dictates otherwise. Thus, for example, reference to an "acoustic wave generator" includes one, two, or more acoustic wave generators. Similarly, reference to a plurality of referents should be interpreted as comprising a single referent and/or a plurality of referents unless the content and/or context clearly dictate otherwise. Thus, reference to "acoustic wave generators" does not necessarily require a plurality of such acoustic wave generators. Instead, it will be appreciated that independent of conjugation; one or more acoustic wave generators are contemplated herein.

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the disclosure or claims.

Where possible, like numbering of elements have been used in various figures. Furthermore, multiple instances of an element and or sub-elements of a parent element may each include separate letters appended to the element number. For example two instances of a particular element "91" may be labeled as "91*a*" and "91*b*". In that case, the element label may be used without an appended letter (e.g., "91") to generally refer to instances of the element or any one of the elements. Element labels including an appended letter (e.g., "91*a*") can be used to refer to a specific instance of the element or to distinguish or draw attention to multiple uses of the element. Furthermore, an element label with an appended letter can be used to designate an alternative design, structure, function, implementation, and/or embodiment of an element or feature without an appended letter. Likewise, an element label with an appended letter can be used to indicate a sub-element of a parent element. For instance, an element "36" can comprise sub-elements "36*a*" and "36*b*."

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present. Furthermore, as used herein, the terms "connection," "connected," and the like do not necessarily imply direct contact between the two or more elements.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention as claimed in the appended claims.

Unless defined otherwise, all technical and scientific terms used herein have the same meaning as commonly understood by one of ordinary skill in the art to which the present disclosure pertains. Although a number of methods and materials similar or equivalent to those described herein can be used in the practice of the present disclosure, only certain materials and methods are described herein.

In certain embodiments, the inventive systems (or portion(s) thereof) are designed so that at least some components that contact the material being processed can be disposed of after each use. As a result, some embodiments of the present disclosure substantially eliminate the burden of cleaning and sterilization required by conventional stainless steel mixing and processing systems. This feature also ensures that sterility can be consistently maintained during repeated processing of multiple batches. In view of the foregoing, and the fact that certain embodiments can be easily scalable, relatively low cost, and easily operated, some embodiments of the present disclosure can be used in a variety of industrial and research facilities that previously outsourced such processing. Furthermore, as used herein, reference to one or more "disposable" components contemplates that the component(s) are designed for and/or commercially compatible with single-use applications. Thus, while strictly speaking, all matter is technically disposable, those skilled in the art will appreciate that a disposable and/or single-use designation comprises more than a mere intended use. Rather, such components are structurally adapted for economic disposability after a single use.

Embodiments of the present disclosure can include a sample purification system having a container (which can operate like a column) for receiving at least one fluid sample and at least one acoustic wave separator configured to emit at least one acoustic wave into the fluid sample. The system can also include a rigid housing (or tank) configured to receive and/or (structurally) support the container. In some embodiments, the system can also include a base for supporting the housing or container (e.g., a stationary frame or mobile trolley), means for mixing a fluid sample in the container (e.g., a mixer system or mixing element thereof), one or more pumps for introducing fluid(s) into the container (e.g., a fluid pump), one or more condensers, compressors, coolers, chillers, and/or heaters (e.g., for regulating the temperature of the sample), one or more user interfaces (e.g., a computer or operator control system) for operating the system, one or more sensors for monitoring column operation, purification, phase settling and/or phase mixing, and/or one or more means for mounting, attaching, or connecting element(s) to the housing.

Turning now to the Figures, various embodiments of inventive fluid purification systems 10 will now be discussed. Depicted in FIG. 1 is one embodiment of a fluid purification system 10a incorporating some features of the present disclosure. In general, fluid purification system 10a comprises a container assembly 12 that is optionally disposed within a rigid support housing 14. System 10a can further comprises one or more mixer systems 18 extending at least partially into container assembly 12 and/or one or more acoustic settlers 16 for passing an acoustic wave through a portion of container assembly 12. Various components of fluid purification system 10a will now be discussed in greater detail with reference to the figures.

Support Housing

As illustrated in FIG. 1, fluid purification system 10a comprises a rigid support housing 14. Rigid support housing 14 is configured to receive and supporting container assembly 12. In the depicted embodiment, rigid support housing 14 comprises rigid support housings 15a and 15b. Support housings 15a and 15b are substantially identical and like reference characters are used to identify like elements. Each support housing 15 includes a substantially cylindrical sidewall 20 that extends between an upper end 22 and an opposing lower end 24. Upper end 22 terminates at an end face 32 while lower end 24 terminates at a floor 26.

Support housing 15 has an interior surface 28 that bounds a chamber 30. An opening 34 is formed on end face 32 to provide access to chamber 30. A transfer slot 45 extends through sidewall 20 so as to communicate with chamber 30. In one embodiment, transfer slot 45 extends through sidewall 20 from lower end 24 through end face 32. Support housing 15 thus has a substantially C-shaped transverse cross section where it intersects with transfer slot 45. In an alternative embodiment, transfer slot 45 need not extend through end face 32 but can stop short thereof so that support housing 15 encircles transfer slot 45. For instance, in at least one embodiment, opening 34 can be positioned at bottom end 24 of support housing 15. Thus, upper end 22 of support housing 15 can comprise a closed configuration in certain embodiments. Similarly, both upper and lower ends 22, 24 can comprise closed configurations such that container assembly 12 can be inserted into chamber 30 of support housing 15 via transfer slot 45.

As discussed below in greater detail, during use, support housings 15a and 15b are typically disposed slightly spaced apart with transfer slots 45 facing each other. Container assembly 12 is received within compartments 30 so that a portion of container assembly 12 laterally passes through transfer slots 45. Although support housings 15 are shown as separate and discrete members, they can be connected together or formed as an integral, single unitary structure or can be connected together.

As depicted, each support housing 15a and 15b can be removably or integrally secured to a base 36a and 36b. Base 36 can comprise a stationary or mobile frame, cart, or trolley and can be secured to support housing 15 by one or more connectors 40. For instance, floor 26 of support housing 15 can rest on base 36 with wheels 38 and/or feet 39 extending therefrom. Bases 36a, 36b can be connected and/or secured together via one or more connectors. Thus, bases 36 can enable selective movement and positioning/securing of support housings 15. In alternative embodiments, however, support housing 14 can rest on a single base 36 or not rest on base 36 but can rest directly on a floor or other support structure.

Figure 8:
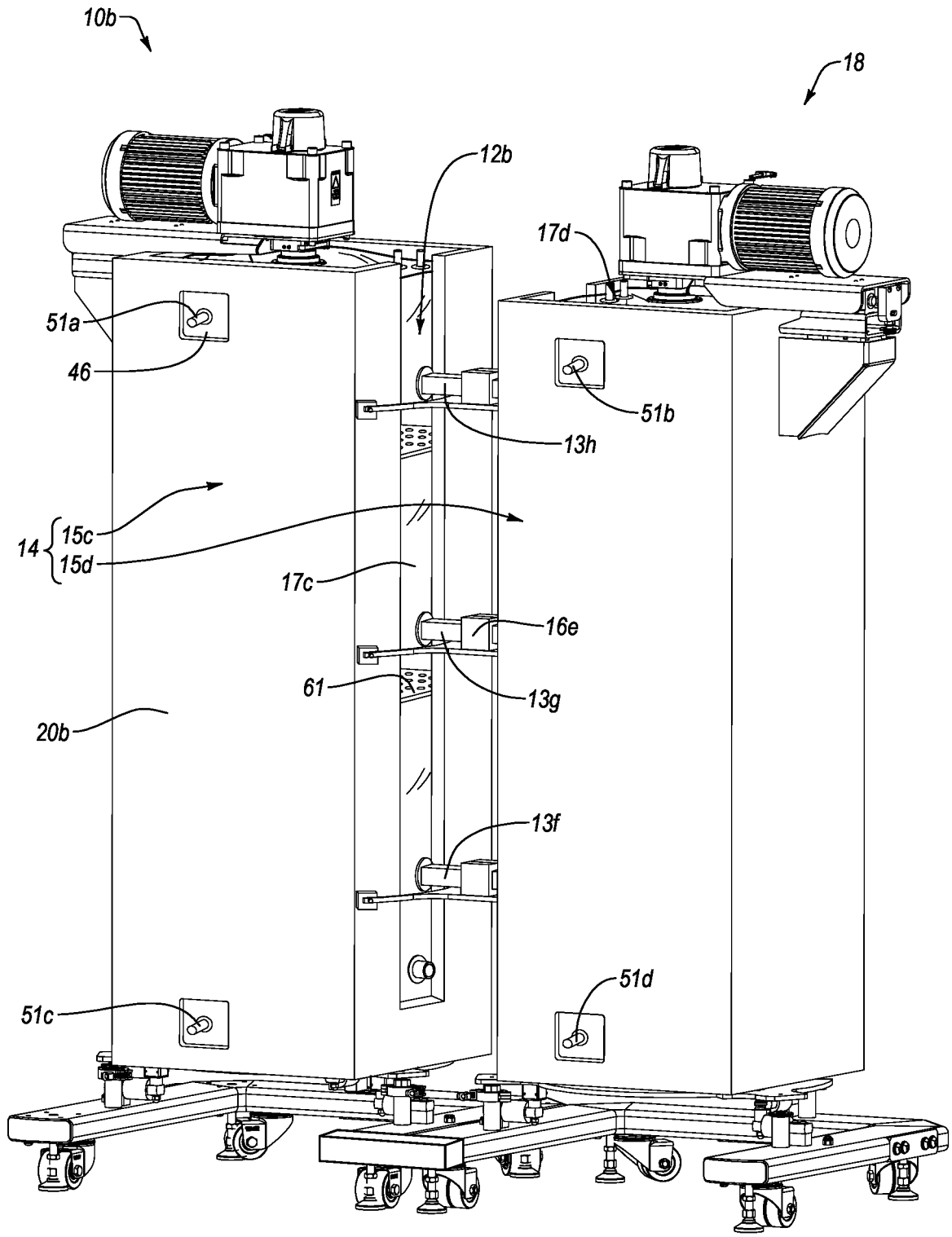
FIG. 8 is a perspective view of an alternative embodiment of the sample purification system shown in FIG. 1.

Although each support housing 15 is shown as having a substantially cylindrical configurations, in alternative embodiments each support housing 15 can have any desired shape capable of at least partially bounding chamber 30. For example, in some embodiments sidewall 20 need not be cylindrical but can have a variety of other transverse, cross sectional configurations such as polygonal, elliptical, or irregular. As illustrated in FIG. 8, for instance, a fluid purification system 10b is depicted having a rigid support housing 14 that comprises support housing 15c and 15d having a sidewall 20 with a square or rectangular transverse cross section. Sidewall 20 thus has flat sides. Other features, elements, and/or aspects of support housing 15c and 15d can be substantially the same as support housing 15a and 15b described herein.

Returning to FIG. 1, it is appreciated that each support housing 15 can be scaled to any desired size. For example, it is envisioned that support housing 15 can be sized so that chamber 30 can hold a volume of less than 50 liters or more than 1,000 liters or any volume therebetween. Support housing 15 is typically made of metal, such as stainless steel, but can also be made of other materials capable of withstanding the applied loads of the present disclosure.

Support housings 15 can also have one or more openings 46 formed on sidewall 20 and floor 26. Opening(s) 46 provide access to container assembly 12 to enable various external gas lines, fluid lines, probes, and/or sensors to couple with container assembly 12 (e.g., when container assembly 12 is within support housings 15).

In certain embodiments, support housings 15a and 15b (and support housings 15c and 15d) can be mirror images of one another. One will appreciate, however, that differences in the configuration, location, and number of various elements can differ between housing members without departing from the scope of this disclosure.

Container Assembly

Figure 2:
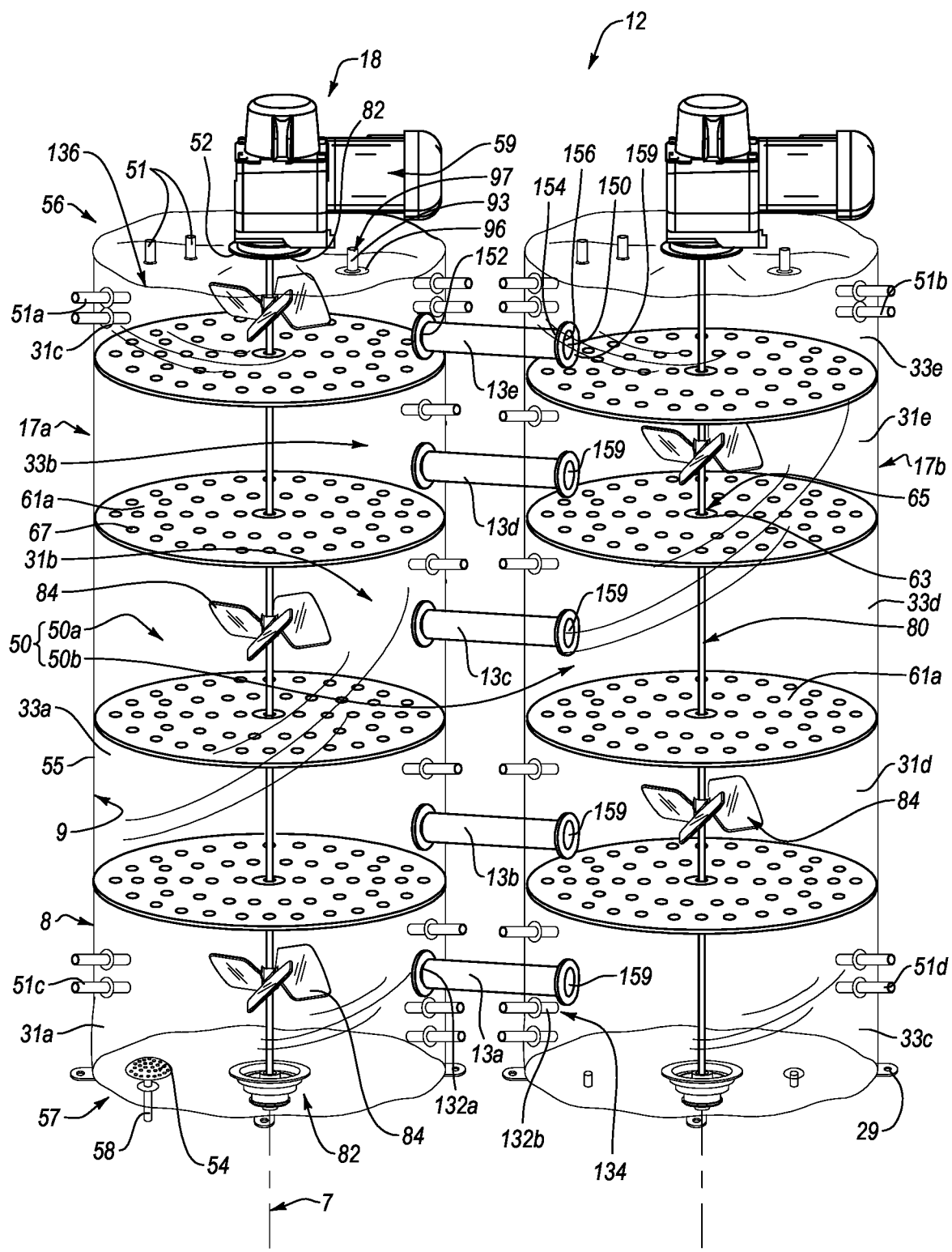
FIG. 2 is a perspective view of a container assembly coupled with a mixer system of the sample purification system of FIG. 1.

As illustrated in FIG. 1, fluid processing system 10a includes container assembly 12 disposed at least partially within support housings 15. As depicted in FIG. 2, container assembly 12 comprises first sub-container 17a, a second sub-container 17b, and a plurality of conduits 13a-e extending therebetween.

Sub-containers 17a and 17b are substantially identical to each other (typically the mirror image of each other) and like elements are identified by like reference characters. Each sub-container 17 has a sidewall 55 that extends from an upper end 56 to an opposing lower end 57. Each sub-container 17 also has exterior surface 8 and an interior surface 9. Interior surface 9 bounds a sub-compartment 50 in which a portion of mixer system 18 is disposed.

As will be discussed below in further detail below, each sub-compartment 50 can comprise at least portions of one or more mixing zones 31 and one or more settling zones 33 with mixing zones 31 being in fluid communication with settling zones 33. For instance, sub-compartment 50a of sub-container 17a can have a plurality of alternating mixing zones 31a-c and settling zones 33a and 33b extending between lower end 57 and opposing upper end 56 while sub-compartment 50b of sub-container 17b can have a plurality of alternating mixing zones 31d and 31e and settling zones 33c-33e extending between lower end 57 and opposing upper end 56.

The alternating zones can be in a vertical or partially vertical orientation or can otherwise alternate along a fluid flow path within sub-compartments 50. In the depicted embodiment, mixing zones 31 of sub-container 17a are horizontally aligned with a settling zone 33 of sub-container 17b and settling zones 33 of sub-container 17a are horizontally aligned with a mixing zone 31 of sub-container 17b.

One will appreciate that horizontally arranged and/or tandem, side-by-side, mixer/settler systems are also contemplated herein. Accordingly, the alternating mixing and settling zones can be arranged in any suitable manner, including along one or more sample or fluid flow paths within or between one or more compartments, containers, sub-containers, and/or container assemblies.

In at least one embodiment, a settling zone can comprise any area of a fluid processing system that is at least partially shielded from one or more mixer elements. For instance, a settling zone can comprise a space in between mixer elements where there is less shear force, turbulence, or the like from the agitating mixer elements. In some embodiments, a settling zone can comprise any space of the fluid processing system where the coalescence of dispersed phase droplets is enhanced relative to another area. Such other area (where coalescence of dispersed phase droplets is reduced relative to the settling zone/space) can be termed a mixing zone in at least one embodiment. In one or more embodiments, a mixing zone has a mixer element disposed at least partially therein.

Sub-container 17 can comprise one or more transparent, translucent, or opaque materials and can have ultraviolet light or other inhibitory properties (e.g., inhibitors incorporated therein). In certain embodiments, the method of use can determine the material used to form sub-container 17. In the depicted embodiment, each sub-container 17 can be comprised of a flexible polymeric sheet or film which allows for single-use and/or disposable applications of container assembly 12 but which can require container assembly 12 to be used with rigid support housings 15. For example, each sub-container 17 can be comprised of a flexible, water impermeable material such as a low-density polyethylene or other polymeric sheets or film having a thickness in a range between about 0.1 mm to about 5 mm with about 0.2 mm to about 2 mm being more common. Other thicknesses can also be used. The material can be comprised of a single ply material or can comprise two or more layers which are either sealed together or separated to form a double wall container. Where the layers are sealed together, the material can comprise a laminated or extruded material. The laminated material comprises two or more separately formed layers that are subsequently secured together by an adhesive.

In at least one embodiment, sub-container 17 can comprise an extruded material that has been assembled, fabricated, welded, or otherwise formed into sub-container 17. The extruded material can comprise a single integral sheet that comprises two or more layers of different materials that can be separated by a contact layer. All of the layers can be simultaneously co-extruded. One example of an extruded material that can be used in the present disclosure is the HyQ CX3-9 film available from Life Technologies Corporation out of Logan, Utah. The HyQ CX3-9 film is a three-layer, 9 mil cast film produced in a cGMP facility. The outer layer can is a polyester elastomer coextruded with an ultra-low density polyethylene product contact layer. Another example of an extruded material that can be used in the present disclosure is the HyQ CX5-14 cast film also available from Life Technologies Corporation. The HyQ CX5-14 cast film comprises a polyester elastomer outer layer, an ultra-low density polyethylene contact layer, and an EVOH barrier layer disposed therebetween.

The material can also be capable of maintaining a solution, sample, or fluid in a sterile condition. In such an embodiment, the material can also be sterilizable such as by (gamma) radiation, autoclaving, washing, etc. Other embodiments can include material and/or elements capable of be cleaned and used in aseptic fashion (though not (entirely) sterilized). Examples of materials that can be used in different situations are disclosed in U.S. Pat. No. 6,083,587 which issued on Jul. 4, 2000 and United States Patent Publication No. US 2003-0077466 A1, published Apr. 24, 2003, the entire disclosure of each of which is hereby incorporated by specific reference.

In at least one embodiment, each sub-container 17 can comprise a polymeric bag configured, fabricated, formed, and/or made in a columnar configuration. In one embodiment, sub-container 17 comprise a two-dimensional pillow style bag wherein two sheets of material are placed in overlapping relation and the two sheets are bounded together at their peripheries to form the internal compartment. Alternatively, a single sheet of material can be folded over and seamed around the periphery to form the internal compartment 50. In another embodiment, sub-containers 17 can be formed from a continuous tubular extrusion of polymeric material that is cut to length and is seamed closed at the ends.

In still other embodiments, each sub-container 17 can comprise a three-dimensional bag that not only has an annular side wall but also a two dimensional top end wall and a two dimensional bottom end wall. Three dimensional containers comprise a plurality of discrete panels, typically three or more, and more commonly four or six. Each panel is substantially identical and comprises a portion of the side wall, top end wall, and bottom end wall of the container. Corresponding perimeter edges of each panel are seamed together. The seams are typically formed using methods known in the art such as heat energies, RF energies, sonics, or other sealing energies.

In alternative embodiments, the panels can be formed in a variety of different patterns. These and other techniques for forming, fabricating, manufacturing, building, assembling, and/or welding containers suitable for embodiments of the present disclosure are known in the art. Thus, specific steps and conditions for forming the same need not be delineated in detail. Further disclosure with regard to one method of manufacturing three-dimensional bags is disclosed in United States Patent Publication No. US 2002-0131654 A1, published Sep. 19, 2002, the entire disclosure of which is hereby incorporated by reference.

In an alternative embodiment sub-container 17 can be comprised of a glass, thermoplastic, resin, stainless steel, aluminum, or other rigid or semi-rigid material(s) that enables sub-container 17 to be sufficiently rigid that it is self-supporting, i.e., it does not collapse under its own weight. As such, sub-container 17 can be used without necessarily being placed or inserted in rigid support housings 15.

It will also be appreciated that each sub-container 17 can be manufactured to have virtually any desired size, shape, and configuration. For example, sub-container 17 can be formed having a compartment sized to 10 liters, 30 liters, 100 liters, 250 liters, 500 liters, 750 liters, 1,000 liters, 1,500 liters, 3,000 liters, 5,000 liters, 10,000 liters or other desired volumes. The size of the sub-compartment 50 can also be in the range between any two of the above volumes. Although sub-containers 17 can be any shape, in one embodiment each sub-container 17 is specifically configured to be complementary or substantially complementary to chamber 30 of support housings 15 (see FIG. 1). It can also be desirable in some embodiments that when sub-container 17 is received within chamber 30, sub-container 17 is at least generally uniformly supported by support housing 15.

Returning now to FIG. 2, conduits 13 extend between sub-containers 17a and 17b so as to facilitate fluid communication between sub-containers 17. More specifically, each conduit 13 extends between a mixing zone 31 of sub-container 17a and a settling zone 33 of sub-container 17b or between a settling zone 33 of sub-container 17a and a mixing zone 33 of sub-container 17b so as to facilitate fluid communication between zones 31 and 33. Thus, a fluid sample disposed within mixing zone 31a of sub-container 17a can flow into settling zone 33c of sub-container 17a via conduits 13a and vice versa. Conduits 13 can extend laterally and/or radially from outer wall 55 of sub-containers 17.

One will appreciate, however, that conduits 13 can also comprise a settling zones. In some embodiments, a conduit 13 and its corresponding, adjacent settling zone 33 can comprise a single settling zone. Thus, in at least some embodiments, fluid processing system 10 can comprise a plurality of alternating mixing zones and settling zones.

Each conduit 13 has an interior surface 150 that extends between a first end 152 and an opposing second end 154. Interior surface 150 bounds a fluid path 156 through which fluid flows through conduit 13. In some embodiments, fluid path 156 of conduit 13 can comprise at least a portion a settling zone. Conduits 13 can be comprised of a rigid, semi-rigid, and/or flexible material(s). For example, in some embodiments conduits 13 (or portion(s) thereof) can comprise a rigid material such as glass, polymeric, plastic, or resin material that is self-supporting so as to retain a structural form or configuration. In other embodiments conduits 13 can be comprised a flexible material such that conduits 13 can be folded over, bent or otherwise collapsed without plastic deformation. For example, conduit 13 can comprise flexible tubing or hose. Conduits 13 can also be formed from polymeric sheets or film such as the same material as discussed above with regard to sub-containers 17. In some embodiments, one portion of conduit 13 can be formed from a rigid material while another portion can be formed from a flexible material.

Conduits 13 can be cylindrical as illustrated. However, conduits 13 can also have a transverse cross sectional configuration other than circular such as oval, oblong, polygonal or have other geometric or other non-curved configurations. Conduits 13 can also change configuration along their length. For example, opposing ends of a conduit 13 may be cylindrical while a central portion has a square, rectangular, polygonal or other configuration having one or more flat sides to two or more opposing flat sides for attaching, aligning, or otherwise engaging with of one or more acoustic settlers 16. Substantially or entirely non-curved (e.g., square, etc.) conduit 13 is also contemplated herein.

In at least one embodiment, conduit 13 can provide at least one surface (or portion thereof) that is sufficiently rigid such that the transverse cross section of the conduit at that location does not change under the operating conditions of fluid purification system 10. The use of acoustic waves requires precise configuration and calibration in order to effectuate active droplet coalescence, and eventually phase settling or separation, at standing wave nodes. Flexible or semi-flexible materials can cause inconsistent results when an acoustic wave is applied therethrough. In addition, the rigid nature, structure, and/or configuration of (at least a portion of) conduit 13 allows for stable mounting, connecting, and/or attachment of one or more acoustic settlers 16 thereto.

The diameter, length, width, cross-section, or other appropriate measurement of conduit 13 can also vary from one embodiment to another. For instance, in some embodiments, conduit 13 can have a maximum diameter of less than 30 cm, less than 25 cm, less than 20 cm, less than 15 cm, less than 12 cm, less than 10 cm, less than 7 cm, less than 5 cm, less than 2 cm, less than 1 cm, between 0.5 cm and 30 cm, between 1 cm and 20 cm, between 5 cm and 18 cm, or between 10 cm and 15 cm. In some embodiments, conduit 13 can have a maximum diameter larger than 30 cm (e.g., 35 cm, 40 cm, 45 cm, 50 cm, 60 cm, 70 cm, 80 cm, 90 cm, 1 m, 2 m, 5 m, 10 m, etc.). Furthermore, in at least one embodiment, the diameter of conduit 13 can change along the length thereof.

In some embodiments, the size or the diameter of conduit 13 is selected to optimize the efficacy of the acoustic wave on the fluid within conduit 13. Conduits too large can decrease the efficiency of the settling produced by the acoustic wave. Conduits too small can induce turbulent flow and impede trapping of droplets in the acoustic wave. One will appreciate that reference to a diameter in circular or cylindrical embodiments can be interpreted as a length, width, cross-section, or other appropriate measurement in other embodiments without departing from the scope of this disclosure. Although conduits 13 can be any desired length, conduits 13 typically have a length in a range between about 10 cm to about 100 cm with about 20 to about 60 cm being more preferred. Other lengths can also be used.

Conduits 13 can be connected to sub-containers 17 in a variety of different ways. In the depicted embodiment, ports 132 (such as ports 132a and 132b) having an opening 134 extending therethrough can be mounted on sub-containers 17a and 17b at desired locations so as to communicate with mixing zones 31 and settling zones 33. Ports 132 can comprise any type of tubular fitting, such as a conventional barb port, tube port, or the like which can connect to sub-containers 17, such as by welding, adhesive or other traditional techniques and to which conduits 13 can connect, typically by press fit, friction fit, threaded connection, crimping, clamp or the like. Ports 132 typically comprise a tubular stem having a radially encircling flange the connects to sub-containers 17. Opening 134 extending through the stem can be circular or have a polygonal, oval, irregular or other transverse cross section. Alternatively, opposing ends of conduits 13 can be directly connected to sub-containers 17 such as by welding, adhesive, or the like.

In view of the foregoing, container assembly 12 bounds a sample purification compartment 136. Compartment 136 comprises sub-compartment 50a of sub-container 13a, sub-container 50b of sub-container 13b, and fluid path 156 of each conduit 13.

Container assembly 12 also includes a plurality of ports 51 having an opening extending therethrough and disposed on each sub-container 17 in fluid communication with sub-compartments 50. In the depicted embodiment, each port 51 comprises a fitting such as a barb port, tube port or other conventional port that connects that sub-container 17 so as to communicate with sub-compartment 50. Ports 51 can have the same configuration as ports 132. Any number of ports 51 can be mounted on sub-containers 17 at any desired number of locations such as upper end 56, lower end 57, and/or along sidewall 55. Ports 51 can align with openings 46 on rigid support housing 15 (see FIG. 1) so that ports 51 can be easily accessed.

Ports 51 can have the same configuration or different configurations and can be used for a variety of different purposes. For example, ports 51 can be used for delivering the liquid phases to be processed into the sub-containers 17 and for removing the processed liquid phases from the sub-containers. For example, port 51*a* located at the upper end 56 of sub-container 50*a* can comprise a first inlet while port 51*b* located at the upper end 56 of sub-container 50*b* can comprise a first outlet.

Likewise, port 51*c* located at the lower end 57 of sub-container 50*a* can comprise a second inlet while port 51*d* located at the lower end 56 of sub-container 50*b* can comprise a second outlet, the inlets and outlets all being in fluid communication with the sample purification compartment 136. It will be appreciate, however that inlet, outlet, and/or other ports need not be located at upper end 56 and/or lower end 57. For instance, certain ports 51 can be located at one or more intermediate locations (e.g., along sidewall 55). Thus, ports 51 can be used for delivering the liquid phases to be processed directly into phase mixing and/or phase settling zones. Ports 51 can also be used for delivering other fluids such as media, cultures, mixtures, reagents, and/or other components into and out of sample purification compartment 136.

Ports 51 can also be used for coupling one or more probes to sub-containers 17. For example, ports 51 can be used for coupling a probe, such as temperatures probe, pH probe, dissolved oxygen probe, or the like. In at least one embodiment, port 51 can include a stem 93 bounding a channel 97 extending therethrough and having a mounting flange 96 encircling and radially outwardly projecting therefrom. Mounting flange 96 can be welded or otherwise secured to sub-container 17.

In one embodiment, a sparger 54 can be mounted on the upper and/or lower end of sub-container 17*a* for sparging a phase liquid into sub-container 17*a*. Sparger 54 can comprise a fritted, perforated, gas permeable or other conventional sparger that will disperse or "bubble" the phase liquid as it is dispensed onto sub-container 17*a*, e.g., dispenses the phase liquid in small droplets or bubbles into sub-container 17*a*. Smaller droplets can increase the speed of purification as the molecule of interest is more efficiently moved from the first phase into the second phase. Without being bound to theory, the high surface area to volume ratio of the small droplets can increase the efficiency of molecule transfer. Thus, in one embodiment, sparger 54 can comprise a first and/or second phase inlet to sample purification compartment 136.

Examples of sparger 54 and how they can be used in embodiments of the present disclosure are disclosed in United States Patent Publication No. 2006-0270036, published Nov. 30, 2006 and United States Patent Publication No. 2006-0240546, published Oct. 26, 2006, the entire disclosure of each of which is incorporated herein by specific reference.

Sample purification compartment 136 can be sealed closed and container assembly 12 sterilized, such as by radiation, so that it can be used for processing sterile fluids. During use, container assembly 12 can be disposed within chambers 30 of support housing 15, as depicted in FIG. 1, so that conduits 13 are openly exposed and extend between support housings 15*a* and *b*. Container assembly 12 can subsequently be disposed of following a single use and then replaced with a new container assembly. In at least one embodiment, however, container assembly 12 can be used more than one time for fluid processing and then removed from support housings 15 for disposal. One will also appreciate that container assembly 12 can also be reusable and/or comprised of a washable and/or sterilizable material.

Shielding Elements

Shielding elements 61 can be disposed within sub-compartments 50 of sub-containers 17. Shielding elements 61 can serve a variety of functional purposes and have a variety of structural configurations. For instance, as depicted in FIG. 2, shielding element 61 can assist in the separation between mixing zones 31 and settling zones 33 and at least partially control the flow of a fluid sample within container assembly 12. In other embodiments discussed below, shielding element 61 can assist in the separation between mixing zones 31. Shielding elements 61 can also be configured to encourage fluid flow in one or more directions and/or restrict fluid flow in one or more different directions within container assembly 12.

Shielding element 61 can comprise a baffle, barrier or other turbulence-calming or fluid-obstructing element. In one embodiment, settling zone 33 comprises a portion of a sub-compartment 50 or sample purification compartment 136 that is bounded by at least one shielding element 61 and is devoid of a mixing element disposed directly therein or a mixing element that directly mixes the fluid therein. Settling zone 33 can be bounded between two shielding elements 61, between one shielding element and the wall of sub-container 17 or between a shielding element 61 and some other structure within sub-compartment 50 or sample purification compartment 136.

Likewise, mixing zone 31 comprises a portion of a sub-compartment 50 or sample purification compartment 136 that is bounded by at least one shielding element 61 and has a mixing element disposed directly therein or a mixing element that directly mixes the fluid therein. Mixing zone 31 can be bounded between two shielding element 61, between one shielding element and the wall of sub-container 17 or between a shielding element 61 and some other structure within sub-compartment 50 or sample purification compartment 136. In this and in other embodiments disclosed herein, it is appreciated that any number of mixing zones and settling zones can be used. For example, a sample purification system may have been 2 and 60 mixing zones and settling zones (each) but more commonly between 2 and 20 or between 2 and 10. Other numbers can also be used.

The lack of a mixing element within settling zone 33 combined with the calming influence or barrier effect of shielding elements 61 can allow for the settling of a fluid sample within settling zones 33. In one embodiment, fluid path 156 within conduit 13 can be considered a settling zone that is either independent or can be combined with settling zone 33 to form a larger settling zone. For instance, fluid path 156 can also be shielded from the agitating influence of mixing elements by virtue of its size or configuration and/or by placing smaller shielding elements 61 at or near the opening(s) of conduit 13. Thus, in some embodiments, a settling zone can comprise a portion of sub-compartment 50 devoid or free of a mixing element 84 and/or at least a portion of fluid path 156 of conduit 13. In other embodiments fluid path 156 of conduits 13 can be considered separate from either settling zone 33 or mixing zone 31.

Turning to FIG. 6A-6E, shielding element 61 can comprise a body 71 having opposing faces 138 and 140 that extend to a perimeter edge 142. Body 71 can comprise a panel wherein opposing faces 138 and 140 are substantially flat and are substantially parallel to each other. In other embodiments, faces 138 and 140 need not be flat but can be contoured or otherwise configured or have members attached thereto that enhance damping or mixing. One or more spaced apart openings 67 extend between faces 138 and 140 for allowing fluid to pass therethrough. In at least one embodiment, the openings 67 can be sized according to the ratio of light phase to heavy phase in the fluid mixture in order to accomplish or effectuate control over the flow of the mixture (or phases thereof) within container assembly 12.

Shielding element 61 can also include one or more additional openings 65 for receiving at least a portion of mixer system 18 therein. For example, as discussed below in more detail, a rotatable hub 63 having opening 65 extending therethrough can be centrally mounted on body 71. A bearing can be positioned between hub 63 and body 71 to permit free rotation of hub 63.

Shielding element 61 can be formed of a rigid, semi-rigid, or flexible material and can be made in any suitable size. For example, the material could be a metal, glass, plastic or the like that is self-supporting. In other embodiments, shielding element 61 can be comprised of flexible polymeric sheet or film such as those used to form sub-containers 17 as discussed above. In at least one embodiment, shielding element 61 comprises a circular disk configured and sized to fit snuggly within sub-compartment 30. Thus, the diameter of shielding element 61 can be equal to or substantially the same as the diameter of sub-compartment 30 (or a sub-container thereof). Shielding element 61 can also have a smaller or larger diameter than container 12 without departing from the scope of this disclosure. In at least one embodiment, a shielding element 61 can be position within or adjacent to an opening of conduit 13 (see FIG. 2). Thus, shielding element 61 can also have a diameter equal to, greater than, less than, or substantially similar to the diameter of conduit 13.

Shielding elements 61 are typically secured to sub-container 17 by being welded thereto. For example, perimeter edge 142 can be welded to the interior surface of sub-container 17 or sub-container 17 can be formed form discrete sections which are welded to the opposing faces 138 and 140 of shielding elements 61 adjacent to perimeter edge 142. Other techniques for attaching can also be used.

Opening 67 of shielding elements 61 can comprise a pore, apertures, and/or void in body 71. For instance, shielding element 61*a* can include openings 67*a*, comprising small, pore-like openings in body 71, while a shielding element 61*b* can comprise openings 67*b*, which are larger than openings 67*a*. A shielding element 61*c* can comprise a circular opening 67*c*, and a shielding element 61*d* can comprise crescent openings 67*d* and 67*e*. Thus, the openings 67 can be all the same size and shape or can be different sizes and/or shapes. Opening 67*d*, as with other openings 67, can have a filter 69, such as a screen, baffling, filter or the like, aligned with or disposed therein which can be configured to reduce or inhibit fluid flow through opening 67*d*.

Opening(s) 67 can be positioned or disposed at any suitable location in or about body 71. For instance, opening(s) 67 can be positioned around the peripheral edge of body 71, adjacent to the center of body 71, or at another suitable location or position. A guard can be used in association with each or select openings 67 to further shield settling zone 33 from the turbulence created by mixing element 84 in mixing zone 31. For instance, a guard may be applied to one or more openings 67 to prevent or slow a mixed region of the first and second fluid from being drawn into the respective outlets of fluids three or four, as discussed in further detail below. The guard may also be applied to hold a thicker or more-dense layer of fluid three or four within the settling zone in order to improve settling of mixture of fluids one and two into fluids three and four, or transfer of the product or contaminant molecule therebetween.

Figure 17A:
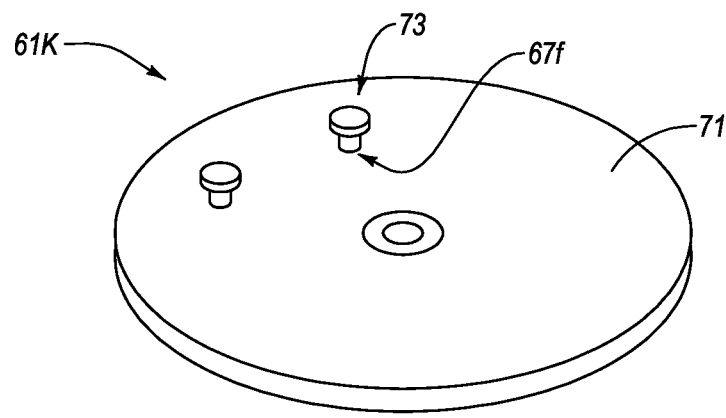
FIG. 17A is a perspective view of another shielding element according to an embodiment of the present disclosure.
Figure 17B:
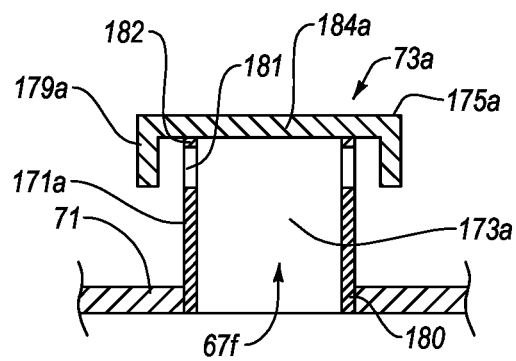
FIG. 17B is a cross-sectional view of a component of the shielding element of FIG. 17A.
Figure 17C:
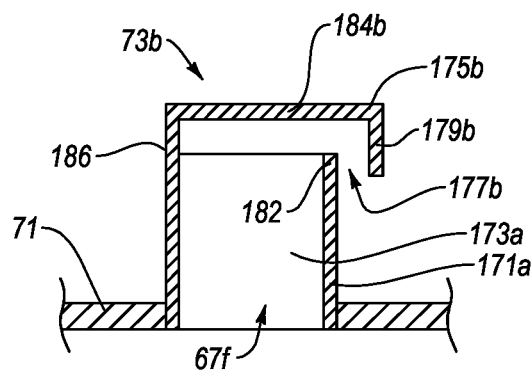
FIG. 17C is a cross-sectional view of another component suitable for use in the shielding element of FIG. 17A.

For example, as illustrated in FIGS. 17A-17C, a shielding element 61*k* comprises body 71 having one or more guards 73 covering or associated with one or more openings 67*f*. Guards 73 can be configured to further shield settling zone 33 from the turbulence created by mixing element 84 in mixing zone 31. For instance, FIG. 17B illustrates a guard 73*a* having a tubular stem 171*a* that bounds a channel 173*a* and is aligned with opening 67*f*. Stem 171*a* extends from a first end 180 secured to body 71 and an opposing second end 182. A plurality of radially spaced apart openings 181 laterally extend through stem 171*a* at second end 182.

Guard 73*a* also includes a cap 175*a* that having a top 184*a* and an annular weir 179*a* that projects therefrom. Top 184*a* is secured to second end 182 of stem 171*a* so as to close channel 173*a* thereat. Weir 179*a* projects from top 184*a* at a perimeter edge thereof back towards body 71. Weir 179*a* is spaced apart from stem 171*a* but projects past openings 181 so that fluid passing through openings 181 must travel around weir 179*a* before it can rise. In this configuration, guard 73*a* forms a shield between adjacent mixing and settling zones. Furthermore, turbulent fluid entering through opening 67*f* can be calmed as it is forced to change direction by traveling laterally through openings 181 and then around weir 179*a* to exit guard 73*a*.

FIG. 17C illustrates an alternative embodiment of guard 73*b*. Specifically, guard 73*b* comprises stem 171*a* having channel 173*a* but lateral openings 181 have been removed. A cap 175*b* includes a leg 186 that upstands from second end 182 of stem 171*a*, a top 184*b* that extends from leg 186 and passes over second end 182 of stem 171*a* and a weir 179*b* that is spaced apart from stem 171*a* but projects from a perimeter of top 184*b* past second end 182 of stem 171*a* back toward body 71. Again, guard 73*b* forms a shield between adjacent mixing and settling zones. Furthermore, turbulent fluid entering through opening 67*f* can be calmed as it is forced to change direction by traveling along the tortuous path through guard 73*b*. It is appreciated that guards 73 can come in a variety of different configurations which each form a non-linear flow path through which the fluid can flow.

Figure 18:
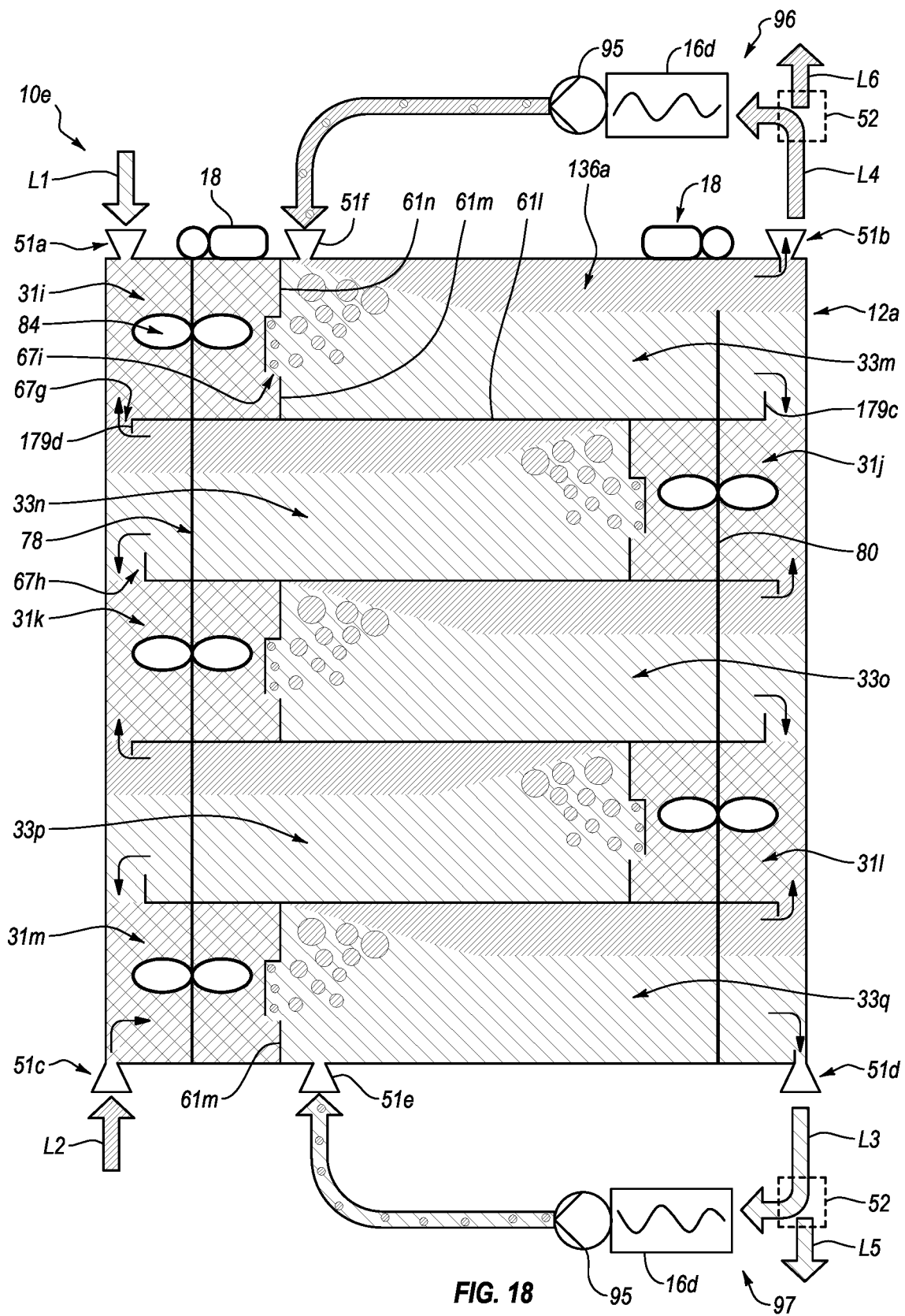
FIG. 18 is a schematic representation of another embodiment of a sample purification system according to an embodiment of the present disclosure.

As illustrated in FIG. 18, an alternative shielding element 611 can comprise one or more (vertical) weirs 179*c*, 179*d* (e.g., extending from one or more of the surfaces thereof). Weir 179*c* can extend (upwardly) from an upper surface shielding element 611 and/or weir 179*d* can extend (downwardly) from a lower surface of shielding element 611. Weir 179*c*, 179*d* can have a length that extends from a first side of shielding element 611 to or towards a second side of shielding element 611 and can comprise any suitable height. For instance, weir 179*c*, 179*d* can extend entirely across a portion of shielding element 611 (e.g., such that weir 197*c*, 179*d* corresponds to a secant line or cord of a circular shielding element 611). Accordingly, when shielding element 611 is disposed within container 12*a*, weir 179*c*, 179*d* can extend (entirely) across a portion of the container (e.g., from a first portion of the side wall to a second portion of the side wall. Thus, weir 179*c*, 179*d* can comprise a (partial) barrier. Weir 179*c*, 179*d* can also extend across non-circular containers 12*a*.

The height of weir 179*c*, 179*d* can be up to about half the distance between shielding element 611 and an adjacent shielding element in at least one embodiment. For instance, as illustrated in FIG. 18, shielding elements 611 can be separated by a distance. Thus, in certain embodiments, the height of weir 179*c*, 179*d* can correspond to or be less than or equal to 50% of the separation distance. In at least one embodiment, weir 179*c*, 179*d* can enhance settling by forcing a (coalesced and/or coalescing, heavy or light) phase to pool up behind weir 179c, 179d before flowing over weir 179c (or under weir 179d) in order to pass through opening 67g or 67h, respectively. Specifically, opening 67g can comprise an upward flow path opening for a light phase and/or opening 67h can comprise a downward flow path opening for a heavy phase. The pooling of a coalesced phase can allow small, dispersed phase droplets to coalesce more easily with the large, pooled body than with other small, dispersed phase droplets.

Weir 179c, 179d can be oriented upward or downward. In at least one embodiment, weir 179c, 179d can be oriented so as to cause pooling or collection of the dispersed phase. Thus, if the dispersed phase is the light(er) or less dense phase, weir 179d can be oriented downward such that a coalesced body of light phase is trapped behind weir 179d until the mass, size, and/or amount of the coalesced light phase exceeds the height of weir 179d. Once the mass, size, and/or amount of the coalesced light phase exceeds the height of weir 179d, the coalesced light phase can begin to flow (counter-currently) about or around (e.g., under) weir 179d in order to pass through opening 67g. Alternatively, a heavy dispersed phase can coalesce into a pooled body behind an upward oriented weir 179c until it flows over the top thereof and through opening 67h. Similarly, weir 179c, 179d can be oriented so as to cause pooling or collection of the continuous phase, whether lighter or heavier. It will be appreciated that weir 179c, 179d can also extend from one or more surfaces of container 12a (e.g., adjacent outlet port(s) 51d, 51d).

As further illustrated in FIG. 18, one or more vertically oriented shielding elements 61m, 61n can extend from one or more of the surfaces of shielding element 611 and/or container 12a. For instance, shielding element 61m can extend (upwardly) from an upper surface shielding element 611 and/or (upwardly) from a bottom interior surface of container 12a. Similarly, shielding element 61n can extend (downwardly) from a lower surface shielding element 611 and/or (downwardly) from an upper interior surface of container 12a. Unlike shielding elements 611, which comprise and/or provide a baffle between vertically separated mixing and settling zones, shielding elements 61m, 61n comprise and/or provide a baffle between horizontally separated mixing and settling zones.

Shielding elements 61m, 61n can be at least partially (vertically and/or horizontally) separated by a distance sufficient to form an opening 67i. Accordingly, a mixed (phase) sample (e.g., within mixing zone 31i) can be directed through opening 67i (e.g., into settling zone 33m). Opening 67i does not negate the functionality of shielding elements 61m, 61n in some embodiments. For instance, the configuration, orientation, and/or position of shielding elements 61m, 61n can maintain a shielding and/or baffling effect (e.g., between mixing zone 31i and settling zone 33m). Thus, a coalescing and/or settling phase sample (e.g., in settling zone 33m) can be shielded from turbulence and/or agitation (e.g., produced by mixing element 85 and/or in mixing zone 31i). Shielding elements 61m, 61n may also inhibit and/or substantially prevent coalescing and/or settling phase sample (e.g., in settling zone 33m) from flowing past shielding elements 61m, 61n and/or through opening 67i (e.g., (back) into mixing zone 31i).

Mixer System

Returning now to FIG. 1, fluid purification system 10 can include mixer system 18. Mixer system 18 can be designed or configured for mixing and/or suspending (or configured to and/or operable to mix and/or suspend) fluid within container assembly 12. Specifically, mixer system 18 can actively disperse droplets of a first phase through a surrounding second phase. In at least one embodiment, mixer system 18 can be designed or configured to reduce the droplet size to increase purification speed and/or efficiency. For instance, smaller droplet sizes can increase the transfer rate of a molecule of interest from a first phase into a second phase.

Mixer system 18 can include one or more drive motor assemblies 59 mounted on or coupled to support housings 15 via one or more bracket or other support members 53. In alternative embodiments, however, drive motor assembly 59 can be mounted on a separate structure adjacent to support housings 15 (not shown).

As will be discussed in further detail below, mixer system 18 can also include one or more mixer assemblies 78 (e.g., coupled to, disposed at least partially within, and/or projecting into sub-compartments 50) and one or more drive shafts (e.g., interfacing with and/or extending from drive motor assembly 59). As will also be discussed in further detail below, some other components of mixer system 18 can also be at least partially disposed in container assembly 12. For instance, FIG. 2 illustrates that portions of mixer system 18 can be disposed within container assembly 12 (or sub-compartments 50 thereof), while other components can be disposed outside container assembly 12 (or sub-compartments 50 thereof).

Figure 4A:
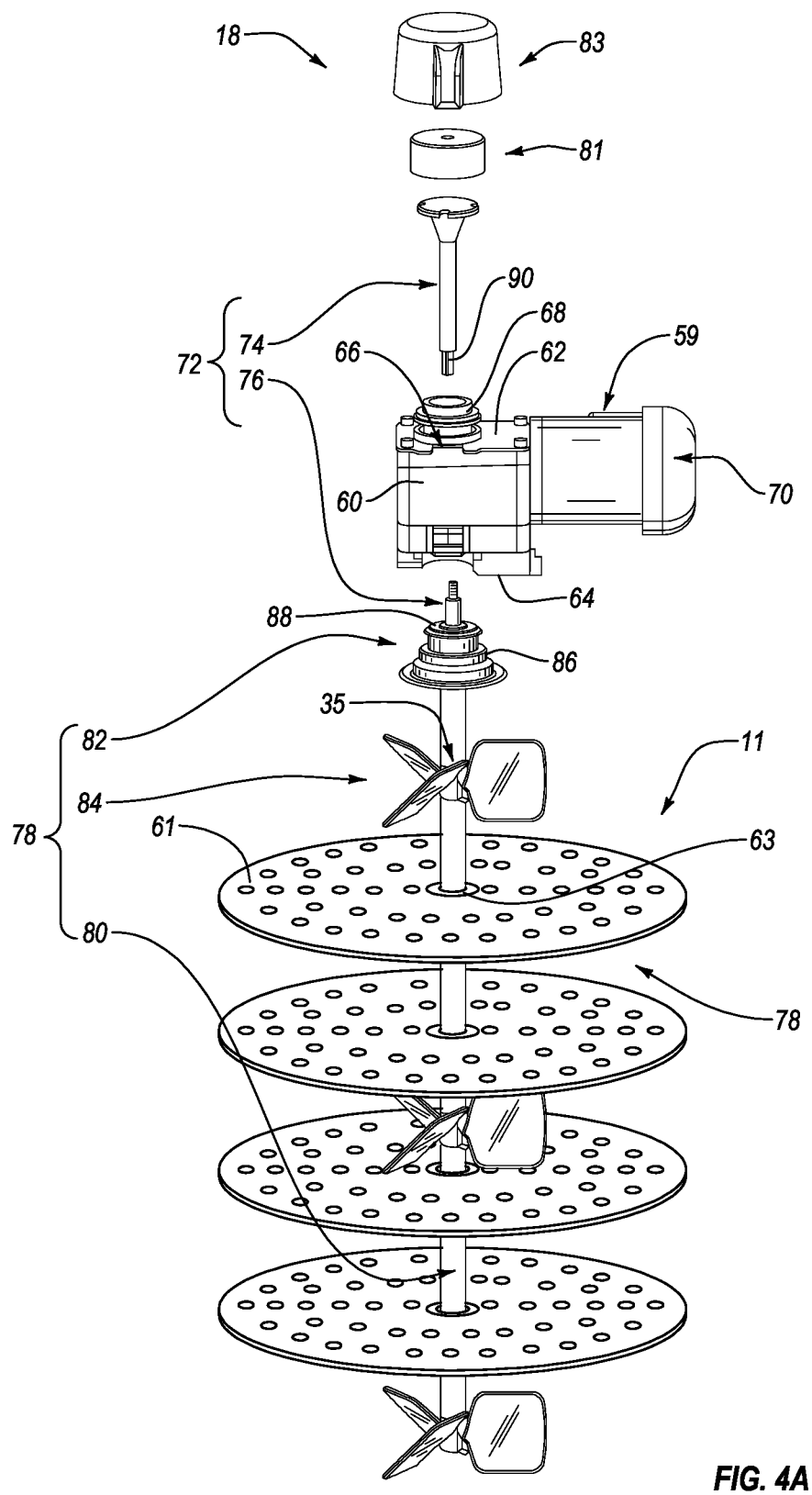
FIG. 4A is an exploded view of a mixer system shown in FIG. 2.

FIGS. 4 and 5 illustrate components of an exemplary mixer system 18 according to an embodiment of the present disclosure. Mixer system 18 can be used for mixing and/or suspending a fluid, mixture, or solution within container each mixing zone 31. As depicted in FIG. 4A, mixer system 18 generally comprises drive motor assembly 59, mixer assembly 78, and drive shaft 72, each of which will now be discussed in detail below.

Drive motor assembly 59 comprises a drive motor 70. In some embodiments, drive motor assembly 59 comprises a housing 60 having a top surface 62 and an opposing bottom surface 64 with an opening 66 extending through housing 60 between surfaces 62 and 64. A tubular motor mount 68 is rotatably secured within opening 66 of housing 60. Drive motor 70 can be mounted to housing 60 and engage with motor mount 68 so as to facilitate select rotation of motor mount 68 relative to housing 60. Drive motor assembly 59 can be configured to interface with mixer assembly 78 by means of drive shaft 72. Certain embodiments can also include gaskets, seals, rings, washers, and/or any other necessary component for coupling and/or operating drive motor assembly 59 or drive motor 70 thereof.

Figure 6A:
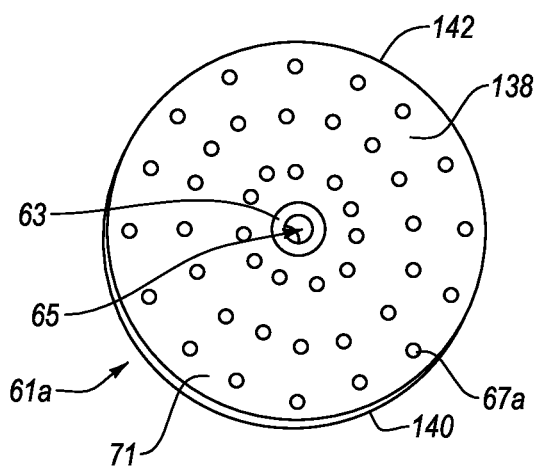
FIG. 6A is a perspective view of a shielding element according to an embodiment of the present disclosure.
Figure 6B:
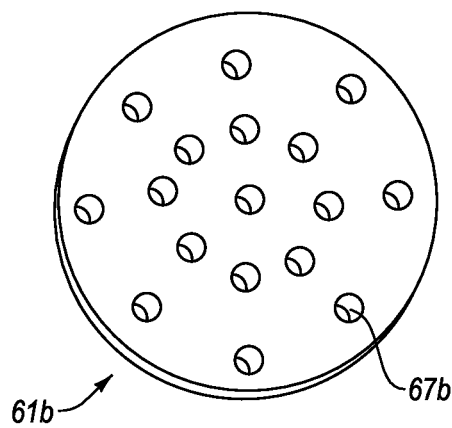
FIG. 6B is a perspective view of another shielding element according to an embodiment of the present disclosure.
Figure 6C:
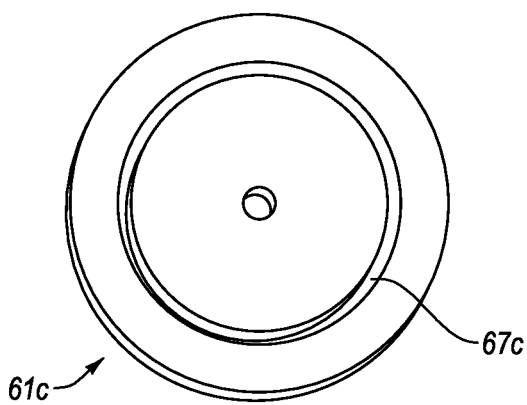
FIG. 6C is a perspective view of another shielding element according to an embodiment of the present disclosure.
Figure 6D:
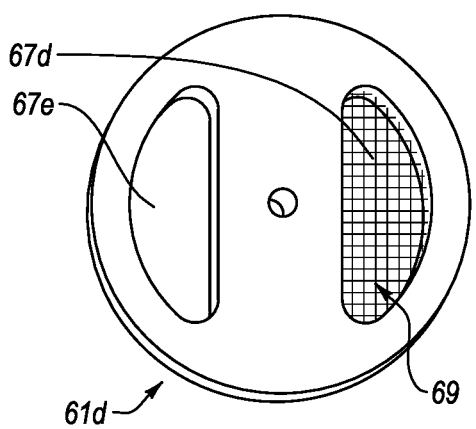
FIG. 6D is a perspective view of another shielding element according to an embodiment of the present disclosure.
Figure 6E:
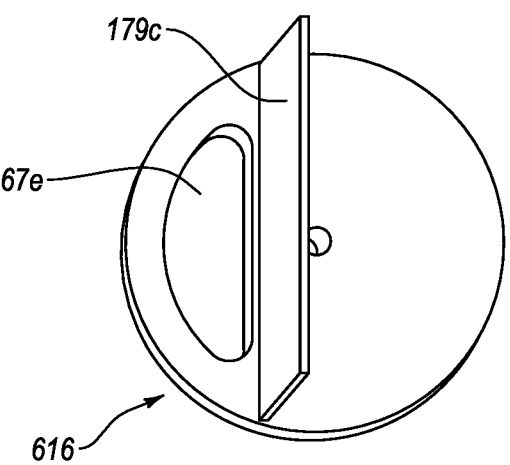
FIG. 6E is a perspective view of another shielding element according to an embodiment of the present disclosure.

Mixer assembly 78 can comprise an elongated tubular connector 80 having rotational assembly 82 secured to one or both ends thereof, and one or more mixing elements 84 secured to or along connector 80. Tubular connector 80 can comprise a rigid material that is self-supporting but is more commonly made from a flexible tube that can be folded over without plastic deformation. In at least one embodiment, elongated tubular connector 80 can comprise a plurality of separate elongated tubular connector portions that extend between and connect to opposing sides of mixing elements 84 and/or shielding elements 61. In other embodiments, elongated tubular connector 80 can comprise a unitary member that passes through mixing elements 84 and/or shielding elements 61. For example, tubular connector 80 can pass through or connect on opposing sides of hub 63 of each shielding element 61 (FIG. 6A). Other methods of attachment can also be used.

Figure 4B:
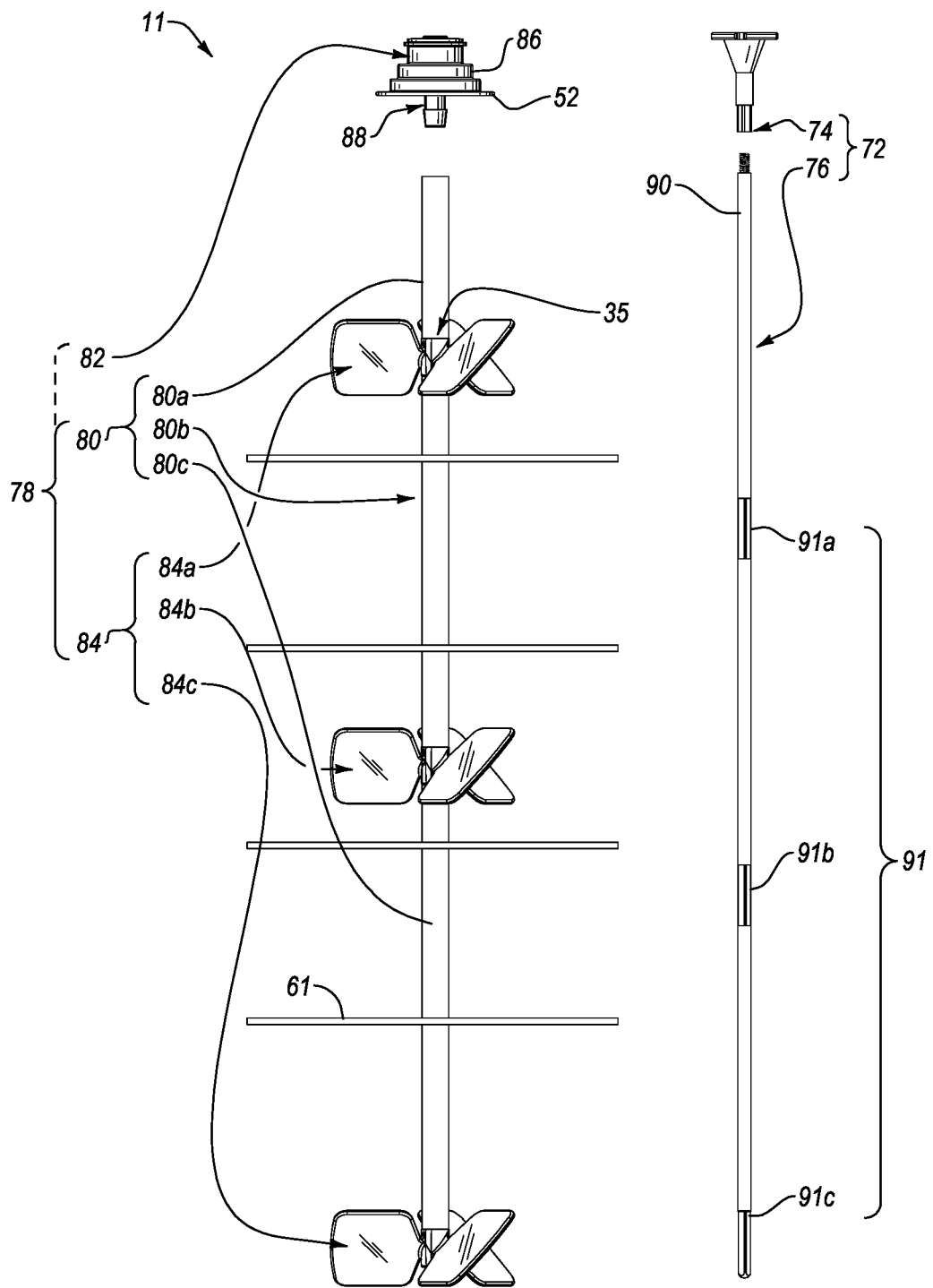
FIG. 4B is an exploded view of a mixer assembly of the mixer system of FIG. 4A.

As further illustrated in FIG. 4B, rotational assembly 82 of mixer assembly 78 can comprise an outer casing 86 and a tubular hub 88 that centrally extends through outer casing 86 and is rotatably coupled thereto. One or more dynamic seals can be formed between outer casing 86 and tubular hub 88 so that a sterile seal can be maintained therebetween. In contrast to static seals, dynamic seals allow relative motion between the mating surfaces being sealed. Dynamic O-ring seals, in particular, can be applied to a wide variety of embodiments described herein. Other dynamic seals include, but are not limited to reciprocating seals, floating pneumatic piston seals, rotary seals, oscillating seals, etc. In some embodiments, one or more bearings can also be disposed between outer casing 86 and tubular hub 88. Rotational assembly 82 (or outer casing 86 thereof) can be secured to sub-container 17 so that tubular connector 80, which is coupled with hub 88, extends into compartment 50 of container 12 (see FIG. 2).

In at least one embodiment, a rotational assembly 82 can be secured to the upper end 56 and lower end 57 of sub-container 17 with the opposing ends of tubular connector 80 connecting to the hubs 88 thereof (FIG. 2). As such, connector 80 can extend between the opposing end of sub-container 17. Alternatively, rotational assembly 82 can only be connected to upper end 56 with connector 80 coupled thereto. The opposing end of connector 80 is thus disposed within sub-container 17 spaced apart from lower end 57. (FIG. 4A).

Mixing element 84 can serve a variety of functional purposes and have a variety of structural configurations. For instance, an illustrative mixing element 84 can at least partially control the flow of a fluid sample within sub-container 17. Mixing element 84 can be configured to encourage flow in one or more directions and/or restrict flow in one or more different directions. Mixing element 84 can also agitate, emulsify, mix, combine, and/or blend together a plurality of fluids, samples, liquids, phases, mixtures, etc.

Mixing element 84 can comprise an impeller having one of more impeller blades or fins mounted thereon. Mixing element 84 also includes any other structure that can mix when rotated such as paddles, ribs, vanes or the like. Mixing elements 84 can be disposed and/or spaced along connector 80 such that mixing elements 84 are disposed within each mixing zone 31 of container assembly 12 and are not disposed within any settling zones 33. For instance, FIG. 2 illustrates a plurality of mixing elements 84 connected to connector 80 within compartment 50 of container 12. Mixing elements 84 are confined to mixing zones 31 and separated from settling zones 33 by shielding elements 61. FIG. 2 also illustrates a connector 50 extending between upper and lower rotational assemblies 82, connected to the upper and lower walls of container 12, respectively. FIG. 4A, on the other hand, illustrates a connector 80 that extends from an upper rotational assembly 82 and ends at a lower mixing element 84. Connector 80 can extend through an opening 65 in one or more shielding elements 61.

As illustrated in FIG. 4B, for example, mixing elements 84 can all have the same size. In an alternative embodiment, mixing elements 84 can have multiple sizes (e.g., smaller and/or larger mixer elements). In at least one embodiment, for instance, a smaller mixer element applies less mixing energy than a larger counterpart, given the same mixing speed. Thus, while all mixer elements can be rotated at the same speed, the amount of mixing energy to each mixing zone 31 can vary depending on the size of the mixing element 84 disposed therein.

In at least one embodiment, larger mixer element(s) can be included in the mixing zone(s) nearest the continuous phase and/or dispersed phase inlet and/or outlet. In other embodiments, smaller mixer element(s) can be included in the mixing zone(s) nearest the continuous phase and/or dispersed phase inlet and/or outlet. Some embodiments can include a progressive increase and/or decrease in the size of mixing elements along the (counter-current) flow path of the continuous phase and/or dispersed phase. Other embodiments can include mixing elements that increase and then decrease or decrease and then increase along the (counter-current) flow path of the continuous phase and/or dispersed phase.

In some embodiments, mixing element 84 can comprise one or more rotating members, oscillating members, vibrating members, stirring members, shaking members, and/or sonicating members. For instance, mixing element 84 can comprise a vertically agitated (or pulsed up and down) porous plate. Alternatively, mixing element 84 can comprise a flat, spinning disc. Accordingly, one will appreciate that mixing element 84 can comprise any suitable mixing means (e.g., known in the art and/or compatible with liquid-liquid extraction). As discussed in further detail below, mixing of an aqueous two-phase sample, for instance, can form an emulsion, suspension, or other fluid mixture of the two immiscible phases. Mixing can substantially increase the surface area-to-volume ratio for the contacts between the two phases to enhance transfer of a molecule of interest from one phase to the other. Indeed, vigorous mixing can further enhance efficient transfer in some embodiments by further reducing the surface area-to-volume ratio and/or mean droplet size of one or more phases. However, vigorous mixing can also form micro-droplets of one or more of the phases that can become trapped in the coalesced body of the other phase. Micro-droplet contamination by an opposite phase can increase the concentration of impurities or contaminants and/or decrease the yield of molecule of interest in certain embodiments. Accordingly, mixing speed can be a tightly-controlled parameter that effectuates a number of results.

Tubular connector 80 is configured to receive at least a portion of drive shaft 72 therein. As illustrated in FIGS. 4A and 4B, drive shaft 72 can comprise a head section 74 and a shaft section 76 that are either connected together or integrally formed as a single piece. A portion of drive shaft 72 (e.g., head section 74) can be configured to pass through motor mount 68 of drive motor assembly 59 (and thus through housing 60). FIG. 4B illustrates that head section 74 can include a drive portion 90 that engages with hub 88 of rotational assembly 82. Likewise, drive shaft 72 includes one or more drive portion 91a-c along the length thereof that engage mixing elements 84a, 84b, 84c, respectively, by forming a key-fit engagement. That is, drive portions 90 and 91 have a have a polygonal or other non-circular configuration that is received within a complementary channel within hub 88 and mixing elements 84. Other mechanisms for attaching can also be used. FIG. 4B also illustrates that connector 80 can comprise connector sections 80a, 80b, and 80c, having mixing elements 84a, 84b, 84c, respectively, connected thereto and/or disposed therebetween (e.g., at an interface or connection point 35).

With drive shaft 72 engaging mixing element(s) 84 and hub 88, rotation of draft shaft 72 facilitates rotation of hub 88, tubular connector 80 and mixing elements 84 relative to outer casing 86, sub-container 17 and shielding element 61. Mixer system 18 can also include a cap 81 for securing drive shaft 72 to motor mount 68 and a cover 83 for covering cap 81.

During use, container assembly 12 with mixer assemblies 78 secured thereto can be positioned within chambers 30 of support housings 15 as discussed above. Casing 86 of rotational assembly 82 is then be removably connected to bottom surface 64 of housing 60 of drive motor assembly 59 (e.g., so that hub 88 is aligned with motor mount 68). The distal end of drive shaft 72 can then be advanced down through motor mount 68, through hub 88 of rotational assembly 82, and through tubular connector 80 so that drive shaft 72 engages with each mixing element 84. In this assembly, activation of drive motor 59 causes rotation of drive shaft 72 which in turn cause rotation mixing elements 84.

With drive shaft 72 fully passed through motor mount 68, and head section 74 of drive shaft 72 engaging motor mount 68, drive motor 59 can be activated to facilitate rotation of motor mount 68. In turn, rotation of motor mount 68 facilitates rotation of drive shaft 72 which facilitates rotation of hub 88, connector 80, and mixing elements 84. Rotation of mixing element 84 facilitates mixing and suspension of the fluid within sub-compartments 50 of container assembly 12. Further disclosure with regard to mixer system 18, the operation thereof, and alternative embodiments thereof are disclosed in United States Patent Publication No. 2011-0188928 A1, published Aug. 4, 2011, the entire disclosure of which is incorporated herein by specific reference.

As will be appreciated, some of the above described embodiments can allow for certain components of mixer system 18 to be sealed within container assembly 12. In some embodiments, for example, container assembly 12 can have connector(s) 80, mixing elements 84, and/or shielding elements 61 (at least partially) disposed therein. Other components can also be disposed within container assembly 12. Inclusion of such components in container assembly 12 can allow for single-use or other disposable applications of container assembly 12. For instance, container assembly 12, connector 80, mixing elements 84, and/or shielding elements 61 can be comprised or formed of inexpensive, polymeric or other disposable material such that disposal of the same after one or more uses can be a cost-effective and time-saving approach. Accordingly, after said use(s), drive motor assembly 59, drive shaft 72, and acoustic settlers or assemblies 16 can be removed from their attachment to container 12. Container assembly 12 can also be removed from housing 14 (where applicable) and disposed of having connector 80, mixing elements 84, and/or shielding elements 61 still disposed therein.

The above described mixer system 18 and the alternatives thereto comprise one embodiment of means for mixing fluid contained within container assembly 12 and more specifically within mixing zones 31. In alternative embodiments, it is appreciated that mixer system 18 can be replaced with a variety of other mixing systems. For example, in some embodiments, mixer system 18 can permit rotation of the mixing elements without rotation of connector(s) 80. In other words, in certain embodiments, mixing elements 84 can be rotatable about an axis of rotation 7 while the connector(s) 80 and/or shielding elements 61 are in a substantially fixed position, are configured to remain substantially stationary, and/or are not rotatably connected to drive shaft 72 or any other component of mixer assembly 11, drive system 18, container 12, and/or fluid processing system 10.

In some embodiments, mixer system 18 can be replaced with a conventional rigid drive shaft that projects into container assembly 12 through a dynamic seal and has mixing elements 84 connected directly thereto. External rotation of the drive shaft thus facilitates rotation of mixing elements 84 which mix and/or suspends the fluid within container 12.

Figure 3:
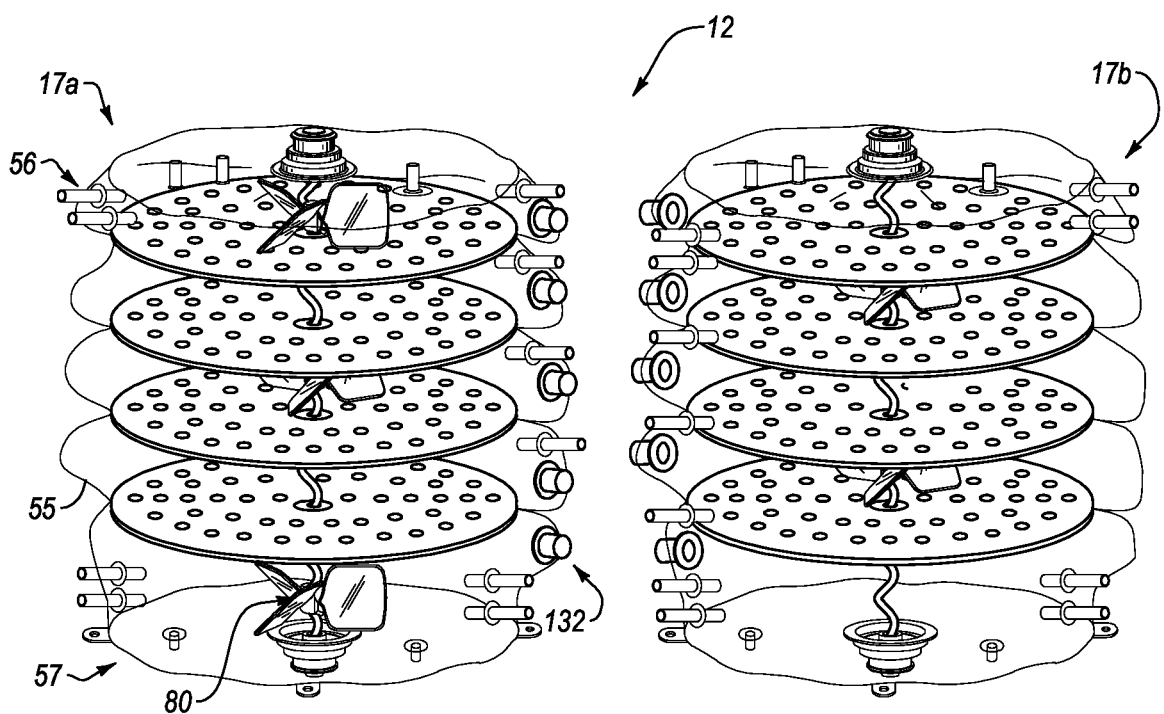
FIG. 3 is a perspective view of the container assembly of FIG. 2 in a collapsed configuration.

As indicated above, connector 80 and conduits 13 can be comprised of a flexible material while sub-containers 17 can comprise flexible bags. In this embodiment, container assembly 12 can be collapsed such as by being accordioned, rolled, and/or folded or the like. FIG. 3 illustrates container assembly 12 in a partially collapsed configuration according to an embodiment of the present disclosure. In collapsed embodiments, the upper end 56 and lower end 57 of container 12 are or can be brought into proximity to allow for the reduction of container height.

Collapsing of container assembly 12 can allow for reduced expense and/or effort in use, storage, shipping, and/or transporting container assembly 12. For instance, in a (fully) expanded configuration, container assembly 12 can be many meters in height (i.e., between upper end 56 and lower end 57). However, collapsible embodiments can reduce the height of container 12 by up to or greater than 10%, 20%, 30%, 40%, 50%, 60%, 70%, 80%, 90%, or more.

Figure 5A:
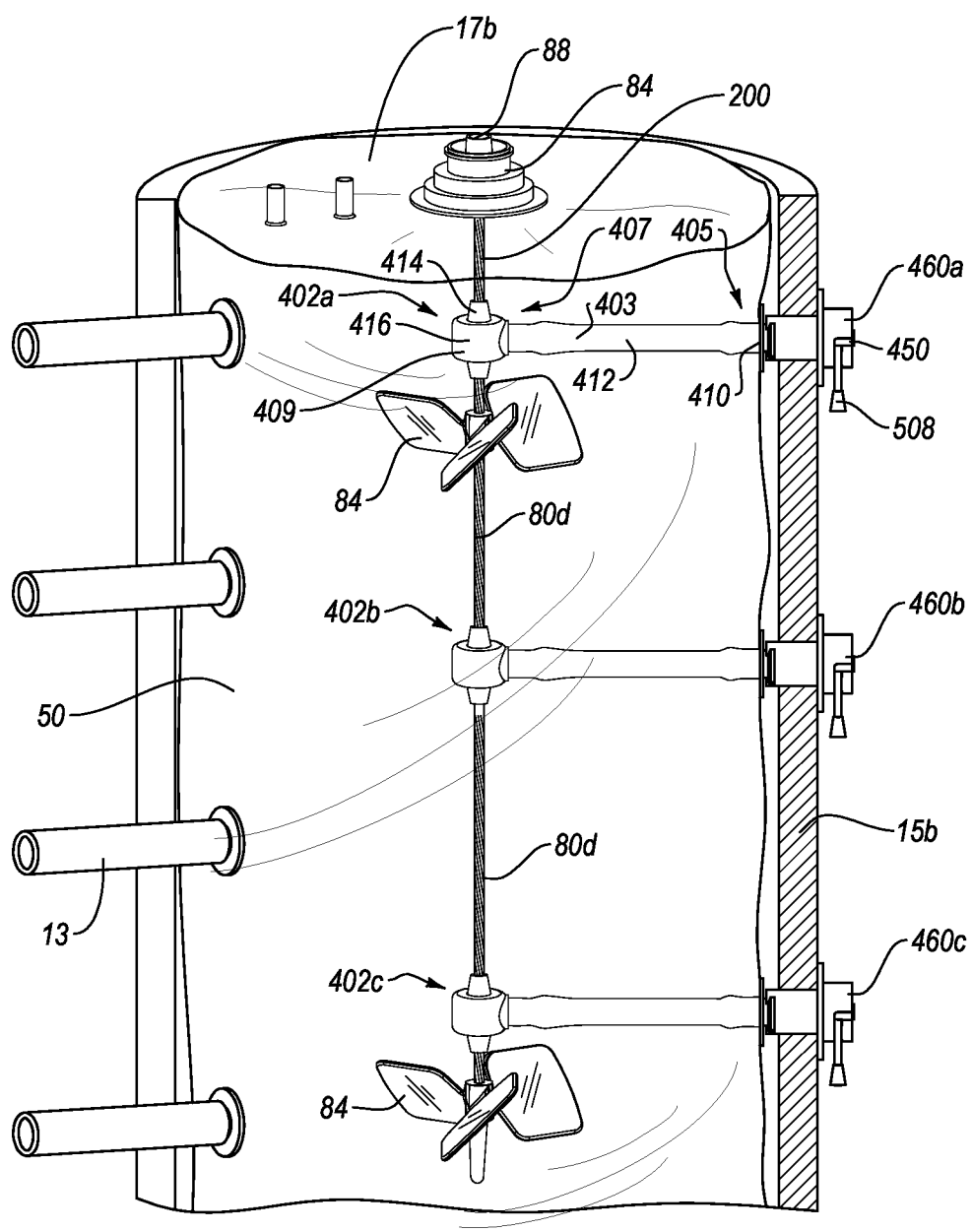
FIG. 5A is a partial cross sectional side view of an alternative mixing system having a flexible drive line that can be used with the system depicted in FIG. 1.
Figure 5B:
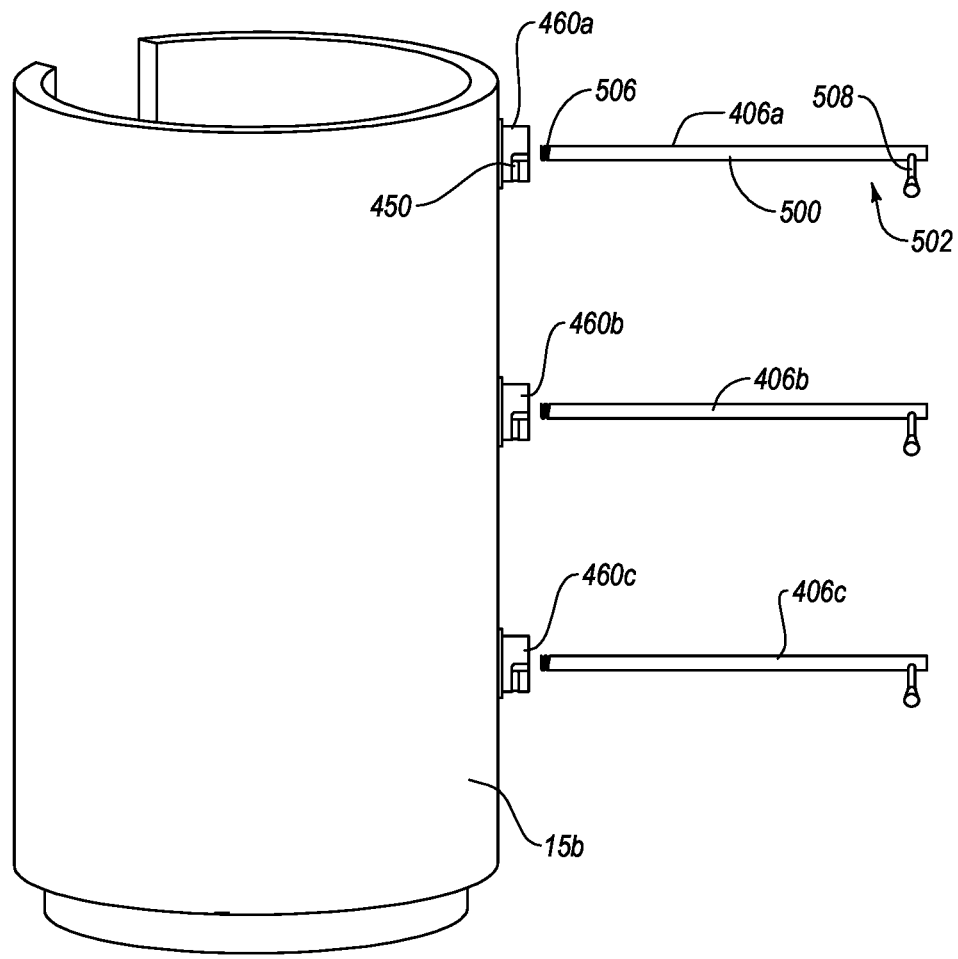
FIG. 5B is an exploded view of a portion of the mixing system depicted in FIG. 5A.

Depicted in FIGS. 5A and 5B is an alternative mixing system. Specifically, depicted in FIG. 5A is support housing 15b having container assembly 17b disposed therein. Shielding elements 61 have been removed to simplify the view. In this embodiment, tubular connector 80 that is used in conjunction with drive shaft 72 has been replaced with a flexible drive line 80d which does not receive drive shaft 72. Drive line 80d can be made from a variety of different flexible materials. By way of example and not by limitation, in one embodiment drive line 80d can be made from a braded material such as cable, cord or rope. The braded material can be made from strands that are comprised of metal, polymer or other materials that have desired strength and flexibility properties and can be sterilized. For example, the strands can be made from stainless steel. In other embodiments, drive line 80d can be made from a flexible tube, a single solid core line such as made from a polymeric material, a linkage, such as a chain or a linkage of universal joints, or other flexible or hinged members.

In one embodiment, drive line 80d can be bent along a central longitudinal axis thereof over an angle of at least 45°, 90°, 180° or more without plastic deformation thereof. In other embodiments, at least a portion of drive line 80d is sufficiently flexible so that the flexible portion of drive line 80d can be twisted under torsion about the longitudinal axis thereof over an angle of at least 45°, 90°, 180°, 360°, 720° or more without plastic deformation thereof.

As depicted in FIG. 5A, a first end 200 of flexible drive line 80d is secured to an upper end wall of sub-container 17b by rotational assembly 82. Mounted on flexible drive line 80d at spaced apart locations are mixing elements 84. To stabilize drive line 80d within sub-compartment 50 of sub-container 17b, lateral support assemblies 402A-C are coupled with flexible drive line 80d at space apart locations along the length thereof. Each lateral support assembly 402A-C comprises a retention assembly 403 having a first end 405 secured to the side of sub-container 17b and an opposing second end 407 secured to flexible drive line 80d. Lateral support assembly 402 also includes a support rod 406 (FIG. 5B) that is selectively received and secured within corresponding retention assembly 403. Each retention assembly 403 comprises a port fitting 410 at first end 405 that is coupled with the side of sub-container 17b, a receiver 409 at second end 407 that is mounted to flexible drive line 80d, and a flexible tube 412 that extends between port fitting 410 and receiver 409.

Receiver 409 comprises an inner housing 414 that is securely fixed to flexible drive line 80d such as by crimping, adhesive, clamps, fasteners, or the like. Receiver 409 also includes an outer housing 416 that encircles inner housing 414. A bearing, such as a ball thrust bearing, roller thrust bearing, or other type of bearing, is disposed between inner housing 414 and outer housing 416. The bearing enables inner housing 414 and drive line 80d to rotate concurrently relative to outer housing 416.

Mounted on and extending through support housing 15b is a plurality tubular locking fittings 460. During use, sub-container 17b is received within the chamber 114 of support housing 15b. Each port fitting 410 is then secured to a corresponding locking fitting 460 on the interior of support housing 15b. As depicted in FIG. 5B, each support rod 406 comprises a linear shaft 500 that extends between a first end 502 and an opposing second end 504. A locking thread 506 is formed on second end 504. A locking arm 508 radially outwardly projects from shaft 500 as first end 502. Support rod 406 is typically comprised of metal but other rigid or semi-rigid materials can also be used.

Once each port fitting 410 is secured to a corresponding locking fitting 460 on the interior of support housing 15b, each support rod 406 is advanced through a locking fitting 460 and a corresponding lateral support assembly 402. Support rod 406 is then rotated causing second end 504 to threadedly engage outer housing 416 of receiver 416. Concurrently, first end 502 securely engages locking fitting as a result of locking arm 508 being received within a locking slot 450 on locking fitting 460. In this configuration, the combination of lateral support assembly 402 and support rod 406 centrally retain flexible drive line 80d within sub-container 17b but still permits drive line 80d to rotate. In turn, the rotation of drive line 80d facilitates the rotation of mixing elements 84.

To rotate drive line 80d a short drive shaft is used to engage hub 88 of rotational assembly 82 but does not extend into drive line 80d. Motor assembly 59 (FIG. 4A) engages and rotates the drive shaft which in turn rotates drive line 80d. Further details of the above assembly and alternative methods of supporting and rotating a flexible drive line are disclosed in International PCT Publication No. WO2013/151733, published Oct. 10, 2013 which is incorporated herein by specific reference.

In another embodiment, portions of mixer system 18 projecting into container assembly 12 can be configured to repeatedly raise and lower mixing element 84 located within container assembly 12 for mixing the fluid. Alternatively, magnetic stirring members can be disposed within sub-compartments 50 of container assembly 12 and rotated by a magnetic mixer disposed outside of container assembly 12. In yet other embodiments, a stir bar, paddle, or the like that projects into sub-compartments 50 of container assembly 12 can be pivoted, swirled or otherwise moved to mix the fluid. Other mixing techniques can also be used.

Further disclosure and alternative embodiments of support housings, container assemblies, and mixing systems that can be used in the present disclosure are disclosed in U.S. Pat. No. 7,384,783, issued Jun. 10, 2008; U.S. Pat. No. 7,682,067, issued Mar. 23, 2010; and US Patent Publication No. 2006/0196501, issued Sep. 7, 2006, the entire disclosure of each of which is incorporated herein by specific reference.

Acoustic Settlers

Figure 7A:
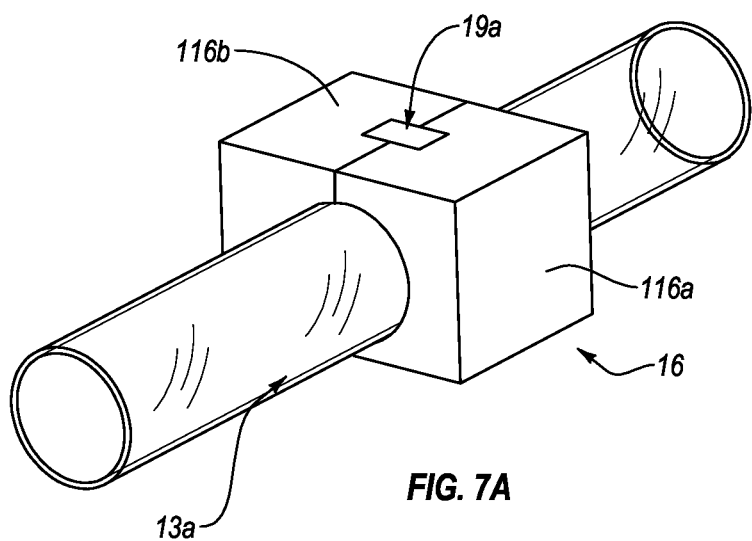
FIG. 7A is a perspective view of an acoustics assembly according to an embodiment of the present disclosure.
Figure 7B:
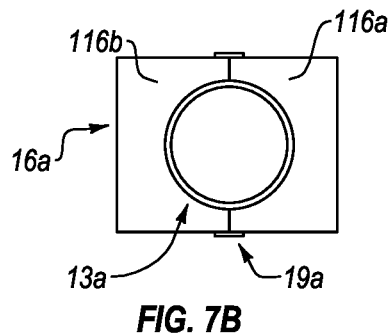
FIG. 7B is a side cross-sectional view of the acoustics assembly of FIG. 7A.

FIG. 1 further illustrates acoustic settlers 16 attached to a portion of container assembly 12 and supported by support member 172 that are attached to outer walls 20a of support housing 15. Those skilled in the art will appreciate that acoustic settler 16 is representative of any suitable acoustic wave generator suitable for use in embodiments of the present disclosure, and does not necessarily reflect and/or represent the actual, structural configuration of such acoustic wave generator. Acoustic settlers 16 are aligned with a conduit 13 of container assembly 12 and are configured to generate at least one standing acoustic wave through fluid path 156 therein. In particular, as depicted in FIGS. 7A and 7B, acoustic settler 16 comprises an acoustic wave transducer 116a disposed on one side of conduit 13 and an acoustic wave reflector 116b disposed on the opposing side of conduit 13a in alignment with acoustic wave reflector 116b. While acoustic settler 16, acoustic wave transducer 116a, and acoustic wave reflector 116b are illustrated as having square-shaped exteriors, one will appreciate that cylindrical or other shaped exteriors are also contemplated herein.

In at least one embodiment, when acoustic wave transducer 116a is activated, it produces an acoustic wave that passes through fluid disposed within conduit 13a and reaches acoustic wave reflector 116b. The acoustic wave can then be deflected or reflected by acoustic wave reflector 116b back through the fluid within conduit 13a. Additional acoustic waves can be transmitted (periodically) until a standing wave is produced. More specifically, by applying a specific voltage or varying voltage to a piezoelectric (a material that turns electric current into a mechanical displacement) resonator a standing waves can be produced at specific resonant frequencies. Thus, in some embodiments, the acoustic settler(s) can create nodal arrangement of the acoustic wave(s) (e.g., within conduit 13a), which can cause alignment and/or enhance proximity or association of dispersed phase droplets. The closely-associated droplets can then coalesce into larger and larger phase droplets or bodies until the buoyancy of such bodies are sufficient to induce counter-current flow of the two phases.

In an alternative embodiment, an acoustic wave reflector 116b may not be required. For instance, in some embodiments, nodal arrangements can be controlled by sensing properties of the wave at the acoustic wave transducer 116a (e.g., and adjusting wave output accordingly). Moreover, in some embodiments, acoustic settler(s) 16 can alternatively or additionally be disposed about one or more settling zones 33. Furthermore, acoustic settler(s) 16 can alternatively or additionally be connected to container 12 via an outlet port 51 (e.g., such that the at least partially extracted and/or purified sample can be acoustically settled on the back end of the system and/or to (specifically) target dispersed phase micro-droplets with one or more acoustic waves).

FIGS. 7A-7D depict the acoustic wave transducer 116a and the acoustic wave reflector 116b as unitary components. One will understand, however, that this is for the sake of simplicity and clarity. In at least one embodiment, the acoustic wave transducer 116a and the acoustic wave reflector 116b may comprise multiple distinct components. For example, in at least one embodiment, the acoustic settler 16a can comprise multiple (e.g., 2, 3, 4, or more) distinct acoustic wave transducers 116a with multiple complementary, distinct acoustic wave reflectors 116b. In other embodiments, multiple separate acoustic settlers 16a (e.g., 2, 3, 4, or more) can be attached to each conduit. These configurations may allow for the creation of beneficial multi-nodal systems and/or a higher coalescence or settling speed (e.g., even at faster feed/sample flow rates). In at least one embodiment, multi nodal systems can be created within a single acoustic cell.

Additionally, in at least one implementation, one or more of the individual acoustic wave transducers 116a and acoustic wave reflectors 116b may be in contact directly with the fluid within the conduit 13a. In particular, the one or more individual acoustic wave transducers 116a and acoustic wave reflectors 116b may be positioned such that they are either within the conduit 13a or at least partially disposed within the conduit 13a. In at least one implementation, protective layers may cover one or more of the acoustic wave transducers 116a and acoustic wave reflectors 116b in order to prevent contamination or erosion from the fluid.

In contrast, in at least one implementation, the acoustic wave transducers 116a and the acoustic wave reflectors 116b may be positioned on the exterior of the conduit 13a. As such, the acoustic waves must first travel through the conduit 13a wall before entering the fluid. Similarly, before being reflected, the acoustic waves must pass through the conduit 13a wall, reflect from an acoustic wave reflector 116b, and then pass back through a conduit 13a wall.

The exposure of the fluid sample to the nodal arrangement of the acoustic waves creates areas of different pressure which causes distinct phases within the fluid to separate or coalesce based upon at least one physical property (e.g., density and/or compressibility differences between the two liquid phases) thereof. For instance, the acoustic waves can aggregate or coalesce droplets or particles of the dispersed phase. The coalesced droplets can have a buoyancy or density difference more dominant than drag forces, resulting in counter-current flow and eventual settling of a denser or more-dense phase to the bottom of the container assembly 12 or compartment 50 thereof. Likewise, a less-dense phase can counter-currently flow and eventual settle above a denser phase at the top of container assembly 12 or compartment 50 thereof.

In at least one implementation, a multi-nodal wave can be formed that causes particles or molecules of distinct sizes to congregate at particular points within the acoustic waves. As such, the acoustic waves can cause, enhance, increase, and/or augment the coalescing, aggregating, or combining of smaller droplet of one or more phases into a larger phase body. Soluble molecules within each phase can settle up or down with their corresponding phase, thus accomplishing separation of molecules present in a mixture of phases. Particles or molecules in the fluid, mixture, or phase can also align, organized, settle, and/or separate based on one or more molecular properties. Thus, fluid processing system 10 can be configured for acoustic wave-assisted processing and/or settling of a fluid sample disposed within container 12 thereof. Further description of exemplary acoustic separators can be found in US Patent Publication US 2014/0011240 A1, the entire disclosure of which is incorporated herein by specific reference.

It is appreciated that acoustic settler 16 can be attached or aligned with conduit 13 in a variety of different ways. For example, FIG. 7B illustrates a cross-sectional view of acoustic settler 16 depicted in FIG. 7A. As illustrated in FIG. 7B, acoustic wave transducer 116a and acoustic wave reflector 116b can be connected together by an attachment mechanism 19a so that they encircle conduit 13a.

Figure 7C:
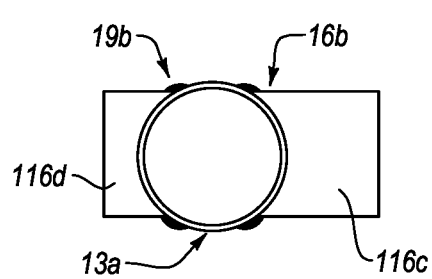
FIG. 7C is a side cross-sectional view of another acoustics assembly according to an embodiment of the present disclosure.
Figure 7D:
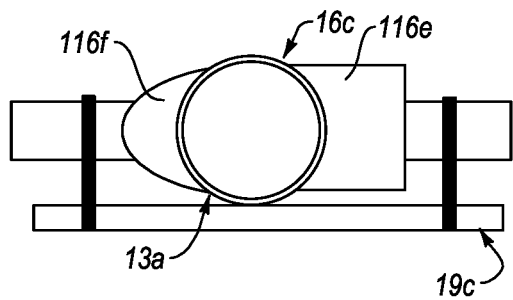
FIG. 7D is a side cross-sectional view of another acoustics assembly according to an embodiment of the present disclosure.

FIG. 7C illustrates a cross-sectional view of an alternative acoustic settler 16b comprising an acoustic wave transducer 116c and an opposing acoustic wave reflector 116d positioned opposite thereof. Transducer 116C and reflector 116d are connected or mounted to opposing sides of conduit 13a via attachment mechanism 19b without being connected to each other. As such, transducer 116C and reflector 116d do not encircle conduit 13a. FIG. 7D illustrates a cross-sectional view of another acoustic settler 16c comprising an acoustic wave transducer 116e and an acoustic wave reflector 116f that are mounted on a support 19c so as to be disposed on opposing sides of conduit 13a but do not directly connect to conduit 13. In this last embodiment, acoustic wave transducer 116e and acoustic wave reflector 116f can be spaced apart from or press against conduit 13a.

In view of the foregoing, in some embodiments, acoustic separator 16 can be clipped onto or attached to or about conduit 13 such that a fluid passing through conduit 13 passes through a section to which the acoustic separator is (externally) attached. In an alternative embodiment, conduit 13 can be attached to or about an acoustic separator 16 such that a fluid passing through conduit 13 passes through the acoustic separator 16. Accordingly, a coupling element or seal can attach the acoustic separator to the ends of a split conduit 13. Acoustic separators 16 can also have one or more chambers, wave generators, reflectors or deflectors, etc. in various embodiment of the present disclosure.

In at least one alternative embodiment, acoustic separator 16 comprises an acoustic wave transducer (e.g., 116a) configured to sense one or more properties of an acoustic wave produced thereby. Furthermore, the acoustic wave produced thereby can be adjusted according to the sensed properties to produce an acoustic wave suitable for embodiments of the present disclosure. Thus, acoustic separator 16 can be driven without a reflector in at least one embodiment (e.g., by measuring the impedance on the piezoelectric, acoustic wave transducer).

Without being bound to theory, impedance is the opposition to an applied voltage by an electric circuit. In a piezoelectric material, for example, the impedance is linked with the mechanical displacement, or vibration, of the piezo. As the fluid in contact with the piezoelectric transducer changes in viscosity, density, compressibility, and droplet or particle size or content, the impedance for vibrating or displacing the piezoelectric transducer will thusly change. In this fashion the voltage applied to the piezoelectric transducer can be modified to reach certain resonant frequencies at which the separation ability of the acoustic separator is most powerful.

Moreover, in at least one embodiment, the transducer can be positioned, configured, adjusted, modified, and/or optimized to (specifically) target dispersed phase micro-droplets. For instance, one or more acoustic separators 16 can be disposed at the back end of the system where a majority of the dispersed phase has been settled out of the surrounding continuous phase. Specifically, after completing a certain number of theoretical stages (e.g., through alternating mixing and settling steps), greater than 70%, greater than 75%, greater than 80%, greater than 85%, greater than 90%, greater than 92%, greater than 95%, greater than 96%, greater than 97%, or greater than 98% of the dispersed phase (by weight or by volume) may have already been settled out of the mixture. The remaining portion (e.g., at least 2%, at least 3%, at least 4%, at least 5%, at least 6%, at least 7%, at least 8%, at least 9%, at least 10%, or more) of the dispersed phase can be trapped in the continuous phase as micro-droplets that, because of the system parameters (e.g., interfacial tension, flow rate, mixing speed, etc.), did not (and in some cases may never) settle out of the surrounding continuous phase (e.g., within an economically relevant period of time). Thus, back-end acoustics can achieve separation of the remaining portion of the dispersed phase. Likewise, the acoustic wave can be adjusted to one or more specific resonance frequencies conducive to enhancing the coalescence of the dispersed phase micro-droplets into larger droplets (e.g., through nodal co-localization, etc.).

Methods

An illustrative method of using sample purification system 10 according to certain embodiments can include (1) providing sample purification system 10 as described herein, (2) introducing a first fluid into the system via a first opening, the first liquid comprising a first phase having a first density and a multi-component sample having an amount of a first molecule and an amount of a second molecule, (3) introducing a second fluid into the system via a second opening, the second liquid comprising a second phase having a second density that is different than the first density, (4) mixing the first liquid with the second liquid in at least one mixing zone of the system to form a mixture and/or emulsion (e.g., in which at least a portion of the amount of the first molecule is transferred from the first phase to the second phase), (5) applying at least one acoustic wave to a portion of the mixture in a settling zone, and/or (6) allowing the mixture to separate into a third liquid and a fourth liquid, the third liquid comprising the first phase and at least a portion of the amount of the second molecule, the fourth liquid comprising the second phase and at least a portion of the amount of the first molecule, the at least one acoustic wave enhancing the separation of the mixture into the third liquid and the fourth liquid, thereby purifying the sample, and/or wherein the first phase and second phase are immiscible.

One will appreciate that while immiscible phases remain separate in a technical, molecular sense; that "phase separation" and similar terms, as used herein, refers to the counter-current flow or movement of or between the two phases. Accordingly, phase separation includes the coalescence of one or both phases until the density difference between the two phases is sufficient to induce or restore counter-current flow. Specifically, phase separation includes the coalescence of smaller dispersed phase droplets into one or more larger phase bodies until the gravitational force and/or buoyancy of the one or more larger phase bodies is sufficient to overcome drag force(s) exerted by the surrounding, continuous phase (e.g., causing the dispersed phase droplets or bodies to move vertically upward or downward or settle upward or downward), thereby inducing counter-current flow of the light phase and the heavy phase.

Those skilled in the art will appreciate that "gravitational force" as used here can include the falling or settling of a more-dense phase (body) below a less-dense phase and/or the buoyant rising of a less-dense phase (body) above a more-dense phase. Thus, "gravitational force" and similar terms include both downward and upward forces (e.g., that occur because or as a result of a gravitational field or force. On the contrary, "drag force," "frictional force," and similar terms include contact forces not necessarily dependent on the presence of a gravitational field or force.

Figure 16:
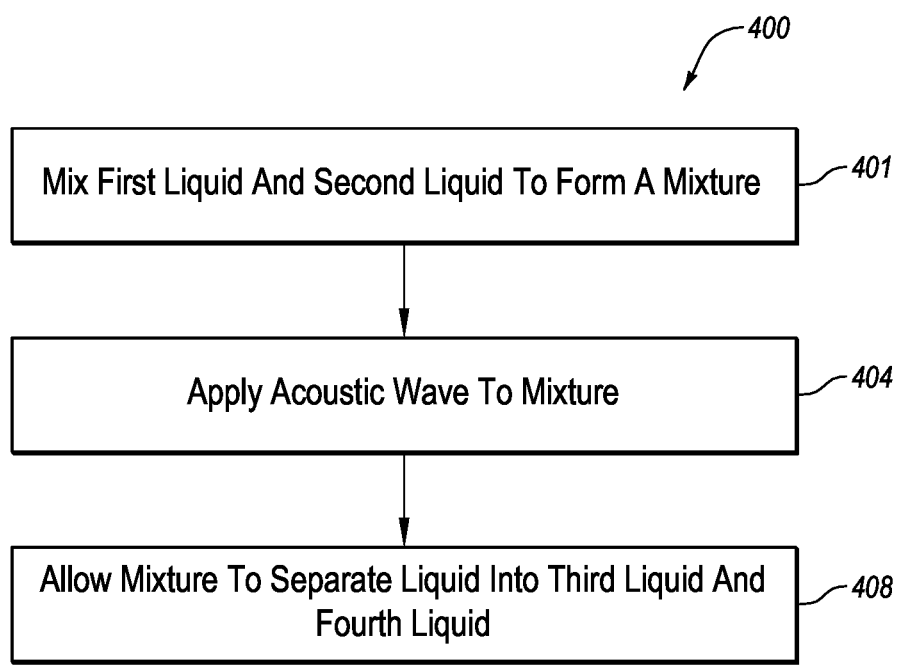
FIG. 16 outlines a method of purifying a sample according to an embodiment of the present disclosure.

FIG. 16 outlines a method 400 of purifying a sample comprising a first liquid and a second liquid. Method 400 comprises a step 401 in which a user mixes a first liquid and a second liquid to form a mixture, a step 404 in which a user applies an acoustic wave to the mixture, and a step 408 in which a user allows the mixture to separate into a third liquid and a fourth liquid. One will appreciate that other steps and features described herein can be included and incorporated into certain method embodiments of the present disclosure.

Systems, methods, and apparatus of the present disclosure can operate on principles of continuous flow fluid processing (e.g., in a sample purification system). Referring to FIGS. 1 and 2, for example, a first liquid (comprising a first phase having a first density and a multi-component sample having an amount of a first molecule and an amount of a second molecule) can be continuously introduced into sub-container 17a of container assembly 12 via a first inlet 51a and a second liquid (comprising a second phase having a second density that is different than the first density) can be continuously introduced into sub-container 17a of container assembly 12 via a second inlet 51c. Accordingly, the first phase can comprise a "heavy phase" having a density greater than the density of the second, "light phase." One will appreciate, however, that where appropriate, the light phase (introduced into sub-container 17a of container assembly 12 via a second inlet 51c) can be the first phase, with the heavy phase (introduced into sub-container 17a of container assembly 12 via a first inlet 51a) can be the second phase.

The density difference between the two phases can initiate a counter-current flow between the two phases. Specifically, the light phase introduced in the bottom end 57 of sub-container 17a can tend to buoyantly rise to or toward the top end 56 thereof, while the heavy phase introduced at the top end 56 of sub-container 17a can tend to fall to or toward the bottom end 57 thereof. As will be discussed in further detail below, this counter-current flow enables the phases to pass through the series of alternating mixing and settling zones.

In an illustrative embodiment, the first and second phases can be repeatedly mixed and settled or separate within sample purification compartment 136 of system 10a in order to effectuate the transfer of at least a portion of the amount of the first molecule from the first phase to the second phase (e.g., while retaining at least a portion of the amount of the second molecule with the first phase). Accordingly, the mixture can be processed in the plurality of alternating mixing zones 31 and settling zones 33. For instance, a portion of the mixture can be mixed by mixing element 84 in mixing zone 31b. The portion of the mixture in mixing zone 31b can comprise at least a portion of the first phase from (upper) settling zone 33b and at least a portion of the second phase from (lower) settling zone 33a. Openings 67 extending through shielding elements 61a that bound mixing zone 31b permit the first phase and the second phase to pass from the adjacent settling zones 33a, 33b into mixing zone 31b.

In at least one embodiment, first inlet 51a and/or second inlet 51c can be connected to and/or aligned, associated, and/or in fluid communication with mixing zone 31b. Accordingly, the first liquid comprising the first phase and/or the second liquid comprising a second phase can be continuously introduced into mixing zone 31b of container assembly 12 and/or sub-container 17a thereof. In another embodiment, first inlet 51a and/or second inlet 51c can be connected to and/or aligned, associated, and/or in fluid communication with settling zone 33b. Accordingly, the first liquid comprising the first phase and/or the second liquid comprising a second phase can be continuously introduced into settling zone 33b of container assembly 12 and/or sub-container 17a thereof. Thus, substantially purified sample(s) adjacent upper end 56 and/or lower end 57 may not be mixed with unpurified sample stream(s) by positioning one or more sample inlets 51 distal to the end(s).

Mixing elements 84 can enhance and/or effectuate the transfer of at least a portion of the first molecule from the first phase to the second phase. Specifically, mixing element 84 can be configured to disperse one of the first and second phases in the other of the first and second phases. For instance, in some embodiments, the heavy phase can comprise a continuous phase in which the light phase can be dispersed (e.g., as droplets). The phase to be dispersed can be largely determined by the ratio of volumes between the first and second phases and secondarily by the composition of the two phases. Accordingly, mixing element 84 can mix the heavy and light phases such that the light phase is dispersed as (small) droplets in the heavy phase or the heavy phase is dispersed as (small) droplets in the light phase within the mixing zone. The dispersion of the first or second phase within the other of the first and second phases, and subsequent reduction of dispersion size by the mixing element increases the surface area-to-volume ratio of the same such that transfer of at least a portion of the first molecule from the first phase to the second phase is enhanced.

In addition to effectuating the transfer of at least a portion of the first molecule from the first phase to the second phase, mixing the portion of the mixture in mixing zone 31*b* (e.g., via mixing element 84 disposed therein) can also at least partially direct, promote, and/or effectuate the flowing of the portion of the mixture through fluid path 156 of conduit 13*c* and into settling zone 33*d* of sub-container 17*b*. Specifically, the size of the mixed, dispersed phase droplets can be small enough to prevent buoyant, counter-current flow of the light phase upward in mixing zone 31*b*, thereby preventing flow of the light phase upwardly through the openings 67 in shielding element 61*a*. Accordingly, mixing element 84 can reduce the size of the dispersed phase (e.g., into small droplet), thereby reducing or inhibiting counter-current flow in mixing zone 31*b*. Thus, mixing elements 84 can be specifically designed and/or configured to direct the flow of fluid into and out of mixing zones 31.

Shielding element 61*a* can also (at least partially) protect or shield a portion of the mixture from the turbulence or agitation generated mixing element 84. For instance, the portion of the mixture in settling zone 33*b* can be shielded from the mixing turbulence or agitation generated by mixing element 84. Likewise, the portion of the mixture in conduit 13*c* and/or settling zone 33*d* can be shielded from the mixing turbulence or agitation generated by mixing element 84. For instance, fluid path 156 within conduit 13*c* can be shielded by virtue of the size of opening 159 thereof and/or can have shielding elements (e.g., baffles) associated therewith. Thus, as the mixture enters conduit 13*c*, it can be at least partially shielded from mixing element 84 (or the turbulence generated thereby).

Shielding the mixture within conduit 13*c* from the mixing turbulence permits coalescence of the dispersed phase droplets into a larger phase body. In at least one embodiment, coalescence can lead to settling of the first and/or second phases out of the mixture. For instance, the first phase can comprise a continuous phase having a density greater than that of the second phase. Mixing the immiscible phases can disperse the second, light(er) phase within the (heavier) continuous phase. Shielding the mixture from fluid turbulence, on the other hand, can allow or permit coalescence of the dispersed phase (droplets). As the dispersed second phase droplets coalesces into a larger and larger body, the gravitational force (e.g., buoyancy) of the second phase relative to the first phase eventually exceeds drag forces from the first phase acting on the second phase. Accordingly, at least a portion of the (coalesced) second phase can rise to the top or fall to the bottom of the continuous, heavy, first phase, thereby settling or separating the mixture into first and second phases. In alternative embodiments, the dispersed phase can have a density greater than the continuous phase.

As the mixture passes through conduit 13*c*, an acoustic wave is applied to the mixture by one or more acoustic settlers 16 as previously discussed. By exposing the mixture to the standing acoustic wave produced by the acoustic settlers 16, the coalescence of the dispersed phase (droplets) can be significantly enhanced (e.g., as phase droplets are aligned and brought into proximity in the wave node(s)). This coalescence enhances the difference between (1) the gravitational force exerted on the dispersed phase, and (2) the drag force imparted onto the dispersed phase by the continuous or surrounding phase, and thereby restores counter-current flow and possibly eventual settling (e.g., in settling zone 33*d*). In at least one embodiment, the gravitational force can be at least partially opposite the drag force.

Those skilled in the art will appreciate that while reference to restoring and/or inducing counter-current flow is made in connection with some embodiments; other embodiments may involve enhancing and/or maintaining counter-current flow. Thus, acoustic waves can induce an otherwise non-existent counter-current flow, restore a disrupted counter-current flow, prevent disruption of (e.g., maintain) an existing counter-current flow, and/or enhance (augment, bolster, etc.) an existing counter-current flow, depending on the specific embodiment of the present disclosure. Accordingly, acoustic waves can facilitate counter-current flow in a variety of ways and/or through a variety of mechanisms.

The settling mixture then passes out of conduit 13*c* and into settling zone 33*d*. In certain embodiments, however, the acoustic wave is applied to the mixture in settling zone 33*d* (e.g., in addition to or instead of conduit 13*c*). For instance, acoustic settlers 16 can be disposed and/or aligned about settling zone 33*d* (e.g., in addition to or instead of conduit 13*c*). Additional acoustic settlers 16 can be disposed and/or aligned about other settling zones 33*a*, 33*b*, 33*c*, 33*e* (e.g., in addition to or instead of conduits 13*a*, 13*b*, 13*d*, 13*e*). In other embodiments, the acoustic wave is applied to the mixture on the back-end of the system (e.g., in addition to or instead of conduit(s) 13 and/or settling zone(s) 33). For instance, acoustic settlers 16 can be disposed and/or fluidly connected to one or more outlet ports 51*b*, 51*d*. Thus, the partially purified sample(s), liquid(s), or phase(s) (e.g., adjacent upper end 56 and/or lower end 57) can be exposed to acoustic waves to further purify the sample. Such further purification can comprise acoustically coalescing and/or settling a population or amount of dispersed phase microdroplets trapped in the surrounding continuous phase (e.g., that may not otherwise settle out within an economically relevant period of time). In addition, such further purification may achieve greater than greater than 90%, greater than 92%, greater than 95%, greater than 96%, greater than 97%, greater than 98%, or greater than 99% product yield, purity, and/or other benchmark measurement.

Settling zone 33*d* is at least partially shielded from the turbulence generated by mixing element 84 in any of the mixing zones, particular mixing zones 31*b*, 31*d*, and/or 31*e*. Specifically, upper and lower shielding elements 61*a* dampen the turbulence generated in mixing zones 31*e* and 31*d*, respectively. Shielded from the fluid turbulence, the mixture can settle or separate sufficiently to allow at least a portion of the dispersed phase to rise above or to the top or fall below or to the bottom of at least a portion of the continuous phase. Accordingly, at least a portion of the less-dense phase can rise to the top of settling zone 33*d* and pass through upper shielding element 61*a*, into mixing zone 31*e*. Likewise, at least a portion of the more-dense phase can settle to the bottom of settling zone 33*d* and pass through lower shielding element 61*a*, into mixing zone 31*d*. This movement of the heavy and light phases in opposite vertical directions contributes to the overall counter-current flow with sample purification compartment 136.

In some embodiments, mixing elements 84 disposed within mixing zones 31$d$ and 31$e$ can promote the passage of the respective phases, through respective shielding elements 61$a$, and into the respective mixing zones 31$d$, 31$e$. For instance, in some embodiments, mixing element 84 can be configured to draw or pull fluid up from a lower settling zone 33 and/or draw or pull fluid down from an upper settling zone 33. Thus, mixing elements 84 can be configured to at least partially direct or promote the flowing or movement of the mixture along fluid path 156.

Mixing zones 31$d$ and 31$e$ can each be configured similar to mixing zone 31$b$, described above. Indeed, each mixing zone 31 of container assembly 12 can be configured to: (i) draw or pull a portion of the mixture from at least one adjacent settling zone 33 (e.g., by means of mixing element 84); (ii) mix the mixture or the portion of the first phase and the second phase thereof to effectuate transfer of an amount of the first molecule from the first phase into the second phase, (iii) decrease the buoyancy of the light phase thereby preventing or inhibiting improper movement of phase(s) through sample purification compartment 136, and/or (iv) direct, promote, or force the mixture through fluid path 156 of an adjacent conduit 13, and then into an adjacent settling zone 33 (e.g., in an opposing or adjacent sub-container 17). Each settling zone 33 of container assembly 12 can, likewise, be configured to: (i) receive a coalescing and/or settling mixture from an adjacent mixing zone 31 (e.g., via a conduit 13 disposed therebetween); (ii) provide an environment having reduced fluid turbulence compared to adjacent mixing zones (e.g., by means of shielding element(s) 61); and/or (iii) allow fluid disposed therein to move, flow, and/or be drawn therefrom into one or more adjacent mixing zones 31.

One will appreciate that additional first liquid and/or additional second liquid can be added to the system by means of one or more inlets located at various positions within the system. For instance, in at least one embodiment, additional first liquid and/or additional second liquid can be added directly into one or more mixing zones and/or settling zones via one or more ports in fluid communication therewith.

One will also appreciate that certain embodiments can include continuous mixing of portions of the fluid mixture in the plurality of mixing zones 31 and continuous settling of portions of the fluid mixture in the plurality of settling zones 33. Thus, certain embodiments can include repeating the steps of: (i) settling the mixture into first and second phases in a plurality of settling zones; (ii) directing the first and second phases toward adjacent mixing zones 31 to be mixed with further second and first phase, respectively; and (iii) directing the first and second phases toward adjacent settling zones 33 for further settling.

As the mixture is processed (i.e., repeatedly mixed and settled) through the series of alternative mixing zones 31 and settling zones 33 (e.g., through the S-shaped, fluid path of sample purification compartment 136), the second, light phase will progressively rise to the top of container assembly 12 (or sub-container 13$b$ thereof), where it can be removed via a first outlet 51$b$ as a third liquid comprising the second phase and at least a portion of the first molecule. Similarly, the first, heavy phase will progressively settle to the bottom of container assembly 12 (or sub-container 13$b$ thereof), where it can be removed via a second outlet 51$d$ as a fourth liquid comprising the first phase and at least a portion of the second molecule.

Thus, embodiments can also include harvesting or removing an extract from one or more portions of the system and a raffinate from one or more portions of the system. In at least one embodiment, the extract comprises the third liquid comprising the second phase and at least a portion of the first molecule, and the raffinate comprises fourth liquid comprising the first phase and at least a portion of the second molecule. One will appreciate, however, that in other embodiments, the extract can comprise the fourth liquid and the raffinate can comprise the third liquid. Similarly, one will appreciate that in some embodiments the first liquid can be introduced via second inlet 51$c$ and the second liquid can be introduced via first inlet 51$a$. For example, this would be done where the second phase has a density greater than the first phase. Thus, various alterations, modifications, and/or substitutions are also contemplated within the scope of this disclosure, which will be apparent to those skilled in the art.

The term "phase," as used herein and known in the art, refers to a type of liquid or a fluid carrier (e.g., throughout which one or more physical properties of a material are essentially uniform). Embodiments of the present disclosure include two or more immiscible liquid phases that have one or more distinct properties. The difference(s) between liquid phases can be exploited in certain embodiments to perform two-phase, liquid-liquid extraction and/or purification (e.g., of at least one of the phases and/or of at least one molecule disposed and/or dissolved on at least one of the phases).

In various embodiments of the present disclosure, the density of the liquid phases can be of primary importance. Each of the liquid phases can include at least a first component having a first density and, optionally, a second component having a second density. The density of a phase can be determined by and/or result from the concentration of components included or present in the fluid and/or phase. For instance, one or more of the first and second phases can be comprised of water. One or more of the first and second phases can be comprised of a polymer (e.g., polyethylene glycol (PEG)) and/or organic molecule (e.g., butanol, toluene, etc.) and/or inorganic molecule (e.g. gold, silver, etc). Accordingly, the first and second phases can have different densities based at least partially on the amount of water, polymer, organic molecule, and/or additional component(s) included therein. For instance, the amount of water in the first and second phases can determine and/or contribute to the density thereof. In at least one embodiment, the density of one phase remains greater than the density of the other phase (e.g., even if the density of the one and/or the other phase changes, even if the concentration of one or more components of the one and/or the other phase changes, and/or even if the amount of a molecule of interest disposed in the one and/or the other phase changes).

Without being bound to any theory, aqueous (or water-based) solutions, being polar, are immiscible with non-polar organic solvents (chloroform, toluene, hexane etc.) and form a two-phase system. However, in an aqueous two-phase (ATP) system, both immiscible components are water-based. The formation of the distinct phases, therefore, can be facilitated and/or affected by the pH, temperature, and/or ionic strength of the two components or mixture thereof. Thus, separation occurs when the amount of a polymer present exceeds a certain limiting concentration (which is determined by the above factors).

Phase components are known in the art and can include any suitable major and/or minor (dilute) component(s). For instance, one phase can comprise or be comprised entirely or almost entirely of water, butanol, toluene, etc. Other phases can include a mixture of phase components. For instance, a phase can comprise greater that 50% and less than 100% water, with at least some other phase component (e.g., PEG, acetone, etc.) at less than 50%. Other concentrations of phase components are known in the art and contemplated herein. For instance, phases having water at a concentration less than or equal to 50% and/or less than or greater than or equal to other phase component(s) is also contemplated herein.

In some embodiments, both phases can comprise >50% water. For instance, the first phase can comprise >50% water and >20% polymer or organic molecule and/or the second phase can comprise >50% water and <8% polymer or organic molecule, or vice versa. In certain embodiments, one of the first phase and the second phase can comprise >5% salt and/or >20% of polymer or organic molecule, while the first phase comprises <8% polymer or organic molecule, or vice versa. One or more embodiments can include a polymer/salt (e.g., PEG/phosphate) system, a polymer/polymer (e.g., PEG/dextran) system, and/or an ionic liquid (e.g., imidizolium chloride) system. In some embodiments, one or more phases can include a first salt (e.g., sodium chloride (NaCl)). In some embodiments, one of the phases (e.g., a heavier, more dense, and/or more aqueous/less organic phase) can have a higher concentration of a second (solvency driving) salt, such as a phosphate, a sulfate, a carbonate, a citrate, etc. Those skilled in the art will appreciate that a certain concentration of such salt may be necessary for operation of an ATP system (e.g., in which both phases (or liquids) are comprised (in large part) of water). For instance, the effect of such salt in an ATP system may be to shield and/or sequester water molecules (e.g., providing immiscibility between the two phases).

In at least one embodiment, a first fluid can comprise at least a first phase, such as an aqueous phase. As used herein, the term "aqueous phase," "water phase," and the like, refer to a fluid carrier comprised mostly of water (i.e., greater than 50%), having a percent concentration (by weight or by volume) of water that is greater than the percent concentration of water in a second phase, and/or having a density greater than the density of a second phase. The second phase can contain a higher or greater concentration of a polymer, organic component, or other density-altering molecule or component than does the first (aqueous) phase. Accordingly, the second phase can be termed an "organic phase," "oil phase," "light phase," or similar designation where appropriate (e.g., where (i) greater than 50% of the phase comprised organic molecule(s) or oil(s), etc., (ii) the phase has a higher concentration or percentage of an organic, polymeric, or other density-altering molecule or component than does the other phase, or (iii) the phase has a lower density than the first phase).

In some embodiments, both the first and second phases can comprise aqueous phase, organic phases, etc. For instance, the first phase can comprise a water phase (e.g., having approximately 0% polymer, organic, or other molecule) and the second phase can comprise approximately 70% water and approximately 30% polymer, organic, or other molecule (e.g., PEG). Similarly, the first phase can comprise 70% water and 30% PEG and the second phase can comprise 70% water and 30% dextran. Likewise, the first and second phases can each comprise or be comprised of greater than 50% polymer, organic, or other molecule (e.g., the addition of which decreases the density of water). Indeed, one will appreciate that any suitable concentration of phase components between 0% and 100% is contemplated herein. Accordingly, embodiments of the present disclosure can include aqueous-aqueous two-phase extraction, organic-organic two-phase extraction, aqueous-organic two-phase extraction, liquid-liquid extraction, or any other suitable combination.

Owing to the difference in densities between the first and second phases, counter-current flow through coalescence of dispersed phase droplets, phase settling and/or separation of the two-phase mixture (e.g., into two distinct phases separated at an interface) can be possible in certain embodiments. Such separation can occur passively over a long period of time by allowing the mixture to settle (i.e., ceasing, removing, and/or inhibiting agitation of the mixture). Sufficient, effective, and/or complete passive separation, especially for phases having low interfacial tension, can take several minutes, or even hours. Accordingly, certain embodiments of the present disclosure employ an active form of coalescence and/or phase separation by applying at least one acoustic wave to the mixture. The acoustic wave(s) can advance, cause, and/or induce aggregation or coalescence of even low interfacial tension phase droplets until the density difference between the phases causes the less-dense phase to counter-currently flow past and eventually settle atop the denser phase.

As used herein, "low interfacial tension" and similar terms can refer to interfacial tension below about 20 dyne/cm or about 20 millinewton (mN)/meter (m), preferably below about 18, about 15, about 12, about 10, about 5, about 4, about 3, about 2, about 1, about 0.5, about 0.25, about 0.1, about 0.075, or about 0.05 dyne/cm (or mn/m). Interfacial tension in a range between such low interfacial tension values is also contemplated within the scope of the present disclosure and included in the definition of "low interfacial tension" where appropriate.

In some embodiments, the fluid sample(s) (e.g., one or more of the first and second liquids) can include an amount or population of at least one molecule of interest and/or at least one contaminant. In particular, a first fluid can include at least one molecule of interest and at least one contaminant in a first phase. A second fluid can include a second phase, wherein mixture of the first and second fluids can cause and/or allow the transfer of an amount of the molecule(s) of interest and/or the contaminant(s) from the first fluid into the second fluid.

In at least one embodiment, the molecule(s) of interest and/or the contaminant(s) can be more stable in the first fluid than in the second fluid (or respective phases thereof). Accordingly, the mixture can include another molecule sufficient to cause the molecule(s) of interest and/or the contaminant(s) to be more stable in the second liquid than in the first liquid (or respective phases thereof). For instance, the concentration of salt or other component(s) in the mixture of the first and second fluids can cause the molecule(s) of interest to be more soluble in the second phase than in the first phase.

Without being bound to theory, the concentration in salt or other component(s) can effectuate charge shielding in the mixture. For instance, the ionic strength of the mixture can determine whether the molecule(s) of interest and/or the contaminant(s) enter, exit, and/or associated with the first or the second phase. In at least one embodiment, a high concentration of salt can drive a particular molecule of interest from the first phase into the second phase (e.g., from an aqueous, heavy phase comprising water into an organic or light phase comprising water and PEG and optionally, a high concentration of a salt (e.g., a phosphate, sulfate, or other solvency driving salt) than the aqueous, heavy phase). In particular, the concentration of ions in the aqueous phase makes the molecule of interest more soluble in the PEG-containing phase than in the water phase.

In at least one embodiment, adjusting the concentration of salt or other molecule in the mixture or one or more liquids or phases thereof can alter the solubility of the molecule(s) of interest and/or contaminant(s) therein. For instance, a first salt concentration can enhance the transfer of an amount of each of the molecule of interest and the contaminant from the first phase into the second phase. A second salt concentration can (subsequently) enhance the transfer of one of the molecule of interest or the contaminant from the second phase into the first phase. Accordingly, multi-step, multi-stage, and/or tandem sample purification is contemplated herein.

Similarly, concentration in salt or other component(s) can at least partially maintain the integrity and immiscibility of the two-phase system. For instance, in at least one embodiment, a first, water phase and a second, water/PEG phase can be miscible without a source of ionic shielding. Accordingly, the addition of salt or other molecule to such a two-phase system can prevent dilution of the second phase by the first phase and/or In some embodiments, the concentration of at least one ligand, molecule, or other component can influence hydrogen bonding (or lack thereof), electrostatic interactions, hydrophobicity, and/or (biologic and/or molecular) affinity, thereby stabilizing the molecule(s) of interest and/or the contaminant(s) in one of the two phases. Accordingly, the second molecule can comprise an ionic, affinity, biospecific, hydrophobic, hydrophilic, molecular size excluding, magnetic compound, and/or other molecule or compound adapted to stabilize the molecule(s) of interest and/or the contaminant(s) in one of the two phases.

In at least one embodiment, adequate, proper, and/or sufficient mixture of the first and second fluids can drive at least a portion of the population of molecule(s) of interest into (or to associate with or be dissolved in) the second phase. Accordingly, separation or settling of the first and second phases from or out of the mixture (e.g., subsequent to the mixture and/or transfer) can result in purification, isolation, and/or processing of at least a portion of the amount of the molecule of interest in the fluid sample. Furthermore, repetitive and alternating mixing and settling of the two phases can drive more and more of the molecule of interest into the second phase, thereby achieving a high level of purity. Active settling of the phases (e.g., by application of an acoustic wave) can dramatically decrease the time and cost associated with transferring the molecule of interest from the first phase into the second phase (thereby purifying the molecule of interest away from the contaminant). In an alternative embodiment, the contaminant can be purified away from the molecule of interest (thereby purifying the molecule of interest within the first phase).

In some embodiments the molecule of interest can comprise or be an antibody (Ab)—monoclonal or polyclonal—or immunoglobulin (Ig) (e.g., an IgG, IgA, IgD, IgE, and/or IgM), antibiotics, vitamins, hormones, or other biological molecule. Administration of such immunoglobulins to humans is regulated by the Federal Drug Administration (FDA), which requires threshold levels of purity and other quality control benchmarks. The inventive design of certain embodiments of the present disclosure can dramatically increase the purity of the biological molecule, while simultaneously decreasing the cost and time associated with purification, thereby increasing the efficiency of commercial scale production.

For instance, previous systems for commercial-scale antibody purification have employed protein A-conjugated beads in a packed chromatography column to bind the antibody and allow for purification of the Ig away from contaminants. The sample comprising the Ig is passed through the column in a buffer and at a flow rate sufficient to allow for binding of the Ig to the protein A. The process then involves washing of the Ig-bound column and elution of the Ig from the column through application of an elution buffer (e.g., having a pH low enough to reverse the binding of the Ig to protein A). However, protein A can be relatively expensive (e.g., about $12,000 per liter of protein A chromatography resin—compared to about $6 per liter for some aqueous two-phase systems). Accordingly, large-scale purification of an Ig via protein A can be cost prohibitive.

Protein A-mediated purification is also undesirable because of the changes in pH required to elute bound Ig from the Protein A-conjugated beads. Even small changes in pH can have a damaging, detrimental, or undesirable effect on a molecule of interest present in a sample or mixture. Therefore, a system that can yield high purity, high yield Ig without the potentially detrimental effects or risk associated with changing pH levels would be desirable.

Attempts at purifying commercial antibodies in alternative systems have likewise been cost, time, and/or work space-prohibitive or have other corresponding or associated negative consequences. For instance, effective purification of antibodies in a two phase, liquid-liquid extraction systems often requires the use of two phases having a low interfacial tension (antibodies and other protein can denature and/or be negatively affected in high interfacial tension systems). In these low interfacial tension systems, adequate settling of the two phases via passive settling can take many minutes or even hours. While high interfacial systems reduce settling times, they often negate antibody purification by allowing only incompatible carrier solutions.

Furthermore, the cost of such alternative extraction systems can be exorbitantly high. For instance, to achieve the levels of purification mandated by the FDA or other regulatory bodies, the sample will often require processing through dozens of purification stages. Batch-style purification stages can be performed or accomplished by repeating the process of (1) mixing the two-phase sample in a flask or other suitable container to allow transfer of an amount of antibody (or contaminant) from the first phase into the second phase, (2) allowing the mixture to passively settle and separate into lower (heavy) and upper (light) phase, and (3) harvesting the separated phases. The cost, time, and space associated with providing the number of purification stages necessary for effective purification can also be commercially prohibitive (especially for smaller or start-up companies seeking to enter the market, who lack the resources necessary to perform the same).

Similarly, column-style, continuous flow, high and/or low interfacial tension, two-phase liquid-liquid extraction can be inefficient, ineffective, and incredibly expensive compared to some embodiments of the present disclosure. Liquid-liquid extraction columns of various varieties are known in the art. They include static columns (e.g., sieve tray, random packing, and structured (SMVP) packing columns), as well as agitated columns (e.g., KARR®, SCHEIBEL®, rotating disc contractor (RDC), pulsed, and other specially-designed columns). One of skill in the art will appreciate, however, that such columns are not typically effective in effectuating efficient and adequate sample purification in the context of low interfacial tension systems compared to certain embodiments of the present disclosure.

Generally, exemplary liquid-liquid extraction columns include an upper, heavy phase inlet, a lower, light phase inlet (or sparger, in some cases), an upper, light phase outlet, a lower, heavy phase outlet, and a plurality of alternative sample or phase mixing and sample or phase settling zones. The heavy and light phase liquids are pumped into the column such that one of the phases is present at a higher concentration within the filled column. The higher concentration phase is termed the continuous phase and the lower concentration phase is termed the dispersed phase. As the heavy and light phases are pumped into the column, a means for mixing the two-phase sample in the phase mixing zones mixes the two phases and continues to mix the portion of the sample in the phase mixing zones. The portion of the sample in the phase-settling zones, however, is shielded or otherwise separated from the means for mixing, giving the dispersed and continuous phases time to passively coalesce or settle into two distinct phases. The heavy phase then settles and flows downward through the column (toward the next, adjacent, lower mixing zone) while the light phase settles and flows upward through the column (toward the next, adjacent, upper zone). The column can be operated until a steady state or homeostasis is achieved. Continuous addition and extraction from the column can then be initiated.

A molecule of interest introduced in one of the first or second phases (or a contaminant included in one of the first or second phases) can be transferred into a different phase upon proper, adequate, sufficient, or complete mixing (e.g., if the different phase presents conditions more favorable to the (solubility of) molecule of interest or contaminant than the original phase). In a multi-stage extractor system, each stage of mixing presents a new set of concentration differences between the two phases for a molecule of interest or contaminant. Thus, as the rising and falling phases pass through the plurality of mixing and settling zones, more and more of the molecule of interest or contaminant can be transferred into the different phase.

However, the time, space, and money required to produce a commercially viable sample of the molecule of interest can be prohibitively high in a passive settling system. For instance, in order to provide the level of purification described above for batch systems (defined in the art by the number of theoretical stages of batch purification) a passive-settling liquid-liquid extraction column may need to be up to 10 meters or more in height. Likewise, multiple tandem, side-by-side mixer-settlers, including columns and separate mixers and passive settlers, can occupy and entire work space, room, floor, or area, leaving insufficient room for a user to perform the purification. The cost of materials and operating and maintaining such systems (e.g., repairing and/or replacing large drive trains) is similarly a deterrent to users in the art.

Furthermore, the level of purification achieved by such passive systems is not ideal. For instance, because of the continuous nature of sample or fluid flow in these systems, the sample is in constant flux or movement. Thus, the sample may not remain in the passive settling zone long enough for the dispersed phase to coalesce and separate from the continuous phase. Accordingly, the portion of the sample harvested from the lower, heavy phase outlet may also comprise some undesirable light phase associated therewith. Similarly, the harvested light phase may be contaminated by heavy phase that was not effectively separated as the sample passed through the plurality of (alternating) phase mixing and phase settling zones. For instance, the residence time of the mixed sample in the settling zone(s) may not be sufficient for dispersed phase micro-droplets to co-localize and coalesce into a body having a mass or density sufficient to flow counter currently to the continuous phase, or vice versa. This phase contamination by an opposite phase can increase the concentration of impurities or contaminants and/or decrease the yield of molecule of interest. Those skilled in the art may commonly refer to such phase contamination as "flooding" or "entrainment."

To overcome this problem, users may decrease the sample flow rate (in and out of the column), thereby increasing the residence time of the mixed sample in the settling zones. Unfortunately, decreasing flow rate increases processing time, which can increase the cost of commercial production. In addition, decreasing flow rate can also increase aggregation of the molecule of interest (e.g., beyond approved regulatory levels, such as 1% for purified IgG) and/or decrease product yield due to column wetting as a portion of the molecule-containing phase sticks to the inside of the column.

Users may alternatively increase the size of the column to provide increased residence time (e.g., via larger and/or more settling zones) without the aforementioned decrease in sample flow rate. Indeed, as indicated above, certain existing columns can be up to 10 meters or more in height. Such column size, and the residence time associated therewith, may not be reasonable in some applications. Indeed, commercial production space may be relatively small (e.g., a room having a standard ceiling height of between 2.4 meters and 3.2 meters). Moreover, the increased residence time increases the processing time, which can increase the cost of commercial production further.

In addition, users may reduce mixing (e.g., by decreasing agitation or incorporating less aggressive means for mixing the sample). The lower rate of agitation maintains higher droplet sizes of phase one or two, and thus increases the rate and/or degree of coalescence and/or settling. However, this may result in incomplete mixing and a lower rate of molecule or contaminant transfer. Accordingly, the raffinate may still contain substantial amounts of the molecule of interest while the extract may still contain substantial amounts of contaminant. Lower mixing rates may also increase aggregation as described above. Thus, there exists a need for efficient, cost-effective, commercially viable extraction that allows for aggressive agitation or mixing of the sample to effectuate high rates of molecular transfer, without increasing residence time or with decreased residence time, and/or without increasing the column size or with decreased column size, to achieve high sample yield and/or purity, and/or with low levels of molecular aggregation.

Accordingly, embodiments of the present disclosure provide systems and method for efficient, cost-effective, commercially viable sample purification that allows for aggressive agitation or mixing of a two phase sample to effectuate high rates of molecular transfer, without increasing residence time or with decreased residence time, and/or without increasing the column size or with decreased column size, to achieve high sample yield and/or purity, and/or with low levels of molecular aggregation.

It will also be appreciate that certain embodiments of the present disclosure can comprise or involve more than two phases, such as three, four, five, or more phases. Indeed, in certain petroleum applications, three or more phases can be mixed to effectuate the extraction and/or purification of at least one molecule of interest (e.g., a hydrocarbon). For instance, a first phase can initially comprise a molecule of interest and at least two contaminants. A second phase can be configured for solubility and/or extraction of the first contaminant, and the third phase can be configured for solubility and/or extraction of the second contaminant, thereby processing, purifying, and/or extracting the molecule of interest from a mixture of the first, second, and third phases.

Some embodiments of the present disclosure overcome these and other problems with two-phase liquid-liquid extraction columns with acoustic wave-assisted, active settling of the mixture into separate and/or distinct phases. Certain embodiments described herein incorporate acoustic wave generators or settlers adjacent to, within, or otherwise associated with one or more settling zones such that the portion of the sample in said zone(s) is exposed to the acoustic wave(s) generated thereby. The acoustic wave(s) can be applied to the sample at one or more intermediate settling zones and/or one or more terminal or end settling zones.

Exposure of the sample to the acoustic wave(s) can decrease the amount of time required to adequately separate phases by enhancing coalescence of phase(s) to form larger phase bodies. It will be appreciated, however, that such acoustic settling does not include ultrasonic or other forms of acoustic mixing of samples. While such acoustic mixing is contemplated herein, acoustic settling of the mixed, two-phase sample refers to enhancing separation, not mixture of the phases. One will also appreciate that more than two phases can also be included in some embodiments of the present disclosure.

Such active acoustic settling can reduce the column height (and/or width, diameter, radius, etc.) requirements of or relative to existing sample purification columns. For instance, a typical or illustrative SCHEIBEL® column configured to process a sample comprising a mixture of two phases having or exhibiting an interfacial tension of between 20-40 dynes/cm can perform at a ratio of about 0.5-2.0 meters per theoretical stage. A typical or illustrative KARR® column configured to process a sample comprising a mixture of two phases having or exhibiting an interfacial tension of between 10-30 dynes/cm can likewise perform at a ratio of about 0.5-2.0 meters per theoretical stage.

However, certain embodiments of the present disclosure, can be configured to process a sample comprising a mixture of two or more phases having or exhibiting interfacial tension(s) as low as 8 dynes/cm, 5 dynes/cm, 4 dynes/cm, 3 dynes/cm, 2 dynes/cm, 1 dyne/cm, 0.5 dynes/cm, 0.25 dynes/cm, 0.1 dynes/cm, or 0.05 dynes/cm and/or can perform at a ratio of about 0.1-0.5, 0.1-0.4, 0.1-0.3, 0.1-0.25, 0.1-0.2, or 0.1-0.15 meters per theoretical stage. Thus, some embodiments of the present disclosure can (be configured to) process a sample comprising a mixture of two or more phases having or exhibiting interfacial tension(s) lower than existing systems are configured to or capable of processing efficiently, sufficiently, suitable, and/or desirably. Likewise, some embodiments of the present disclosure can (be configured to) perform at a ratios lower than existing systems are configured to or capable of performing efficiently, sufficiently, suitable, and/or desirably.

Furthermore, some embodiments of the present disclosure can (be configured to) provide levels of performance greater than or equal to existing columns at a fraction of the height (and/or width, diameter, radius, etc.). For instance, some embodiments of the present disclosure can include a fluid processing system comprising a sample purification column configured for active acoustic settling of a fluid sample and at least one acoustic settling element. The fluid processing system can (be configured to) perform at a ratio of about 0.1-0.5, 0.1-0.4, 0.1-0.3, 0.1-0.25, 0.1-0.2, or 0.1-0.15 meters of column height per theoretical stage while having a column height of about 90%, 80%, 70%, 60%, 50%, 40%, 30%, 20%, 10%, or 5% of the column height required to process the fluid sample without active acoustic settling and achieve the same level of performance or level of purification.

Certain embodiments of the present disclosure can similarly accomplish or effectuate purification of a molecule of interest up to 80%, 85%, 90%, 95%, 96%, 97%, 98%, 99%, 99.9%, or more (in terms of percent yield of product input and/or percent purity of yielded product). Some embodiments can accomplish or effectuate such levels of purification in a sample purification column having a height less than 6 meters, less than 5 meters, less than 4 meters, less than 3 meters, less than 2 meters, less than 1.5 meters, less than 1.25 meters, less than 1 meter, between 0.15 meters and 4 meters, between 0.5 meters and 3 meters, or between 1 meter and 2 meters. Thus, embodiments of the present disclosure can dramatically improve the level of purification, efficiency, and/or performance possible in a liquid-liquid extraction column purification environment and can reduce the cost, size, space, time, and/or ratio (of meters of column height per theoretical stage) of existing systems.

In some embodiments, the addition of active acoustic separation can permit or allow for scaling up of the sample of mixture (e.g., to industrial levels). For instance, the addition of active acoustic separation can permit or allow for the processing volume to be increased by increasing or expanding the width (or diameter, radius, etc.) of the column (e.g., without a substantial or significant increase in height). Certain embodiments may require and/or involve increasing and/or expanding the acoustic settler (e.g., in size) in order to increase the processing volume by increasing or expanding the width (or diameter, radius, etc.) of the column (e.g., without a substantial or significant increase in height). Some embodiments can include columns having a height suitable for operation in a research lab, clean room, warehouse, or other room, and/or on a work bench, stand, base, or cart that is place on the floor. At least one embodiment includes a column that can fit within a room having a standard ceiling height of less than 6 meters, preferably between 2 meters and 4.4 meters, more preferably between 2.2 meters and 3.8 meters, even more preferably between 2.4 meters and 3.2 meters.

In existing systems (e.g., KARR® columns, etc.), in order to maintain levels of performance, efficiency, and purification, increasing the processing volume (e.g., by increasing the width, diameter, radius, etc.) of the column often requires a dramatic increase in the height of the column. As the diameter of the column increases, the efficiency of the column decreases. Therefore, in order to retain suitable efficiency levels, the height of the column must be increased to maintain the number of theoretical stages of purification attainable through use of the column. For instance, in order to increase the diameter of a standard KARR® column and maintain levels of performance, efficiency, and purification, the height of the column would need to be increased by up to a power of 3 relative to the increase in diameter. Eventually, such scaling up results in a system too big, too expensive, and too inconvenient to build, operate, clean, maintain, sterilize, etc. In addition, such columns are not generally known to be compatible with low interfacial system. Accordingly, existing column systems present a number of problems and disadvantages to the skilled artisan seeking to scale up a purification system, obtain high levels or product purity, and/or extract molecules in a low interfacial tension system.

By way of illustrative example, a low interfacial tension system (e.g., at less than about 1 dyne) may have a terminal droplet velocity of between 0.02 m/s and 0.03 m/s and a terminal droplet size of about 1 mm, 2 mm, or 3 mm when the light phase is dispersed into the heavy phase or a terminal droplet velocity of 0.008 m/s or less and/or a terminal droplet size of about at 1 mm, 2 mm, or 3 mm when the heavy phase is dispersed within the light phase. For the purposes of the following example, only the more common and/or typically faster settling light phase dispersed within the heavy phase will be considered.

Mixing of the two phase system in order to effectuate and/or facilitate efficient transfer of a product (e.g., molecule of interest) or contaminant from one phase to another may result in the formation of micro-droplets (e.g., having a mean droplet size anywhere between about 10 microns and about 80 microns, or less, in diameter), which may have and/or correspond to a much smaller settling velocity (e.g., between about $7\times10-6$ m/s and $1.6\times10-4$ m/s; up to 1000-fold or more slower than the terminal droplet velocity). Coalescence and/or aggregation of a 10 micron droplet even to a 100 micron droplet, for example, may increase the settling velocity of that droplet from $7\times10-6$ m/s to $2.2\times10-4$ m/s (i.e., according to [(Drop Diameter/2)^(3/2)]); a 31× increase in settling velocity. This increase in settling velocity correlates with a decrease in required settling time, which correlates with a decrease in required settling zone, and therefore, column size.

Embodiments of the present disclosure are configured to apply an acoustic wave to enhance the coalescence and/or aggregation of micro-droplets (e.g., up to the terminal droplet size). For instance, embodiments of the present disclosure can acoustically co-localize phase micro-droplets that are less than or equal to about 80, 50, 30, 25, 20, 15, 10, 5, 4, 3, 2, or 1 micron in diameter such that the co-localized droplets can coalesce and/or aggregate into one or more droplets or bodies having a diameter of greater than or equal to 90, 100, 150, 200, 250, 300 microns (or more) and in less than or equal to 5, 4, 3, or 2 minutes or less than 90, 75, 60, 45, 30, 20, 15, 10, or 5 seconds. Illustratively, a 1 micron phase droplet having a settling velocity of about $2.23\times10-7$ m/s can be acoustically co-localized, coalesced, and/or aggregated (with other droplets (e.g., of the same phase)) to a 300 micron droplet having a settling velocity of about $1.16\times10-3$ m/s settling velocity (or a 5200× increase in settling velocity) in less than about 10 seconds. Thus, embodiments of the present disclosure can increase the settling velocity of micro-droplets by at least 5×, 10×, 15×, 20×, 25×, 30×, 40×, 50×, 100×, 500×, 1000×, 2000×, 3000×, 4000×, 5000×, or more in less than about 10 seconds. Moreover, the application of acoustic waves to increase droplet size and settling velocity in embodiments of the present disclosure can improve efficiency and/or performance, reduce impurities, aggregates, and/or system (e.g., extraction column) size, and/or save a significant amount of time, manpower, money, and resources.

In at least one embodiment, acoustic-assisted coalescence and/or settling in a liquid-liquid extraction system can allow for increased agitation to effectuate more efficient mass transfer and/or in a shorter period of time (e.g., while maintaining or improving equivalent settling behavior), over existing systems. For instance, an illustrative, existing liquid-liquid extraction system may agitate a two-phase mixture at a rate of 76 Watt/m3 in order to maintain a mean droplet size of about 91 microns. At typical sample flow rates through, and retention times within the system, the 91 micron droplet size may allow for substantially complete phase separation, but may result in a per-stage efficiency of only about 19% (e.g., if the droplet size is maintained through mixing for about 1 minute). Typically, a population of droplets having an average 91 micron droplet size may require 5 minutes or more to fully settle out (e.g., with other, co-localized droplets and/or to the terminal droplet size). In order to purify an exemplary product of interest given a 5 minute settling time, 10 theoretical stages of extraction may be required. Accordingly, the 19% stage efficiency system may require about 53 physical stages to achieve 10 theoretical stages of extraction.

Because of the low agitation rate, only a small amount (e.g., less than 2%), if any, of opposite phase micro-droplets may contaminate each phase. However, 53 physical stages will occupy an unusually large amount of space (e.g., work surface area, column height/width, etc.). For instance, a 53 physical stage system, with an industry standard 1 minute mixing residence time and 5 minute settling residence time, sized to process a 20,000 liter bioreactor (e.g., harvest twice per day) may require an extraction column height of about 18.8 meters, or more (e.g., with a standard design; see e.g., container assembly 12g of FIG. 15). Operation of such a column would be infeasible for a ceiling height restricted industrial purification (clean) suite. In addition, while such mega-columns may achieve greater than 20% efficiency under certain operating conditions, the system may require hours of set-up, start-up, and operation to achieve the desired results. Accordingly, such operation can be space, time, and cost prohibitive, making the system economically infeasible.

To increase the stage efficiency and thereby reduce the number of required physical stages, as well as the time, space, and cost associated with the above system, the sample may be agitated more vigorously to produce smaller droplets (e.g., less than or equal to 80, 70, 60, 50, 40, or 30 microns in average diameter), facilitating more efficient transfer of the molecule between phases. However, small droplets require more time to settle, requiring a larger column and more residence time. Accordingly, users are left to choose between stage efficiency and time, space, resources, etc.

Acoustic-assisted embodiments of the present disclosure can be agitated at a rate of about 2000 Watt/m3, for example, which can reduce the mean droplet size to about 25 microns, which may correspond to and/or result in a stage efficiency of 51% (e.g., if the droplet size is maintained through mixing for 1 minute). The acoustic waves are then able to aggregate the droplet size to, or above, the 91 micron size of existing systems, enabling settling within the same 5 minute settling time period, but without requiring the massive column size of existing systems. Thus, the acoustic-assisted systems of the present disclosure may only require about 20 physical stages, instead of 53, as in the present example (a 2.65× decrease in the number of physical stages, or physical purification system volume, and with up to, at least, about, or greater than a 2.5× increase in per-stage efficiency).

By way of direct comparison, a 20 physical stage system, identically sized to process a 20,000 liter bioreactor (e.g., harvest twice per day) may only require an extraction column height of about 7.1 meters. Accordingly, operation of such an acoustically settled column may be able to fit within a ceiling height restricted industrial purification (clean) suite. Embodiments of the present disclosure can achieve per stage efficiencies greater than or equal to about 20%, 25%, 30%, 35%, 40%, 45%, or 50%. Moreover, the foregoing efficiencies can be achieved with less than or equal to about 50, 45, 40, 35, 30, 25, or 20 physical stages. Embodiments can also accommodate the formation of phase droplets less than or equal to 90, 85, 80, 75, 70, 65, 60, 55, 50, 45, 40, 35, 30, 25, 20, 15, 10, or 5 microns, and still achieve a settling time of less than or equal to 30, 25, 20, 15, 10, 5, 4, 3, or 2 minutes. Embodiments of the present disclosure can further be agitated at rates ranging from greater than about 76 Watt/m3 to at least about 2000, 3000, or 4000 Watt/m3 (e.g., to intentionally generate phase droplets having a mean droplet size ranging from about 10 microns to about 80 microns), resulting in per stage efficiencies greater than, equal to, between, and/or about 20%, 25%, 30%, 35%, 40%, 45%, 50%, 55%, or 60% (e.g., by maintaining the mean droplet sizee through mixing for 1 minute). In some embodiments, the mixing or agitation rate can correspond to the power input (or output) of rotating an impeller in a column system to mix the liquids and/or phases. In other embodiments, the mixing or agitation rate can correspond to the power input (or output) of forcing the liquids through the column to be mixed thereby (e.g., in a static mixing system). Thus, embodiments of the present disclosure can further be agitated at rates less than about 76 Watt/m3 (e.g., between about 10-50 Watt/m3). These lower mixing rates can produce droplet size of up to, at least, or about 250 microns.

The acoustic systems of the present disclosure are, therefore, able to deliver identical or improved performance, of or over the non-acoustic systems, but without the increased size requirement, allowing the column to fit within indoor, controlled, ceiling height restricted biotechnology (clean) facilities. It is also noteworthy that the increased size of the non-acoustic system (i.e., 2.65× greater volume) requires 2.65× or more time for startup operations to reach steady state behavior. For pharmaceutical and biotechnological applications which are primarily batch processes, this startup operation must be done every 2 weeks or shorter. The increased startup time results in process delays.

Compared another way, the acoustic and non-acoustic systems can both be sized to 20 physical stages, maintaining the acoustically assisted column at 10 theoretical stages and the non-acoustic column at 3.8 theoretical stages. A model therapeutic antibody feed in a purification process may leave the 10 theoretical stage product phase having a product yield of greater than 95% at a purity level of about 85% or more. The 3.8 theoretical stage systems, however, may only yield 80% of the product at a purity level of 50% or less.

In addition, the product of interest may not be completely stable in the extraction solution(s). For example, during purification operations (where the product is not kept cold, as usual), a therapeutic antibody may aggregate at an exponentially higher rate. A 2.65× increase in column size corresponds to 2.65× greater time within the column. The typical percentage of aggregate for an antibody may be about 0.1%, 0.5%, or 1% (of total antibody). Time-consuming operation of the non-acoustic system may increase aggregation by 0.5% or more. The faster acoustics-assisted systems, however, may increase aggregation by only 0.25% or less. Industry standards and/or government regulations may institute benchmark limits for aggregation. For instance, the U.S. Food and Drug Administration (FDA) mandates that less than 1% of the therapeutic antibody product be in the aggregate form. Accordingly, the additional 0.25% aggregation in the case of the non-acoustic system may cause significant issues in progress to a purified drug for human injection. Embodiments of the present disclosure may, therefore, provide up to a 0.1%, 0.2%, 0.25%, 0.5%, 0.75%, 1%, 1.25%, 1.5%, 1.75%, or 2% decrease in product aggregation (e.g., over existing systems that provide comparable product yield and/or purity). Some embodiments can provide up to or greater than a 5%, 10%, 15%, 20%, 25%, 30%, 35%, 40%, 45%, 50%, 55%, 60%, 65%, 70%, 75%, 80%, 85%, or 90% decrease in the percentage of aggregates in the harvested product.

Furthermore, at an illustrative mean droplet size of about 30 microns, the majority of the droplets may settle within about 2, 5 or 10 minutes. However, between 2% and 15% of the light phase will still be suspended within the heavy phase, and/or between 2 and 15% of the heavy phase suspended within the light phase (e.g., as micro-droplets much smaller than the mean droplet size of 30 microns). The 2% to 15% of the liquid phase trapped in the opposite phase directly corresponds to 2% to 15% loss of product or contamination of the product. The 2% to 15% represents an unacceptable level or product loss and/or product contamination in industrial applications.

In standard systems, counteracting the yield and/or contamination problems above may require the agitation rate to be reduced to increase the droplet size. However, increasing droplet size decreases per stage efficiency, requiring additional physical stages to maintain levels of yield and purity. Alternatively, the settling (residence) time can be increased to greater than 10 minutes, 15 minutes, 20 minutes, 25 minutes, 30 minutes, 45 minutes, 1 hour, or more. The increased settling time may be facilitated and/or effectuated by slowing the flow rate or increasing the settling or residence time (e.g., by 3× to 15×, or more) over the original by increasing the size of the column or settling zones.

In acoustically-assisted systems of the present disclosure, however, droplets less than 30 microns in size can be captured in the acoustic wave and coalesced with other co-localized droplets, until the mean droplet size is about 30 microns or greater. The acoustic system can thereby maintain the 2, 5 or 10 minute settling time originally targeted, while capturing the 2% to 15% product or contamination with the remaining phase liquid. It should be further noted, that even at the 20 or 30 minute increased settling time, 1% to 2% product yield loss or contamination may occur by a small number of droplets of diameter less than 2 microns which may take greater than 12 hours to settle passively in existing systems. Embodiments of the present disclosure, however, can capture even these micro-droplets to achieve up to 95%, 96%, 97%, 98%, or 99% product yield and/or purity.

Other Embodiments

As previously mentioned, illustrated in FIG. 8 is an alternative embodiment of a fluid purification system 10b incorporating features of the present disclosure. Fluid purification system 10b comprising a rigid support housing 14 (comprises support housing 15c and 15d), a container assembly 12b partially disposed within support housing 14, mixer system 18 communicating with container assembly 12b, shielding elements 61 disposed within container assembly 12b and an acoustic settler 16b coupled with each conduit 13 of container assembly 12b. Except as noted below, fluid purification system 10b is substantially the same as fluid purification system 10a and thus the above discussion of all of the components, assembly, method us use, operation, and alternatives discussed with regard to fluid purification system 10a are also applicable to fluid purification system 10b.

Fluid purification system 10b differs from fluid purification 10a in that conduits 13f-g are depicted as having a square or rectangular transverse cross section that extends between sub-containers 17c and 17d. As such, conduits 13*f-g* have opposing flat faces against which acoustic settler 16*b* can be positioned or attached. Forming conduits 13 with opposing flat faces makes it easier to align and/or attach acoustic settler 16*b* thereto and helps to ensure the that the fluid passing through conduits 13 is being properly subjected to the acoustic wave.

In further contrast to fluid purification system 10*b*, support housings 15*c* and 15*d* bound chambers 30*b* that each have a substantially square or rectangular transverse cross. Thus the interior surface of the sidewall of support housings 15*c* and 15*d* have one or more flat faces and typically comprise a plurality of flat faces. When sub-containers 17*c* and *d* are positioned within chambers 30, sub-containers 17*c* and 17*d* are molded to have substantially flat faces. That is, sub-containers 17*c* and 17*d* can have one or more flat faces and typically are comprised of a plurality of flat faces. Sub-containers 17*c* and 17*d* can also be formed so that when they are inflated outside of support housings 15 that they have a substantially square or rectangular cross section with rounded corners. By forming or molding sub-containers 17 to have one or more substantially flat faces, it makes it easier to attach conduits 13 having a square cross section to the flat face. This can be done by welding the end of conduit 13 directly to the flat face or by using a port to connect the conduit to the container.

Figure 9A:
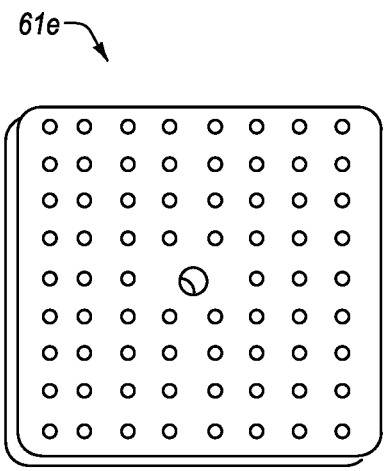
FIG. 9A is a perspective view of another shielding element according to an embodiment of the present disclosure.
Figure 9B:
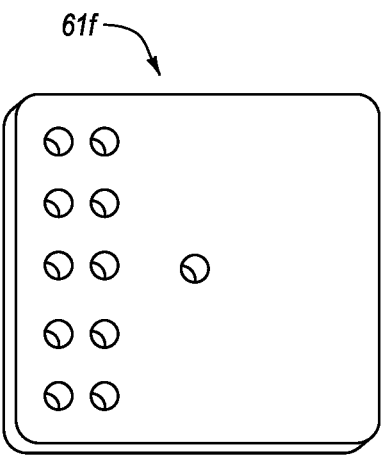
FIG. 9B is a perspective view of another shielding element according to an embodiment of the present disclosure.
Figure 9C:
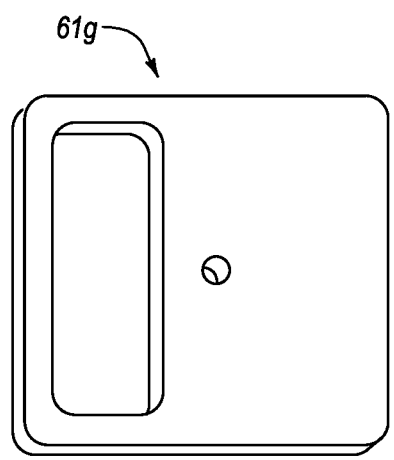
FIG. 9C is a perspective view of another shielding element according to an embodiment of the present disclosure.

Because sub-containers 17*c* and 17*d* have a substantially square or rectangular cross section, shielding element 61 can be formed having a complementary configuration. Specifically, FIGS. 9A-9C depict embodiments of shielding elements 61*e-g* having a substantially square or rectangular configuration with a plurality of flat side edges having the same alternative types of openings as previously discussed with regard to shielding element 61 depicted in FIGS. 6A-6D. Other configurations and openings can also be used.

FIGS. 10A-10D illustrate an exemplary acoustic settler 16*e* suitable for use with conduits 13*f-h* having a square or rectangular cross section. For instance, FIG. 10A illustrates a perspective view of an acoustic settler 16*e* mounted, connected, attached, and/or associated with conduit 13*f*. FIG. 10B illustrates a cross-sectional view of acoustic settler 16*e* depicted in FIG. 10A. As illustrated in FIG. 10B, an acoustic wave transducer 116*g* and an acoustic wave reflector 116*h* can be connected together by an attachment mechanism 19*a* so that they encircle conduit 13*f*.

FIG. 10C illustrates a cross-sectional view of an alternative acoustic settler 16*b* comprising an acoustic wave transducer 116*i* and an opposing acoustic wave reflector 116*j* positioned opposite thereof. Transducer 116*i* and reflector 116*j* are connected or mounted to opposing sides of conduit 13*f* via attachment mechanism 19*b* without being connected to each other. As such, transducer 116*i* and reflector 116*j* do not encircle conduit 13*f*. FIG. 10D illustrates a cross-sectional view of another acoustic settler 16 comprising an acoustic wave transducer 116*i* and an acoustic wave reflector 116*j* that are mounted on a support 19*e* so as to be disposed on opposing sides of conduit 13*f* but do not directly connect to conduit 13*f*. In this last embodiment, acoustic wave transducer 116*i* and acoustic wave reflector 116*j* can be spaced apart from or press against conduit 13*f*.

Figure 11:
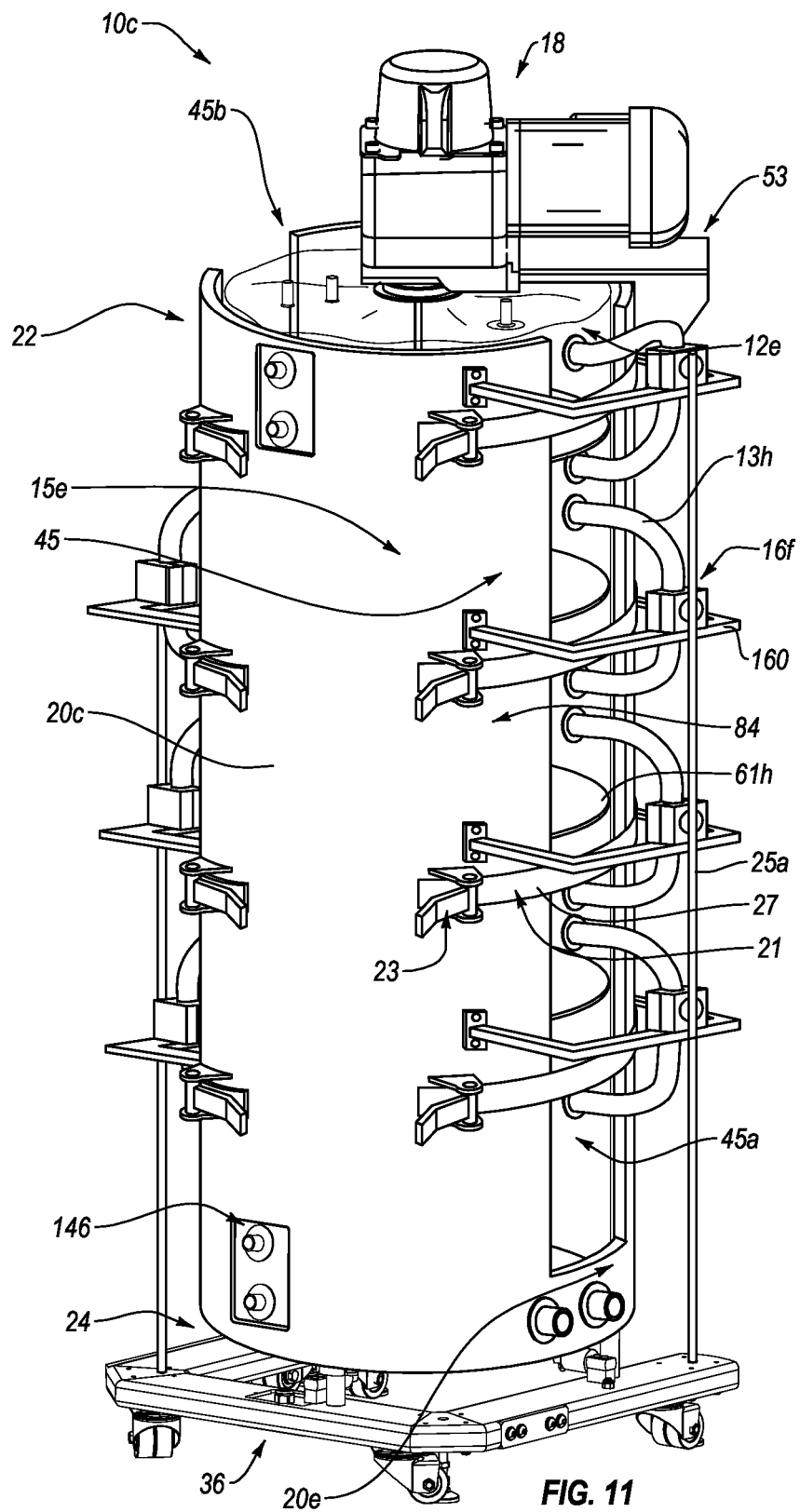
FIG. 11 is a perspective view another alternative embodiment of the sample purification system shown in FIG. 1.

FIG. 11 illustrates an alternative embodiment of a fluid processing system 10*c* incorporating features of the present disclosure. Like elements between fluid processing systems 10*a* and 10*c* are identified with like reference characters and all of the above discussion on components of system 10*a* is also applicable to like components of system 10C. Fluid processing system 10C comprises a rigid support housing 15*e* having a container assembly 12*e* disposed at least partially therein. Rigid support housing 15*e* has substantially the same configuration as rigid support housing 15*a*, including a cylindrical sidewall 20*e*. As such, like elements between housing 15*a* and 15*e* are identified by like reference characters, and except as noted below, all of the components, assembly, method us use, operation, and alternatives discussed with regard to housing 15*a* are also applicable to housing 15*e*.

The primary difference between housing 15*a* and 15*e* is that in contrast to having a single transfer slot 45, housing 15 has transfer slots 45*a* and 45*b* formed on opposing sides thereof. As a result, sidewall 20 comprises a first sidewall panel 20*c* and a second sidewall panel 20*d* with transfer slots 45*a* and 45*b* disposed therebetween. Transfer slots 45*a* and 45*b* can be configured to accommodate conduits 13*h*, as discussed further below, that project out through the transfer slots 45. As needed, sidewall panels 20*c* and 20*d* can be secured together by one or more support members 21 that extend between sidewall panels 20*c* and 20*d* across transfer slots 45*a* and 45*b*. In one embodiment, support member 21 can comprise one or more straps 27 attached to sidewall panels 20*c* or 20*d* and a fastener 23 secured to the other panels 20*c* or 20*d* and engaging strap 27. Other support members can also be used such that when container assembly 12*e* is positioned within housing 15*e* and filled with a fluid, first sidewall panels 20*c* and 20*d* are held, secured, or supported in a desired configuration. In at least one embodiment, first sidewall panels 20*c* and 20*d* are restrained from bending, bowing, leaning, bulging, or otherwise moving away from one another.

Container assembly 12*e* comprises a container 17*e* which can have the same configuration and be made of the same materials and have the same alternatives as sub-container 17*a* discussed above. Container assembly 12*e* includes mixer system 18 (previously discussed) with mixer assembly 78 thereof being attached to container 17*e*. Disposed within compartment 50*e* of container 17*e* is a plurality of shielding elements 61*h* which are the same as shielding element 61*a* as previously discussed except that no openings 67*a* extend therethrough through which fluid can pass. All of the other alternatives previously discussed with regard to the design, placement, attachment (both to container 17*e* and tubular connector 80), composition, and the like of prior shielding element 61 are also applicable to shielding elements 61*h*. Shielding elements 61*h* divide compartment 50*c* into a plurality of mixing zones 31*f*-31*h*, which are sequentially disposed, and settling zones 33*f* and *g* which are disposed at the opposing ends of container 17*e*.

Figure 12:
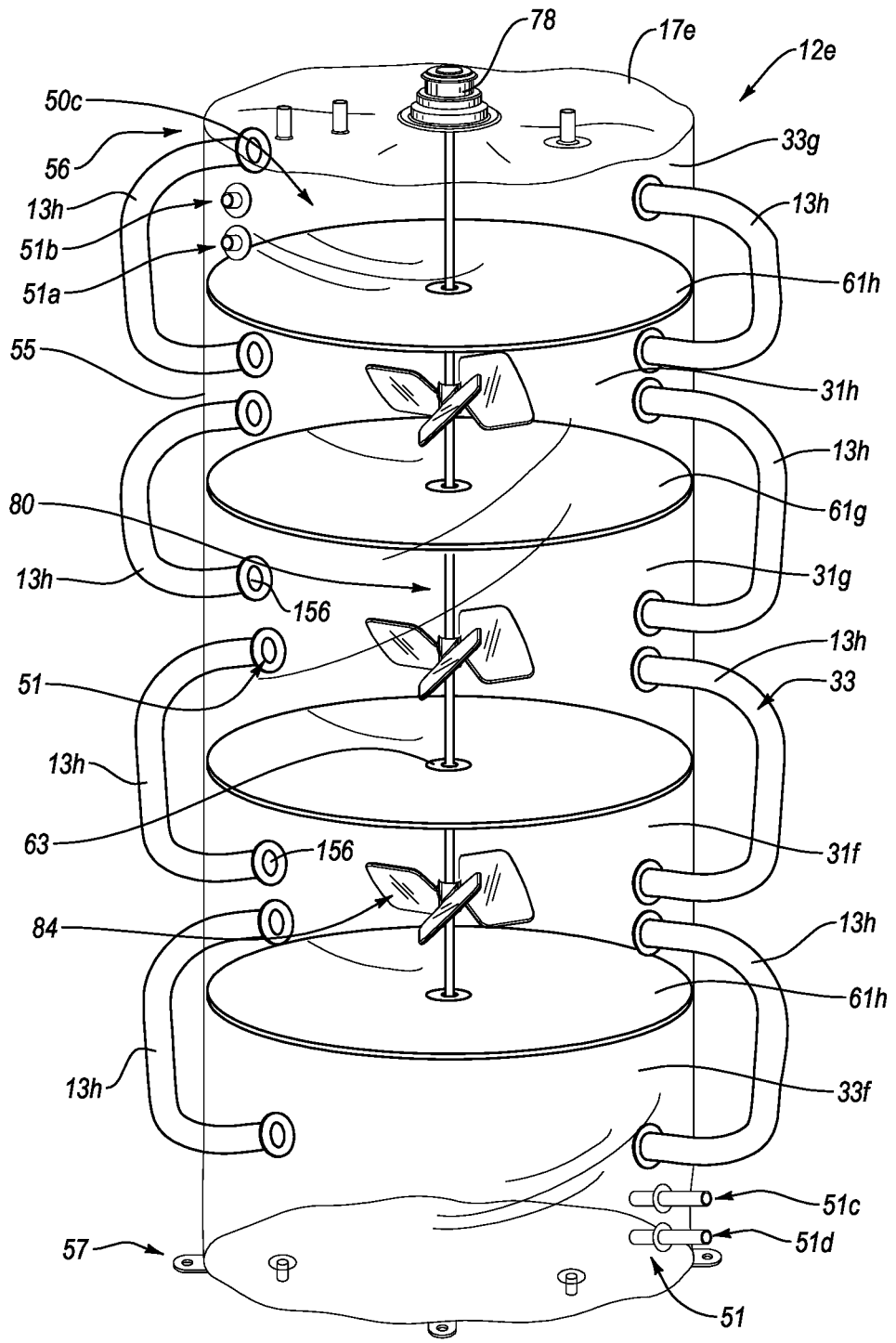
FIG. 12 is a perspective view of a container assembly of the fluid processing system of FIG. 11.

Conduits 13*h* fluid connect adjacent mixing zones 31*f*-31*h* of compartment 50*c*. For example, FIG. 12 illustrates a conduit 13*h* having one end fluid coupled on the exterior of container 17*e* so as to communicate mixing zone 31*f* and has an opposing second end fluid coupled on the exterior of container 17*e* so as to communicate mixing zone 31*g*. As such, mixing zones 31*f* and 31*g* are fluid coupled together with conduit 13*h* which extends outside of container 17*e* (e.g., outside of compartment 50*c*). Other conduits 13*h* similarly extend between mixing zones 31*g* and 31*h*, between zones 31*h* and 33*g* and between zones 33*f* and 31*f*. As such, all of the mixing zones 31 and settling zones 33 can be fluid coupled together in series through conduits 13*h*. Here it is noted, as discussed further below, that portions of fluid path 156 within conduits 13*h*, particularly within those extending between mixing zones 31, function as a plurality of settling zones like settling zone 33. That is, a fluid mixture disposed therein settles within fluid path 156 before being reintroduced into the next mixing zone 31. Conduits 13*h* can be the same as and have all of the same alternatives as the other conduits 13 discussed herein.

A first set of conduits 13h can extend in series along first side of container 17e so that they can be received within transfer slot 45a while a second set of conduits 13h can extend in series along an opposing second side of container 17e so that they can be received within transfer slot 45b. In other embodiments, other sets of conduits 13h can also be used. Acoustic settlers 16f, which can be the same as any of the other acoustic settlers previously discussed herein, are aligned with each of the conduits 13h so that an acoustic wave can be passed therethrough so as to assist in settling the fluid passing therethrough as previously discussed. Acoustic settlers 16f can be mounted on a support 160 which may be coupled to support housing 15e and/or can be coupled directly to conduits 13h. Acoustic settlers 16f can also be mounted to a support (rod) 25a which may be coupled to support(s) 160 and/or base 36.

Figure 13:
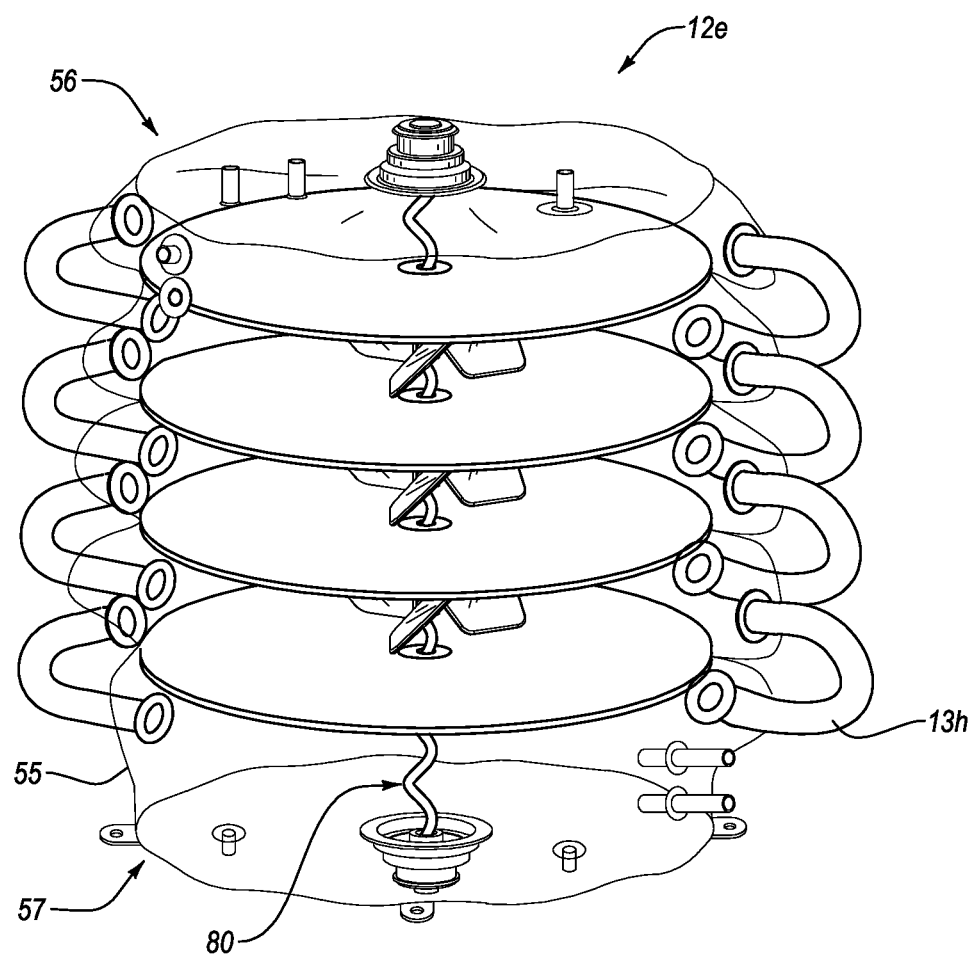
FIG. 13 is a perspective view of the container assembly of FIG. 12 in a collapsed configuration.

In view of the foregoing, mixing zones 31 can be in fluid communication one with another via settling zones comprised of fluid path 156 within conduits 13h. Mixing zones 31 can be arranged in a substantially vertical relationship and conduits 13h can extend at least partially laterally (or radially) from container 17e (or outer wall thereof) and/or at least partially axially from a lower mixing zone 31 to or toward an adjacent upper mixing zone 31. Conduits 13h can form a loop that extends outside of compartment 50c such that settling zone 33/156 is distinct and/or separated from mixing zone 31. Conduits 13h can also have any desired transverse cross section including circular, square, polygonal or the like. In addition, various embodiments of the present disclosure can include any suitable number of conduits 13. For instance, an embodiment can have 1, 2, 3, 4, 5, 6, 7, 8, 9, 10 or more conduits 13. Thus, in this embodiment, mixing zones 31, settling zones 33 and fluid path 156 within each conduit 13h combined to for the sample purification chamber of container assembly 12e. Because members of container assembly 12e can be formed as being flexible, container assembly 12e can be collapsed, as depicted in FIG. 13, in the same way as previously discussed with regard to container assembly 12

Fluid processing system 10c operates in substantially the same way as fluid processing system 10a. Specifically, the first liquid is introduced into settling zone 33g of container assembly 12e via a first opening 51a and a second liquid is introduced into settling zone 33f of container assembly 12e via a second opening 51c (or vica versa depending on the density of the phases). The density of the first phase causes it to settle to the bottom of container assembly 12e while the density of the second phase causes it to rise to the top of container assembly 12e. Because shielding elements 61h are designed to prevent the flow of fluid thereby, the first and second phases must pass through conduits 13h in order to flow along container assembly 12e.

Accordingly, the first phase passes sequentially from settling zone 33g into mixing zone 31h via conduits 13h extending therebetween, then into mixing zone 31g via conduits 13h extending therebetween, then into mixing zone 31f via conduits 13h extending therebetween, and finally into settling zone 33f via conduits 13h extending therebetween. Similarly, the second phase passes sequentially from settling zone 33f to mixing zone 31f, then 31g, then 31h, and finally into settling zone 33g via conduits 13h fluid disposed therebetween.

In each of the mixing zones 31f-31h, the first phase and second phase are mixed via respective mixing elements 84 disposed therein to effectuate the transfer of a molecule of interest from one of the first and second phases to the other phase. The mixing turbulence also promotes the flow of fluid mixture into conduits 13h, which is shielded from the fluid turbulence of the mixing zones 31. Accordingly, at least portions of fluid path 156 disposed within conduits 13h comprise a plurality of settling zones disposed between mixing zones 31.

Referring to FIG. 11, one or more acoustic settlers 16f attached to conduits 13h apply an acoustic wave to the portion of the mixture in each conduit 13h. As the dispersed phase droplets coalesce in each conduit 13h, enhanced by acoustic settler 16f, the first phase settles down in conduit 13h and enters or re-enters the lower mixing zone 31 while the second phase rises up in conduit 13h and enters or re-enters the upper mixing zone 31.

The portion of the first phase that reaches the lower end 57 of container assembly 12e is removed therefrom via fluid outlet 51d. Similarly, the portion of the second phase that reaches the upper end 56 of container assembly 12e is removed therefrom via fluid outlet 51b.

Figure 14:
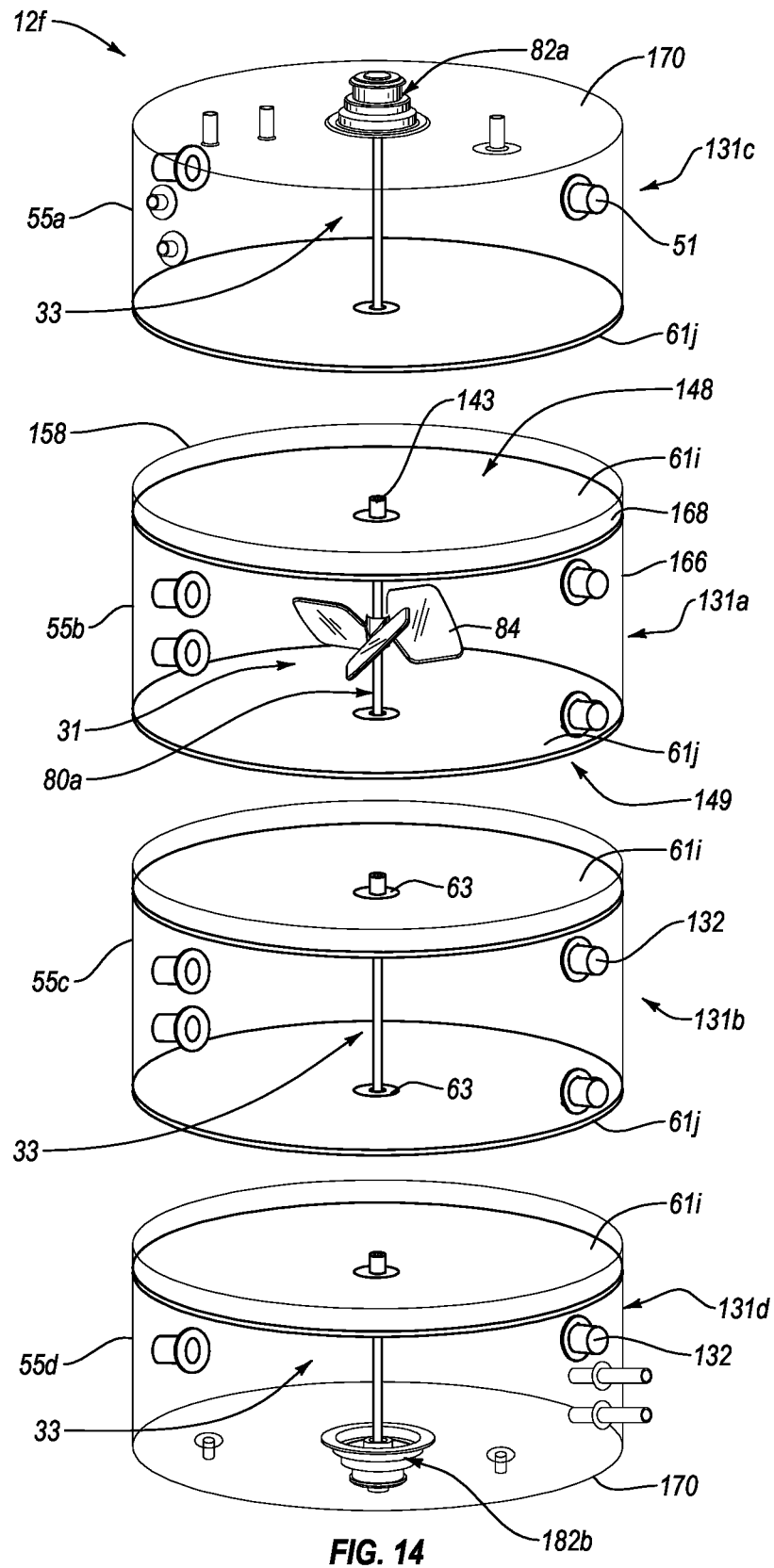
FIG. 14 is a perspective view of the modular container assembly according to one embodiment of the present disclosure.

In at least one embodiment, a container assembly 12 can have a modular configuration. For example, as illustrated in FIG. 14, a container assembly 12f can comprise a plurality of stackable modules 131, including one or more mixing modules 131a, optionally one or more settling modules 131b, a top modules 131c, and a bottom modules 131d. In certain embodiments, any desired number of mixing modules 131a or alternating mixing modules and settling modules 131b can be stacked in a vertical relationship to form a plurality of vertically arranged mixing zones 31 (and optional settling zones 33).

Each mixing module 131a and settling module 131b comprises an upper shielding element 61i, and opposing lower shielding element 61j, and an encircling sidewall 166 extending therebetween. Shielding elements 61i and 61j can be the same as shielding element 61h, previously discussed. In one embodiment of the present disclosure, means are provided for securing modules 131 together. In one embodiment of such means, upper shielding element 61i can have a annular flange 168 upstanding around the perimeter edge thereof. Flange 168 is configured so that lower shielding element 61j can be received within the recess bounded by flange 168 so that modules 131a and 131b nest together. In an alternative embodiment, any number of fasteners, clamps, couplings, or the like can be used to secure stacked modules 131 together.

Sidewall 166 can be comprised of a flexible polymeric sheet or film, such as used to produce sub-containers 17, or can be comprised of a self-supporting material, such as glass or an injection molded plastic. A tubular connector section 80a extends between shielding elements 61i and 61j and coupled to hubs 6 rotatably mounted thereon. A mixing element 84 is mounted on connector section 80a within mixing zone 31 of mixing module 131a while no mixing element is within settling zone 33 of settling module 131b.

Top module 131c and bottom module 131d are substantially the same as modules 131a and 131b except that one of shielding elements 61i and 61j is replaced with an end wall 170 that can be made of the same material as sidewall 166. Mounted on both or one of end walls 170 is rotational assembly 82. Tubular connector section 80a extends between rotational assembly 82 and hub 63 rotatably mounted on the opposing shielding elements 61i or 61j. When modules 131 are stacked together, tubular connectors 80 align and couple together, such as by the use of a coupling 143, so that drive shaft 72 can pass therethrough and engage with each mixing element 84 for select rotation.

One will appreciate that hub 63 need not be rotatably mounted about shielding element 61. For instance, hub 63 can comprise a through hole sufficiently large to prevent contact and/or wearing of rotating tubular connector section 80. In such embodiments, while sample may not be entirely prevent from passing therethrough, conduits 13 can be sufficiently large compared to the size of the through hole in hub 63 that any loss of efficiency can be kept to less than 10%, 5%, 2.5%, 1%, 0.5%, 0.25%, 0.1%, etc.

Ports 132 are formed on sidewall 166. Once modules are stacked and coupled together, conduits 13c can be coupled to ports 132 so that conduits extend between adjacent modules 131. Thus, conducts 13c extend between adjacent mixing zones 31 or between a mixing zone 31 and a settling zone 33 in substantially the same way as previously discussed with regard to container assembly 12e. The assembled container assembly 12f can thus operate in the same way as sample purification system 10c as previously discussed.

Figure 15:
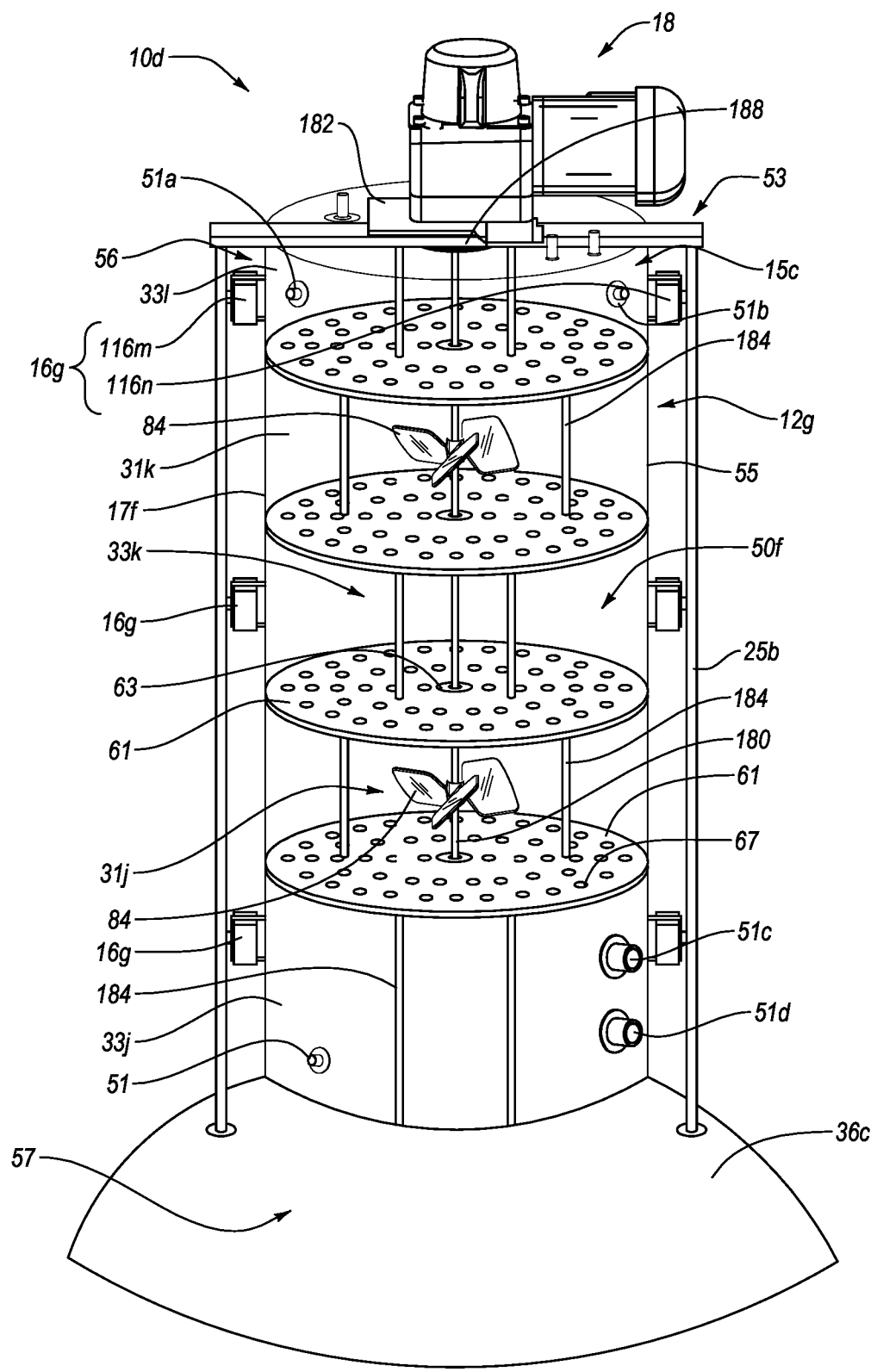
FIG. 15 is a perspective view of another sample purification system according to an embodiment of the present disclosure.

Depicted in FIG. 15 is another alternative embodiment of a sample purification system 10d incorporating features of the present disclosure. System 10d comprises a container assembly 12g that comprises a container 17f having a compartment 50f bounded by a side wall 55 that extends between upper end 56 and opposing lower end 57. Compartment 50f comprises the sample purification compartment. In this embodiment, container 17f is a rigid self-supporting structure. For example, container 17f could be comprised of glass or a transparent polymer or plastic that is self-supporting when formed. Container assembly 12g also includes a first inlet 51a and a first outlet 51b disposed on container 17f at upper end 56 and a second inlet 51c and second outlet 51d disposed on container 17f at lower end 57. Container 17f is also supported by a base 36c in some embodiments.

Disposed within compartment 50f are a plurality of shielding elements 61 having openings 67 extending therethrough. Shielding elements 61 previously discussed with regard to FIGS. 6A-6D can work in the present embodiment along with other embodiments discussed herein. Shielding elements 61 divide compartment 50f into mixing zones 31j and 31k and settling zones 33j-33l. Shielding elements 61 can be secured to container 17f such as by being welded or otherwise attached to the interior of container 17f. Alternatively, elongated supports 184 can extend between shielding elements 61 and also between floor of container 17f in the adjacent shielding element 61 and between top end wall 82 of container 17f and the adjacent shielding element 61. Supports 184 thus maintain shielding elements 61 in vertically spaced apart orientations within compartment 50f.

A rigid drive shaft 180 centrally extends within and along the length of compartment 50f and passes through a top end wall of container 17f through a dynamic seal 188. Dynamic seal 188 enables drive shaft 180 to rotate relative to container 17f while still enabling compartment 50f to maintain sterility. Mixing elements 84 are mounted on drive shaft 180 within mixing zones 31j and 31k. A drive motor 186 couples to a portion of drive shaft 180 projecting outside of container 17f for rotating drive shaft 180 which in turns rotates mixing elements 84 within mixing zones 31j and 31k.

In contrast to some prior embodiments where acoustic settlers are mounted on conduits coupled with a mixing and/or settling zone, in the present embodiment acoustic settlers 16g are mounted to or disposed directly adjacent to container 17g in alignment with each settling zone 33j-33l. Specifically, each acoustic settlers 16g comprises an acoustic transducer 116m disposed on one side of each settling zone 33 and an acoustic reflector 116n disposed on the opposing side of settling zones 33 in alignment with acoustic transducer 116m. As previously discussed with regard to other embodiments, acoustic settlers 16g functions to produce an acoustic standing wave within settling zones 33 to enhance or promote the settling of the liquid therein. Moreover, acoustic settlers 16g can be mounted or connected (directly) to container 17f and/or to base 36c via support (rods) 25b.

In at least one embodiment, the diameter of container assembly 12g, container 17f, compartment 50f, and/or settling zone 33 can be small enough to permit the formation of a standing wave therein (by acoustic settler 16g). For instance, acoustic reflector 116n and acoustic transducer 116m can be positioned such that a wave produced by acoustic transducer 116m is reflected by acoustic reflector 116n. Alternatively, in some embodiments, acoustic settler 16g comprises an acoustic transducer 116m configured to sense one or more properties of the wave produced thereby. For instance, acoustic wave transducer 116m can sense one or more properties of the wave that are reflected back on the transducer by molecules or particles within container assembly 12g, container 17f, compartment 50f, and/or settling zone 33.

In at least one embodiment, the diameter of container assembly 12g, container 17f, compartment 50f, and/or settling zone 33 can be less than 30 cm, less than 25 cm, less than 20 cm, less than 15 cm, less than 12 cm, less than 10 cm, less than 7 cm, less than 5 cm, less than 2 cm, less than 1 cm, between 0.5 cm and 30 cm, between 1 cm and 20 cm, between 5 cm and 18 cm, or between 10 cm and 15 cm. In some embodiments, the diameter of container assembly 12g, container 17f, compartment 50f, and/or settling zone 33 can be larger than 30 cm (e.g., 35 cm, 40 cm, 45 cm, 50 cm, 60 cm, 70 cm, 80 cm, 90 cm, 1 m, 2 m, 5 m, 10 m, etc.). Furthermore, in at least one embodiment, the diameter of container assembly 12g, container 17f, compartment 50f, and/or settling zone 33 can change along the length thereof As with all of the other embodiments, any desired number of mixing zones 31 and settling zones 33 can be formed within compartment 50f. In at least one embodiment, the uppermost and/or lower most zones within compartment 50 (or one or more sub-compartments thereof), comprise settling zones, such that the mixed sample can settled and/or separated therein (e.g., prior to being harvested). Furthermore, any desired number of acoustic settlers 16 (or corresponding acoustic transducers and reflectors) can be aligned with each settling zone 33. To optimize the effectiveness of acoustic settlers 16g on the fluid within settling zones 33, each settling zone 33 typically has a maximum diameter that is less than 30 cm and more commonly less than 25 cm or less than 20 cm. However, other dimensions can also be used. For instance, settling zone 33 can have a maximum diameter that is less than 100 cm, 50 cm, 45 cm, 40 cm, 35 cm, 15 cm, or 10 cm.

During operation, sample purification system 10d operates in similar fashion to previously described embodiments. For instance, a first liquid is introduced into settling zone 33l of container assembly 12g (or compartment 50f thereof) via inlet 51a and a second liquid is introduced into settling zone 33j of container assembly 12g (or compartment 50f thereof) via inlet 51c (or vica versa depending on the density of the phases). The density of the first phase causes it to settle to the bottom of container assembly 12g while the density of the second phase causes it to rise to the top of container assembly 12g. Shielding elements 61 are designed to allow the flow of fluid therethrough by way of openings 67.

Accordingly, the first phase passes sequentially from settling zone 33l into mixing zone 31k, then into settling zone 33k, then into mixing zone 31j, and finally into settling zone 33j via respective shielding elements 61 disposed therebetween. Similarly, the second phase passes sequentially from settling zone 33j, into mixing zone 31j, then settling zone 33k, then mixing zone 31k, and finally into settling zone 33l.

In each of the mixing zones 31j and 31k, the first phase and second phase are mixed via respective mixing elements 84 disposed therein to effectuate the transfer of a molecule of interest from one of the first and second phases to the other phase. The mixing turbulence also promotes the flow of fluid mixture into the adjacent settling zones 33, which are shielded from the fluid turbulence of the mixing zones 31. In addition, one or more acoustic settlers 16g (or components 116m and 116n thereof) attached to the exterior of side wall 55 apply an acoustic wave to the portion of the mixture in each settling zone 33. As the dispersed phase droplets coalesce in each settling zone 33, enhanced by acoustic settler 16g, the first phase settles down in container assembly 12g and enters or re-enters the lower mixing zone 31 while the second phase rises up in container assembly 12g and enters or re-enters the upper mixing zone 31.

The portion of the first phase that reaches the lower end 57 of container assembly 12g is removed therefrom via fluid outlet 51d. Similarly, the portion of the second phase that reaches the upper end 56 of container assembly 12g is removed therefrom via fluid outlet 51b.

In some embodiments, while the mixing of the first and second phases (e.g., by means of mixing elements in each mixing zone) can effectuate transfer of the molecule(s) of interest from one of the first and second phases into the other phase, such mixing, especially when performed vigorously, can cause and/or lead to the formation of dispersed phase micro-droplets that may resist coalescence (e.g., even under some acoustic-enhanced settling conditions). For instance, the relatively rapid coalescence and/or settling of small dispersed phase droplets into larger droplets and/or a (dispersed phase) body having a buoyancy or density sufficient to overcome the drag force(s) applied thereon by at least a portion of the (surrounding) continuous phase can cause, initiate, and/or restore counter-current flow of the heavier phase downward and the lighter phase upward. However, the rapid induction and/or restoration of counter-current flow causes and/or allows even smaller, dispersed phase micro-droplets to remain trapped in the continuous phase—not having a buoyancy or density sufficient to overcome the drag force(s) applied thereon by the (surrounding) continuous phase. The continuous phase then carries these micro-droplets into the adjacent mixing zone where the vigorous agitation maintains and/or further reduces the size of the micro-droplets. The subsequent and/or repeated (rapid) coalescence and induction and/or restoration of counter-current flow can substantially prevent the coalescence, settling, and/or separation of these micro-droplets from the continuous phase.

In some embodiments, the addition of acoustic waves at (intermediate) settling zones and/or throughway conduits described herein can further enhance the rapid coalescence of dispersed phase droplets, but may never achieve acceptable levels of dispersed phase micro-droplet removal from the continuous phase. For instance, for embodiments in which the transfer of a molecule of interest out of the dispersed phase and into the continuous phase (prior to purification of the molecule of interest from the harvested continuous phase) is desired, the retention of dispersed phase micro-droplets within the continuous phase can result in the purification of dispersed phase contaminants along with the molecule of interest (e.g., as the contaminant-containing dispersed phase micro-droplets are harvested and purified along with the sample-containing continuous phase), leading to a reduction in sample purity.

Alternatively, in embodiments in which the transfer of contaminant(s) out of the dispersed phase and into the continuous phase (prior to purification of the molecule of interest from the harvested dispersed phase) is desired, the retention of dispersed phase micro-droplets within the continuous phase can result in a significant loss of molecular yield (e.g., as the molecule of interest-containing dispersed phase micro-droplets are retained in the continuous phase instead of being harvested and purified with the dispersed phase sample).

Similarly, for embodiments in which the transfer of a molecule of interest out of the continuous phase and into the dispersed phase (prior to purification of the molecule of interest from the harvested dispersed phase) is desired, the retention of dispersed phase micro-droplets within the continuous phase can result in a significant loss of molecular yield (e.g., as the molecule of interest-containing dispersed phase micro-droplets are retained in the continuous phase instead of being harvested and purified with the dispersed phase sample).

Moreover, for embodiments in which the transfer of contaminant(s) out of the continuous phase and into the dispersed phase (prior to purification of the molecule of interest from the harvested continuous phase) is desired, the retention of dispersed phase micro-droplets within the continuous phase can result in the purification of dispersed phase contaminants along with the molecule of interest (e.g., as the contaminant-containing dispersed phase micro-droplets are harvested and purified along with the sample-containing continuous phase), leading to a reduction in sample purity.

It will also be appreciated that the continuous phase (e.g., on a system-wide scale) can also form micro-droplets that can become dispersed, trapped, and/or entrained in the opposite phase (e.g., the dispersed phase on a system-wide scale). In such cases, the system continuous phase may comprise a local dispersed phase, and vice versa. Accordingly, those skilled in the art will appreciate that embodiments of the present disclosure can acoustically co-localize, coalesce, and/or aggregate phase droplets regardless of density and/or system or localized concentration.

Certain embodiments of the present disclosure provide one or more additional and/or acoustic setting zones adapted for inducing the coalescence of localized dispersed phase micro-droplets into a body having buoyancy or density sufficient to overcome drag force(s) applied thereon by the localized (surrounding) continuous phase. For instance, in some embodiments, the upper end 56 and/or lower end 57 of the container can include one or more additional settling zones 33 (not shown). The additional settling zones 33 can be separated by additional shielding elements 61 disposed therebetween. One or more of the additional settling zones 33 can also have an acoustic settler 16 (or components 116 thereof) attached to the exterior thereof and/or aligned therewith. In at least one embodiment, however, only the one or more (additional) settling zones 33 adjacent upper end 56 and/or lower end 57 can have acoustic settlers 16 (or components 116 thereof) attached to the exterior thereof and/or aligned therewith. For instance, in certain embodiments, upper end 56 and/or lower end 57 can include one or two or more additional settling zones 33 (e.g., such that upper end 56 and/or lower end 57 includes two or three or more adjacent settling zones 33 (e.g., without an interdisposed mixing zone 31)).

During operation, the above described sample purification system operates in similar fashion to previously described embodiments. However, as the dispersed phase droplets coalesce in the upper settling zone 33, for instance, the density of the first phase causes it to settle down, through the shielding element 61, back into the adjacent mixing zone 31. The density of the second phase, however, causes it to rise up, through an additional shielding element 61 (not shown) and into a first additional settling zone 33 (not shown) disposed above the upper settling zone 33, opposite the adjacent mixing zone 31. In this first additional settling zone 33, the second phase can be exposed to one or more acoustic waves. For instance, acoustic settler 16 (or components 116 thereof) can be attached to the exterior of and/or aligned with the first additional settling zone 33 and/or can apply an acoustic wave to the portion of the mixture in the first additional settling zone 33. In at least one embodiment, acoustic settler 16 (or components 116 thereof) can form a standing wave within the first additional settling zone 33 such that the portion of the mixture disposed therein and/or passing therethrough is exposed to the standing wave.

Similar to previous embodiments, the acoustic wave can enhance coalescence of any dispersed phase droplets in the portion of the mixture in the first additional settling zone 33. By providing the at least one additional settling zone 33 opposite mixing zone 31, however, the portion of the sample or mixture in the additional settling zone(s) 33 may be substantially devoid of dispersed phase droplets suitable for passively coalescence (e.g., in a settling zone adjacent to a mixing zone). Thus, the acoustic wave(s) applied thereto can be tuned, focused, and/or otherwise adapted to for induce the coalescence of dispersed phase micro-droplets into a body having buoyancy or density sufficient to overcome drag force(s) applied thereon by the (surrounding) continuous phase. For instance, in at least one embodiment, the acoustic wave(s) can be adapted to create one or more nodal arrangement of acoustic wave(s) (e.g., within the additional settling zone(s) 33), which can cause (nodal) alignment and/or enhance proximity or association of dispersed phase micro-droplets. The closely-associated micro-droplets can then coalesce into larger and larger phase droplets or bodies until the buoyancy of such bodies are sufficient to induce separation and/or counter-current flow of the two phases.

In addition, because sample inlet port 51 can be disposed at the upper settling zone 33 (or another location disposed below the additional and/or acoustic settling zone 33), additional sample may not be introduced into or above the additional and/or acoustic settling zone 33. Accordingly, additional sample introduced into the system may not contaminate the acoustically settled sample in the additional and/or acoustic settling zone 33. The sample inlet port 51 can also be disposed at a mixing zone 31 in some embodiments. Furthermore, at least a portion of the lighter phase sample can be harvested and/or otherwise removed from the additional and/or acoustic settling zone 33 by means of an outlet port 51 connected thereto, associated therewith, and/or in fluid communication therewith.

Another embodiment can include a second additional settling zone 33 (not shown) disposed above the first additional settling zone 33, opposite the upper settling zone 33. The second additional settling zone 33 can optionally have an acoustic settler 16 (or components 116 thereof) attached to the exterior thereof and/or aligned therewith. In at least one embodiment, at least a portion of the sample mixture (e.g., the lighter phase sample) can be harvested and/or otherwise removed from the second additional settling zone 33 by means of an outlet port 51 connected thereto, associated therewith, and/or in fluid communication therewith.

Similar arrangement of additional settling zones can be applied to the lower end 57 of the system. In additional, similar arrangement of additional settling zones can be applied to other embodiments of the present disclosure (e.g., those described herein). For instance, at least one embodiment can include an acoustic settling sample loop connected between a first outlet port and a first inlet port. The acoustic setting sample loop can be or comprise a part or portion of the sample container and/or sample purification compartment in some embodiments. In other words, the acoustic loop can be fluidly coupled with the other mixing and/or settling zones such that the components are part of the same column unit and/or system. Accordingly, a portion of the mixture or partially processed sample that includes a continuous-concentration phase having an amount of dispersed-concentration phase micro-droplets disposed therein can be passed through the acoustic loop (e.g., through the outlet port, through an acoustic settler, and/or through the inlet port). The acoustic loop (or fluid conduit thereof) can, therefore, comprise a settling zone.

Acoustic wave(s) can induce the coalescence of dispersed phase micro-droplets into larger droplets or bodies as described previously. The acoustically-processed sample or acoustically-coalesced body can then be re-introduced into the sample compartment (e.g., via an inlet port) and/or mixed with a portion of the sample such that the (continuously recirculated) continuous phase sample becomes substantially devoid of dispersed phase micro-droplets. For instance, the acoustically-processed sample can be split such that the substantially dispersed phase micro-droplet-free portion is harvested, while the acoustically-coalesced dispersed phase body-containing portion is re-introduced into the sample compartment. Alternatively, depending upon the specific application and phase to be harvested, the acoustically-coalesced dispersed phase body-containing portion can be harvested, while the substantially dispersed phase micro-droplet-free portion is re-introduced into the sample compartment, or vice versa.

For instance, FIG. 18 illustrates schematically another embodiment of a fluid purification system 10e incorporating features of the present disclosure. Fluid purification system 10e includes a container 12a that bounds a sample purification compartment 136a. Similar to system 10a, system 10e includes a plurality of alternating mixing and settling zones (along a (substantially serpentine) sample flow path disposed in container 12a) and dual mixing systems 18 (each having a mixer assembly 78 extending at least partially through sample purification compartment 136a). Mixer assemblies 78 include mixing elements 84 disposed in each mixing zone of container 12a or sample purification compartment 136a thereof. However, unlike system 10a, container 12a of system 10e does not include separate sub-containers or columns (e.g., connected by conduits extending therebetween). Rather, the dual mixer assemblies 78, mixing zones, and settling zones are disposed in a single container and are separated by a plurality of shielding elements 61. It will be appreciated, however, that system 10e can alternatively comprise the separate sub-containers or columns (e.g., connected by conduits extending therebetween) described previously.

As described above, shielding elements 611 comprise and/or provide a baffle between vertically separated mixing and settling zones and shielding elements 61m, 61n comprise and/or provide a baffle between horizontally separated mixing and settling zones. In addition, weirs 179c and 179d can comprise and/or provide a barrier to enhance coalescence of the phase pooling therebehind. Operation of the system occurs as described previously. However, the light phase-containing liquid sample harvested from outlet port 51b and/or the heavy phase-containing liquid sample harvested from outlet port 51d can (each) pass through an acoustic loop 96, including an acoustic separator 16d. In at least one embodiment, the pure portion of the acoustically settled sample can then be harvested (e.g., for further processing, analysis, use, etc.). Alternatively, as illustrated in FIG. 18, the acoustically settled sample can also be re-introduced (e.g., into settling zone 33m and/or via inlet port 51f), where an acoustically coalesced portion of the sample (e.g., effectual and/or concentration-dispersed phase micro-droplets that were acoustically coalesced into larger droplets) can further coalesce with the phase body (or larger droplets) disposed therein.

In an exemplary operation, a first liquid L1 comprising a first, heavy phase (represented by forward-slash hatching), an amount of a molecule of interest (e.g., IgG), and one or more impurities (e.g., contaminates) is introduced in container 12a via inlet port 51a. A second liquid L2 comprising a second, light phase (represented by back-slash hatching) is introduced in container 12a via inlet port 51c. Illustratively, container 12a is filled such that the heavy phase is provide at a concentration sufficient to form a continuous phase; the light phase forming the dispersed phase. Mixing systems 18 are operated to mix the first and second liquids to form an emulsion of the two phases in each mixing zone and/or effectuate transfer of the molecule or interest from the first phase into the second phase. Shielding elements 611, 61m, 61n separate mixing zones 31i, 31j, 31k, 311, 31m from settling zones 33m, 33n, 33o, 33p, 33q. Accordingly, the mixed phases can coalesce and/or settle in the settling zones to induce counter-current flow, as described herein. Mixing systems 18 can be operated for a time sufficient to reach a steady state (or homeostasis) within container 12a and/or sample purification compartment 136a thereof.

The (steady state) system can (then) be configured (or reconfigured) to operate at a continuous flow. Specifically, a partially purified third liquid L3 and a partially purified fourth liquid L4 are removed from settling zones 33m and 33q, respectively via outlet ports 51d and 51b, respectively. Partially purified third liquid L3 comprises the heavy phase (in continuous phase concentrations), an amount of the one or more impurities or contaminants, and a first amount of dispersed light phase micro-droplets. Partially purified fourth liquid L4 comprises the light phase (in continuous phase concentrations), at least a portion of the amount of the molecule of interest, and a first amount of dispersed heavy phase micro-droplets.

Initially, partially purified third liquid L3 and partially purified fourth liquid L4 are each passed through acoustic loop 96, 97 re-introduced (e.g., in their entirety) into settling zones 33m and 33q, respectively, via inlet ports 51e and 51f, respectively. However, at least a portion of the amount of the dispersed phase micro-droplets in partially purified third liquid L3 and partially purified fourth liquid L4 have thereby been at least partially, acoustically coalesced into larger, dispersed phase droplets. Accordingly, upon reintroduction into settling zones 33m and 33q, respectively, the larger, dispersed phase droplets are more likely to coalesce with the same phase body (or larger droplets) disposed therein. After a suitable period of time, a substantially purified fifth liquid L5 and a substantially purified sixth liquid L6 can be removed from system 10e. For instance, a valve 52 can be at least partially opened to allow the substantially purified liquids to divert out of the acoustic loop. A (substantial) portion of the liquid (i.e., partially purified liquid) can continue to be reintroduced into settling zones 33m and 33q, respectively, to ensure that a high level of purification (e.g., high yield, high purity, low aggregation, etc.) is maintained in the system.

A pump 95 can be connected to outlet port 51b, 51d to facilitate sample flow through acoustic loop 96, 97. In an alternative embodiment, acoustic loop 96, 97 can be fluidly coupled via separate outlet port 51 (e.g., such that outlet ports 51b and 51d can be dedicated harvest ports and/or such that a valve 52 is not necessarily required).

Thus, embodiments of the present disclosure can include a sample purification system (e.g., column) having a plurality of mixing zones and settling zones, and at least one acoustic settling zone adapted for inducing the coalescence of dispersed phase micro-droplets into a body having buoyancy or density sufficient to overcome drag force(s) applied thereon by the (surrounding) continuous phase. The method can include allowing a portion of the mixture to pass (e.g., from a mixing zone or settling zone) into an acoustic settling zone (e.g., adjacent to the mixing zone or settling zone), at least one acoustic wave being applied to a portion of the mixture in the acoustic settling zone or as a portion of the mixture passes (e.g., from a mixing zone or settling zone) into the acoustic settling zone.

In at least one alternative embodiment, the system can comprise a series of tandem, independent, discrete, and/or side-by-side, etc. mixing devices and settling containers (e.g., fluidly connected with conduit, tubing, etc.), as known in the art. For instance, an illustrative workstation can comprise a first mixing device having one or more inlet openings for introducing a first and a second liquid, one or more mixing elements disposed in the mixing device, and one or more outlet openings for passing a mixture of the first and second liquids (or first and second phases thereof) out of the mixing device, through a passageway, and/or into a first settling container. In some embodiments of the present disclosure, however, the passageway and/or first settling container can have one or more acoustic settlers connected thereto and/or disposed thereabout, such that the mixture can be acoustically settled. At least a portion of the settled sample can be passed into a second mixing device, where the pacification process can continue. In other embodiments, the one or more acoustic settlers can be disposed on the back end of the system (or component thereof) to actively, acoustically settled dispersed phase micro-droplets from the continuous phase sample prior to removal from the system (e.g., harvesting, recycling, or disposing of the continuous phase sample).

It is noted that the previously described system parameters (e.g., size, ratio, dynamics, speed, flow rate, etc.) and/or results (e.g., purity, yield, aggregation, etc.) can be achieved through implementation of any of the foregoing embodiments, including systems and/or methods. Accordingly, such parameters and/or results need not be repeated for each embodiment, including the alternative systems and methods described herein.

The foregoing disclosure includes description of two-phase, liquid-liquid extraction and/or purification systems, wherein a first liquid comprising a first phase and at least one molecule of interest is mixed with a second liquid comprising a second phase. In certain embodiments, the first liquid can include a first molecule (e.g., a biological molecule of interest) and a second molecule (e.g., a contaminant). For instance, some embodiments involve the extraction and/or purification of a biological molecule of interest (e.g., immunoglobulin) away from at least one contaminant (e.g., protein).

In other embodiments, however, one or more phases can be the subject of purification and/or extraction. For instance, a contaminant (e.g., water) can be extracted and/or purified away from or out of a liquid phase (or vice versa) via two-phase liquid-liquid extraction. Thus, various embodiments can include a first liquid comprising a phase of interest and a first molecule, and a second liquid can comprise a second phase. Accordingly, those skilled in the art will appreciate that the inventive concepts and principles disclosed and/or described herein are compatible with a wide variety of embodiments, each of which is contemplated herein.

It will also be appreciated that various features, members, elements, parts, and/or portions of certain embodiments of the present disclosure are compatible with and/or can be combined with, included in, and/or incorporated into other embodiments of the present disclosure. Thus, disclosure a certain features, members, elements, parts, and/or portions relative to a specific embodiment of the present disclosure should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present disclosure.

In addition, the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of purifying a sample in a two-phase system, the method comprising:
   mixing a first liquid with a second liquid to form a first mixture, the first liquid comprising a first liquid phase, the second liquid comprising a second liquid phase, the second liquid being immiscible in the first liquid, the first mixture comprising a portion of the second liquid dispersed in the first liquid;
   settling a first portion of the first mixture; and
   applying an acoustic wave to the settled first portion of the first mixture to form a first acoustically settled mixture;
   wherein the step of applying the acoustic wave occurs in an acoustic settling loop, the acoustic settling loop having a first end in fluid communication with a settling zone and a second end in fluid communication with the settling zone.

2. The method of claim 1, further comprising mixing the first acoustically settled mixture with a second portion of the first mixture to form a second mixture.

3. The method of claim 2, further comprising settling a portion of the second mixture.

4. The method of claim 3, further comprising applying an acoustic wave to the settled portion of the second mixture to form a second acoustically settled mixture.

5. The method of claim 4, further comprising either (i) mixing the second acoustically settled mixture with a third portion of the first mixture, or (ii) harvesting at least some of the second acoustically settled mixture.

6. The method of claim 1, wherein the step of mixing the first liquid with the second liquid further comprises dispersing a plurality of droplets of the second liquid in the first liquid, wherein the droplets of the second liquid have a diameter in a range of 1-80 microns.

7. The method of claim 6, wherein the step of applying the acoustic wave to the settled first portion of the first mixture further comprises coalescing the droplets of the second liquid, wherein a plurality of coalesced droplets of the second liquid has a diameter in a range of 90-300 microns.

8. The method of claim 1, wherein the mixing step occurs in a mixing zone and the settling step occurs in the settling zone, the settling zone being in fluid communication with the mixing zone.

* * * * *